United States Patent
Condeixa et al.

(10) Patent No.: US 11,122,492 B2
(45) Date of Patent: *Sep. 14, 2021

(54) SYSTEMS AND METHODS FOR MANAGING THE ROUTING AND REPLICATION OF DATA IN THE UPLOAD DIRECTION IN A NETWORK OF MOVING THINGS

(71) Applicant: Veniam, Inc., Mountain View, CA (US)

(72) Inventors: Tiago Silvestre Condeixa, Aveiro (PT); Ricardo Jorge Magalhães de Matos, Oporto (PT)

(73) Assignee: VENIAM, INC., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/242,293

(22) Filed: Jan. 8, 2019

(65) Prior Publication Data

US 2019/0215754 A1    Jul. 11, 2019

Related U.S. Application Data

(63) Continuation of application No. 15/456,441, filed on Mar. 10, 2017, now Pat. No. 10,178,601.

(Continued)

(51) Int. Cl.
*H04W 40/20* (2009.01)
*H04L 29/08* (2006.01)
(Continued)

(52) U.S. Cl.
CPC ......... *H04W 40/20* (2013.01); *H04L 41/0893* (2013.01); *H04L 43/04* (2013.01);
(Continued)

(58) Field of Classification Search
CPC .................................................. H04W 40/20
See application file for complete search history.

(56) References Cited

U.S. PATENT DOCUMENTS

2005/0228867 A1* 10/2005 Osborne ................. H04L 51/30
                                                              709/206
2013/0211870 A1    8/2013 Lawson
(Continued)

FOREIGN PATENT DOCUMENTS

JP    2007318353    12/2007
JP    2015186010    10/2015
(Continued)

OTHER PUBLICATIONS

Int'l Search Report and Written Opinion for PCT/US17/32860 dated Jun. 9, 2017 (14 pages).
(Continued)

*Primary Examiner* — Sulaiman Nooristany
(74) *Attorney, Agent, or Firm* — McAndrews, Held & Malloy, Ltd.

(57) ABSTRACT

Methods and systems are provided for managing the routing and replication of data in the upload direction in a network of moving things. At a first node of a network including a plurality of nodes, wireless communication may be established with one or more other nodes of the plurality of nodes, and node related information associated with the first node and at least one other node may be obtained. The node related information may relate to node physical location, node movement, node wireless communication link performance, and/or identity of node resident data. When a data bundle is available for processing, based on the node related information and a set of rules for the first node for a direction of communication of the data bundle, one action supported by the first node may be selected and preformed, with the action including transmitting, storing, or dropping the data bundle.

27 Claims, 16 Drawing Sheets

Related U.S. Application Data

(60) Provisional application No. 62/338,135, filed on May 18, 2016.

(51) Int. Cl.
  *H04L 12/24* (2006.01)
  *H04L 12/26* (2006.01)
  *H04W 40/12* (2009.01)
  *H04W 4/70* (2018.01)
  *H04W 84/00* (2009.01)

(52) U.S. Cl.
  CPC ........ *H04L 67/1095* (2013.01); *H04L 67/327* (2013.01); *H04W 40/12* (2013.01); *H04L 67/12* (2013.01); *H04W 4/70* (2018.02); *H04W 84/005* (2013.01)

(56) References Cited

U.S. PATENT DOCUMENTS

| | | | |
|---|---|---|---|
| 2014/0254359 A1* | 9/2014 | Alisawi | H04W 28/0247 370/230 |
| 2015/0350031 A1 | 12/2015 | Burks | |
| 2019/0090174 A1 | 3/2019 | Rocci et al. | |

FOREIGN PATENT DOCUMENTS

| | | | |
|---|---|---|---|
| JP | 2016076911 | 5/2016 | |
| WO | 2012128792 | 9/2012 | |
| WO | WO-2012128792 A1 * | 9/2012 | ........ H04W 52/0264 |
| WO | 2015104753 | 7/2015 | |
| WO | 2015/133055 | 9/2015 | |
| WO | 2016002404 | 1/2016 | |
| WO | 2016013139 | 1/2016 | |

OTHER PUBLICATIONS

European Search Report in EP17799996.8, dated Nov. 27, 2019.
Japanese Office Action for Application No. 2018-560912, dated Dec. 20, 2019, 15 pages.
Japanese Office Action for Application No. 2018-560912, dated Jul. 22, 2020, 6 pages.
Korean Office Action for Application No. 10-2018-7036736 dated Sep. 28, 2020, 5 pages.

* cited by examiner

SYSTEMS AND METHODS FOR MANAGING THE ROUTING AND REPLICATION OF DATA IN THE UPLOAD DIRECTION IN A NETWORK OF MOVING THINGS

CLAIM OF PRIORITY

This patent application is a continuation of U.S. patent application Ser. No. 15/456,441, filed on Mar. 10, 2017. The above identified application is hereby incorporated herein by reference in its entirety for all purposes.

CROSS-REFERENCE TO RELATED APPLICATIONS/INCORPORATION BY REFERENCE

This patent application makes reference to, claims priority to, and claims benefit from U.S. Provisional Patent Application Ser. No. 62/338,135, filed on May 18, 2016, and titled "Systems and Method for Managing the Routing and Replication of Data in the Upload Direction in a Network of Moving Things," which is hereby incorporated herein by reference in its entirety. The present application is also related to U.S. Provisional Application Ser. No. 62/221,997, titled "Integrated Communication Network for a Network of Moving Things," filed on Sep. 22, 2015; U.S. Provisional Application Ser. No. 62/222,016, titled "Systems and Methods for Synchronizing a Network of Moving Things," filed on Sep. 22, 2015; U.S. Provisional Application Ser. No. 62/222,042, titled "Systems and Methods for Managing a Network of Moving Things," filed on Sep. 22, 2015; U.S. Provisional Application Ser. No. 62/222,066, titled "Systems and Methods for Monitoring a Network of Moving Things," filed on Sep. 22, 2015; U.S. Provisional Application Ser. No. 62/222,077, titled "Systems and Methods for Detecting and Classifying Anomalies in a Network of Moving Things," filed on Sep. 22, 2015; U.S. Provisional Application Ser. No. 62/222,098, titled "Systems and Methods for Managing Mobility in a Network of Moving Things," filed on Sep. 22, 2015; U.S. Provisional Application Ser. No. 62/222,121, titled "Systems and Methods for Managing Connectivity a Network of Moving Things," filed on Sep. 22, 2015; U.S. Provisional Application Ser. No. 62/222,135, titled "Systems and Methods for Collecting Sensor Data in a Network of Moving Things," filed on Sep. 22, 2015; U.S. Provisional Application Ser. No. 62/222,145, titled "Systems and Methods for Interfacing with a Network of Moving Things," filed on Sep. 22, 2015; U.S. Provisional Application Ser. No. 62/222,150, titled "Systems and Methods for Interfacing with a User of a Network of Moving Things," filed on Sep. 22, 2015; U.S. Provisional Application Ser. No. 62/222,168, titled "Systems and Methods for Data Storage and Processing for a Network of Moving Things," filed on Sep. 22, 2015; U.S. Provisional Application Ser. No. 62/222,183, titled "Systems and Methods for Vehicle Traffic Management in a Network of Moving Things," filed on Sep. 22, 2015; U.S. Provisional Application Ser. No. 62/222,186, titled "Systems and Methods for Environmental Management in a Network of Moving Things," filed on Sep. 22, 2015; U.S. Provisional Application Ser. No. 62/222,190, titled "Systems and Methods for Port Management in a Network of Moving Things," filed on Sep. 22, 2015; U.S. Provisional Patent Application Ser. No. 62/222,192, titled "Communication Network of Moving Things," filed on Sep. 22, 2015; U.S. Provisional Application Ser. No. 62/244,828, titled "Utilizing Historical Data to Correct GPS Data in a Network of Moving Things," filed on Oct. 22, 2015; U.S. Provisional Application Ser. No. 62/244,930, titled "Using Anchors to Correct GPS Data in a Network of Moving Things," filed on Oct. 22, 2015; U.S. Provisional Application Ser. No. 62/246,368, titled "Systems and Methods for Inter-Application Communication in a Network of Moving Things," filed on Oct. 26, 2015; U.S. Provisional Application Ser. No. 62/246,372, titled "Systems and Methods for Probing and Validating Communication in a Network of Moving Things," filed on Oct. 26, 2015; U.S. Provisional Application Ser. No. 62/250,544, titled "Adaptive Rate Control for Vehicular Networks," filed on Nov. 4, 2015; U.S. Provisional Application Ser. No. 62/273,878, titled "Systems and Methods for Reconfiguring and Adapting Hardware in a Network of Moving Things," filed on Dec. 31, 2015; U.S. Provisional Application Ser. No. 62/253,249, titled "Systems and Methods for Optimizing Data Gathering in a Network of Moving Things," filed on Nov. 10, 2015; U.S. Provisional Application Ser. No. 62/257,421, titled "Systems and Methods for Delay Tolerant Networking in a Network of Moving Things," filed on Nov. 19, 2015; U.S. Provisional Application Ser. No. 62/265,267, titled "Systems and Methods for Improving Coverage and Throughput of Mobile Access Points in a Network of Moving Things," filed on Dec. 9, 2015; U.S. Provisional Application Ser. No. 62/270,858, titled "Channel Coordination in a Network of Moving Things," filed on Dec. 22, 2015; U.S. Provisional Application Ser. No. 62/257,854, titled "Systems and Methods for Network Coded Mesh Networking in a Network of Moving Things," filed on Nov. 20, 2015; U.S. Provisional Application Ser. No. 62/260,749, titled "Systems and Methods for Improving Fixed Access Point Coverage in a Network of Moving Things," filed on Nov. 30, 2015; U.S. Provisional Application Ser. No. 62/273,715, titled "Systems and Methods for Managing Mobility Controllers and Their Network Interactions in a Network of Moving Things," filed on Dec. 31, 2015; U.S. Provisional Application Ser. No. 62/281,432, titled "Systems and Methods for Managing and Triggering Handovers of Mobile Access Points in a Network of Moving Things," filed on Jan. 21, 2016; U.S. Provisional Application Ser. No. 62/268,188, titled "Captive Portal-related Control and Management in a Network of Moving Things," filed on Dec. 16, 2015; U.S. Provisional Application Ser. No. 62/270,678, titled "Systems and Methods to Extrapolate High-Value Data from a Network of Moving Things," filed on Dec. 22, 2015; U.S. Provisional Application Ser. No. 62/272,750, titled "Systems and Methods for Remote Software Update and Distribution in a Network of Moving Things," filed on Dec. 30, 2015; U.S. Provisional Application Ser. No. 62/278,662, titled "Systems and Methods for Remote Configuration Update and Distribution in a Network of Moving Things," filed on Jan. 14, 2016; U.S. Provisional Application Ser. No. 62/286,243, titled "Systems and Methods for Adapting a Network of Moving Things Based on User Feedback," filed on Jan. 22, 2016; U.S. Provisional Application Ser. No. 62/278,764, titled "Systems and Methods to Guarantee Data Integrity When Building Data Analytics in a Network of Moving Things," Jan. 14, 2016; U.S. Provisional Application Ser. No. 62/286,515, titled "Systems and Methods for Self-Initialization and Automated Bootstrapping of Mobile Access Points in a Network of Moving Things," filed on Jan. 25, 2016; U.S. Provisional Application Ser. No. 62/295,602, titled "Systems and Methods for Power Management in a Network of Moving Things," filed on Feb. 16, 2016; U.S. Provisional Application Ser. No. 62/257,421, titled "Systems and Methods for Delay Tolerant Networking in a Network of Moving Things," filed Nov. 19, 2015; and U.S.

Provisional Application Ser. No. 62/299,269, titled "Systems and Methods for Automating and Easing the Installation and Setup of the Infrastructure Supporting a Network of Moving Things," filed on Feb. 24, 2016; each of which is hereby incorporated herein by reference in its entirety for all purposes.

BACKGROUND

Current communication networks are unable to adequately support communication environments involving mobile and static nodes. As a non-limiting example, current communication networks are unable to adequately support a network comprising a complex array of both moving and static nodes (e.g., the Internet of moving things, autonomous vehicle networks, etc.). Limitations and disadvantages of conventional methods and systems will become apparent to one of skill in the art, through comparison of such approaches with some aspects of the present methods and systems set forth in the remainder of this disclosure with reference to the drawings.

SUMMARY

Figure 1:
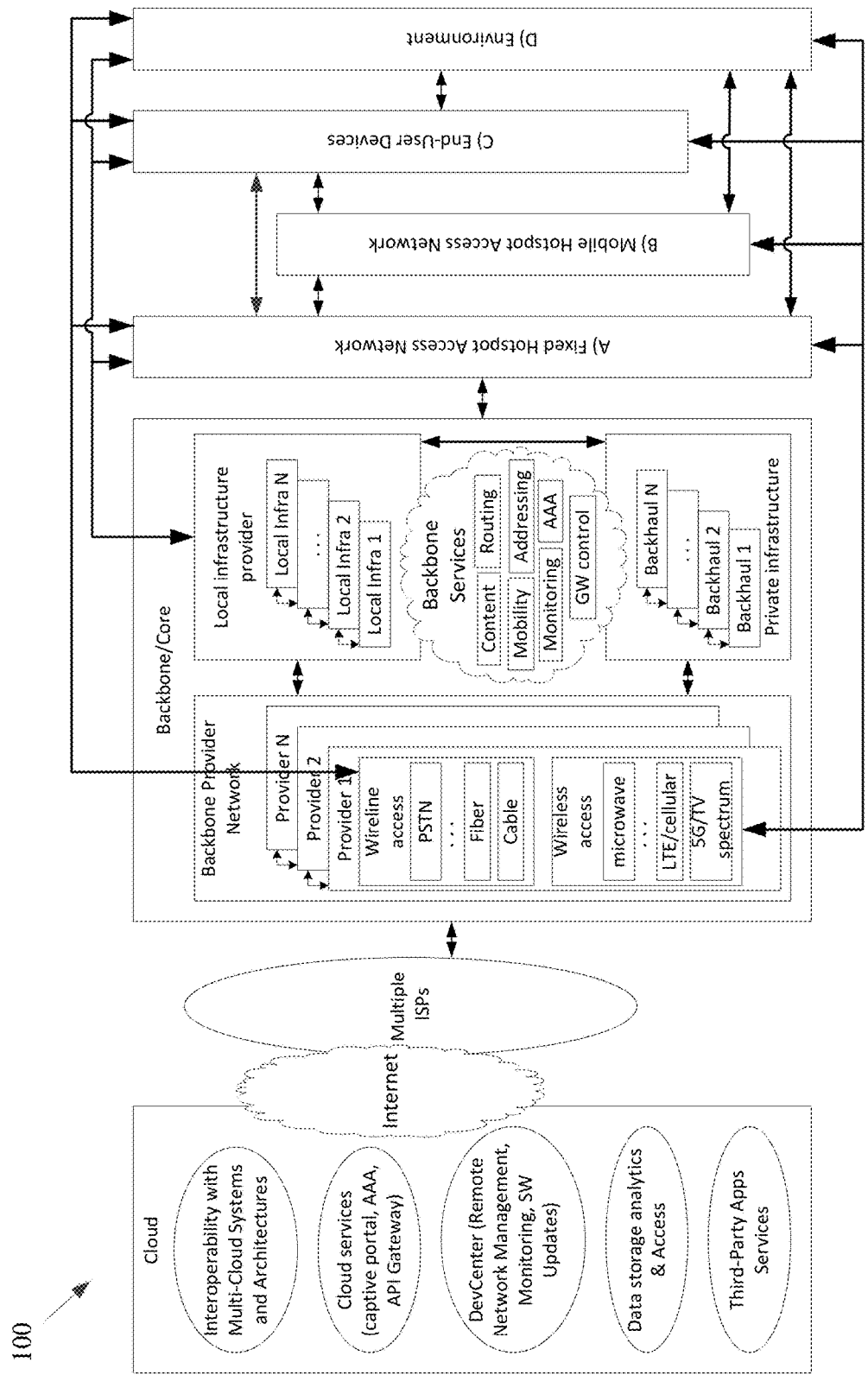
FIG. 1 shows a block diagram of a communication network, in accordance with various aspects of this disclosure.

Various aspects of this disclosure provide communication network architectures, systems and methods for supporting a network of mobile and/or static nodes. As a non-limiting example, various aspects of this disclosure provide communication network architectures, systems, and methods for supporting a dynamically configurable communication network comprising a complex array of both static and moving communication nodes (e.g., the Internet of moving things, autonomous vehicle networks, etc.). For example, a communication network implemented in accordance with various aspects of the present disclosure may operate in one of a plurality of modalities comprising various fixed nodes, mobile nodes, and/or a combination thereof, which are selectable to achieve any of a variety of system goals.

DETAILED DESCRIPTION OF VARIOUS ASPECTS OF THE DISCLOSURE

As utilized herein the terms "circuits" and "circuitry" refer to physical electronic components (i.e., hardware) and any software and/or firmware ("code") that may configure the hardware, be executed by the hardware, and or otherwise be associated with the hardware. As used herein, for example, a particular processor and memory (e.g., a volatile or non-volatile memory device, a general computer-readable medium, etc.) may comprise a first "circuit" when executing a first one or more lines of code and may comprise a second "circuit" when executing a second one or more lines of code. Additionally, a circuit may comprise analog and/or digital circuitry. Such circuitry may, for example, operate on analog and/or digital signals. It should be understood that a circuit may be in a single device or chip, on a single motherboard, in a single chassis, in a plurality of enclosures at a single geographical location, in a plurality of enclosures distributed over a plurality of geographical locations, etc. Similarly, the term "module" may, for example, refer to a physical electronic components (i.e., hardware) and any software and/or firmware ("code") that may configure the hardware, be executed by the hardware, and or otherwise be associated with the hardware.

As utilized herein, circuitry is "operable" to perform a function whenever the circuitry comprises the necessary hardware and code (if any is necessary) to perform the function, regardless of whether performance of the function is disabled, or not enabled (e.g., by a user-configurable setting, factory setting or trim, etc.).

As utilized herein, "and/or" means any one or more of the items in the list joined by "and/or". As an example, "x and/or y" means any element of the three-element set {(x), (y), (x, y)}. That is, "x and/or y" means "one or both of x and y." As another example, "x, y, and/or z" means any element of the seven-element set {(x), (y), (z), (x, y), (x, z), (y, z), (x, y, z)}. That is, "x, y, and/or z" means "one or more of x, y, and z." As utilized herein, the terms "e.g.," and "for example," "exemplary," and the like set off lists of one or more non-limiting examples, instances, or illustrations.

The terminology used herein is for the purpose of describing particular examples only and is not intended to be limiting of the disclosure. As used herein, the singular forms are intended to include the plural forms as well, unless the context clearly indicates otherwise. It will be further understood that the terms "comprises," "includes," "comprising," "including," "has," "have," "having," and the like when used in this specification, specify the presence of stated features, integers, steps, operations, elements, and/or components, but do not preclude the presence or addition of one or more other features, integers, steps, operations, elements, components, and/or groups thereof.

It will be understood that, although the terms first, second, etc. may be used herein to describe various elements, these elements should not be limited by these terms. These terms are only used to distinguish one element from another element. Thus, for example, a first element, a first component or a first section discussed below could be termed a second element, a second component or a second section without departing from the teachings of the present disclosure. Similarly, various spatial terms, such as "upper," "lower," "side," and the like, may be used in distinguishing one element from another element in a relative manner. It should be understood, however, that components may be oriented in different manners, for example an electronic device may be turned sideways so that its "top" surface is facing horizontally and its "side" surface is facing vertically, without departing from the teachings of the present disclosure.

With the proliferation of the mobile and/or static things (e.g., devices, machines, people, etc.) and logistics for such things to become connected to each other (e.g., in the contexts of smart logistics, transportation, environmental sensing, etc.), a platform that is for example always-on, robust, scalable and secure that is capable of providing connectivity, services and Internet access to such things (or objects), anywhere and anytime is desirable. Efficient power utilization within the various components of such system is also desirable.

Accordingly, various aspects of the present disclosure provide a fully-operable, always-on, responsive, robust, scalable, secure platform/system/architecture to provide connectivity, services and Internet access to all mobile things and/or static things (e.g., devices, machines, people, access points, end user devices, sensors, etc.) anywhere and anytime, while operating in an energy-efficient manner.

Various aspects of the present disclosure provide a platform that is flexibly configurable and adaptable to the various requirements, features, and needs of different environments, where each environment may be characterized by a respective level of mobility and density of mobile and/or static things, and the number and/or types of access to those things. Characteristics of various environments may, for example, include high mobility of nodes (e.g., causing contacts or connections to be volatile), high number of neighbors, high number of connected mobile users, mobile access points, availability of multiple networks and technologies (e.g., sometimes within a same area), etc. For example, the mode of operation of the platform may be flexibly adapted from environment to environment, based on each environment's respective requirements and needs, which may be different from other environments. Additionally for example, the platform may be flexibly optimized (e.g., at design/installation time and/or in real-time) for different purposes (e.g., to reduce the latency, increase throughput, reduce power consumption, load balance, increase reliability, make more robust with regard to failures or other disturbances, etc.), for example based on the content, service or data that the platform provides or handles within a particular environment.

In accordance with various aspects of the present disclosure, many control and management services (e.g., mobility, security, routing, etc.) are provided on top of the platform (e.g., directly, using control overlays, using containers, etc.), such services being compatible with the services currently deployed on top of the Internet or other communication network(s).

The communication network (or platform), in whole or in part, may for example be operated in public and/or private modes of operation, for example depending on the use case. The platform may, for example, operate in a public or private mode of operation, depending on the use-case (e.g., public Internet access, municipal environment sensing, fleet operation, etc.).

Additionally for example, in an implementation in which various network components are mobile, the transportation and/or signal control mechanisms may be adapted to serve the needs of the particular implementation. Also for example, wireless transmission power and/or rate may be adapted (e.g., to mitigate interference, to reduce power consumption, to extend the life of network components, etc.

Various example implementations of a platform, in accordance with various aspects of the present disclosure, are capable of connecting different subsystems, even when various other subsystems that may normally be utilized are unavailable. For example, the platform may comprise various built-in redundancies and fail-recovery mechanisms. For example, the platform may comprise a self-healing capability, self-configuration capability, self-adaptation capability, etc. The protocols and functions of the platform may, for example, be prepared to be autonomously and smoothly configured and adapted to the requirements and features of different environments characterized by different levels of mobility and density of things (or objects), the number/types of access to those things. For example, various aspects of the platform may gather context parameters that can influence any or all decisions. Such parameters may, for example, be derived locally, gathered from a neighborhood, fixed APs, the Cloud, etc. Various aspects of the platform may also, for example, ask for historical information to feed any of the decisions, where such information can be derived from historical data, from surveys, from simulators, etc. Various aspects of the platform may additionally, for example, probe or monitor decisions made throughout the network, for example to evaluate the network and/or the decisions themselves in real-time. Various aspects of the platform may further, for example, enforce the decisions in the network (e.g., after evaluating the probing results). Various aspects of the platform may, for example, establish thresholds to avoid any decision that is to be constantly or repeatedly performed without any significant advantage (e.g., technology change, certificate change, IP change, etc.). Various aspects of the platform may also, for example, learn locally (e.g., with the decisions performed) and dynamically update the decisions.

In addition to (or instead of) failure robustness, a platform may utilize multiple connections (or pathways) that exist between distinct sub-systems or elements within the same sub-system, to increase the robustness and/or load-balancing of the system.

The following discussion will present examples of the functionality performed by various example subsystems of the communication network. It should be understood that the example functionality discussed herein need not be performed by the particular example subsystem or by a single subsystem. For example, the subsystems present herein may interact with each other, and data or control services may be deployed either in a centralized way, or having their functionalities distributed among the different subsystems, for example leveraging the cooperation between the elements of each subsystem.

Various aspects of the present disclosure provide a communication network (e.g., a city-wide vehicular network, a shipping port-sized vehicular network, a campus-wide vehicular network, etc.) that utilizes vehicles (e.g., automobiles, buses, trucks, boats, forklifts, human-operated vehicles, autonomous and/or remote controlled vehicles, etc.) as Wi-Fi hotspots. Note that Wi-Fi is generally used throughout this discussion as an example, but the scope of various aspects of this disclosure is not limited thereto. For example, other wireless LAN technologies, PAN technologies, MAN technologies, etc., may be utilized. Such utilization may, for example, provide cost-effective ways to gather substantial amounts of urban data, and provide for the efficient offloading of traffic from congested cellular networks (or other networks). In controlled areas (e.g., ports, harbors, etc.) with many vehicles, a communication network in accordance with various aspects of this disclosure may expand the wireless coverage of existing enterprise Wi-Fi networks, for example providing for real-time communication with vehicle drivers (e.g., human, computer-controlled, etc.) and other mobile employees without the need for SIM cards or cellular (or other network) data plans.

Vehicles may have many advantageous characteristics that make them useful as Wi-Fi (or general wireless) hotspots. For example, vehicles generally have at least one battery, vehicles are generally densely spread over the city at street level and/or they are able to establish many contacts with each other in a controlled space, and vehicles can communicate with $10x$ the range of normal Wi-Fi in the 5.9 GHz frequency band, reserved for intelligent transportation systems in the EU, the U.S., and elsewhere. Note that the scope of this disclosure is not limited to such 5.9 GHz wireless communication. Further, vehicles are able to effectively expand their coverage area into a swath over a period of time, enabling a single vehicle access point to interact with substantially more data sources over the period of time.

In accordance with various aspects of the present disclosure, an affordable multi-network on-board unit (OBU) is presented. Note that the OBU may also be referred to herein as a mobile access point, Mobile AP, MAP, etc. The OBU may, for example, comprise a plurality of networking interfaces (e.g., Wi-Fi, 802.11p, 4G, Bluetooth, UWB, etc.). The OBU may, for example, be readily installed in or on private and/or public vehicles (e.g., individual user vehicles, vehicles of private fleets, vehicles of public fleets, etc.). The OBU may, for example, be installed in transportation fleets, waste management fleets, law enforcement fleets, emergency services, road maintenance fleets, taxi fleets, aircraft fleets, etc. The OBU may, for example, be installed in or on a vehicle or other structure with free mobility or relatively limited mobility. The OBU may also, for example, be carried by a person or service animal, mounted to a bicycle, mounted to a moving machine in general, mounted to a container, etc.

The OBUs may, for example, operate to connect passing vehicles to the wired infrastructure of one or more network providers, telecom operators, etc. In accordance with the architecture, hardware, and software functionality discussed herein, vehicles and fleets can be connected not just to the cellular networks (or other wide area or metropolitan area networks, etc.) and existing Wi-Fi hotspots spread over a city or a controlled space, but also to other vehicles (e.g., utilizing multi-hop communications to a wired infrastructure, single or multi-hop peer-to-peer vehicle communication, etc.). The vehicles and/or fleets may, for example, form an overall mesh of communication links, for example including the OBUs and also fixed Access Points (APs) connected to the wired infrastructure (e.g., a local infrastructure, etc.). Note that OBUs herein may also be referred to as "Mobile APs," "mobile hotspots," "MAPs," etc. Also note that fixed access points may also be referred to herein as Road Side Units (RSUs), Fixed APs, FAPs, etc.

In an example implementation, the OBUs may communicate with the Fixed APs utilizing a relatively long-range protocol (e.g., 802.11p, etc.), and the Fixed APs may, in turn, be hard wired to the wired infrastructure (e.g., via cable, tethered optical link, etc.). Note that Fixed APs may also, or alternatively, be coupled to the infrastructure via wireless link (e.g., 802.11p, etc.). Additionally, clients or user devices may communicate with the OBUs using one or more relatively short-range protocols (e.g., Wi-Fi, Bluetooth, UWB, etc.). The OBUs, for example having a longer effective wireless communication range than typical Wi-Fi access points or other wireless LAN/PAN access points (e.g., at least for links such as those based on 802.11p, etc.), are capable of substantially greater coverage areas than typical Wi-Fi or other wireless LAN/PAN access points, and thus fewer OBUs are necessary to provide blanket coverage over a geographical area.

The OBU may, for example, comprise a robust vehicular networking module (e.g., a connection manager) which builds on long-range communication protocol capability (e.g., 802.11p, etc.). For example, in addition to comprising 802.11p (or other long-range protocol) capability to communicate with Fixed APs, vehicles, and other nodes in the network, the OBU may comprise a network interface (e.g., 802.11a/b/g/n, 802.11ac, 802.11af, any combination thereof, etc.) to provide wireless local area network (WLAN) connectivity to end user devices, sensors, fixed Wi-Fi access points, etc. For example, the OBU may operate to provide in-vehicle Wi-Fi Internet access to users in and/or around the vehicle (e.g., a bus, train car, taxi cab, public works vehicle, etc.). The OBU may further comprise one or more wireless backbone communication interfaces (e.g., cellular network interfaces, etc.). Though in various example scenarios, a cellular network interface (or other wireless backbone communication interface) might not be the preferred interface for various reasons (e.g., cost, power, bandwidth, etc.), the cellular network interface may be utilized to provide connectivity in geographical areas that are not presently supported by a Fixed AP, may be utilized to provide a fail-over communication link, may be utilized for emergency communications, may be utilized to subscribe to local infrastructure access, etc. The cellular network interface may also, for example, be utilized to allow the deployment of solutions that are dependent on the cellular network operators.

An OBU, in accordance with various aspects of the present disclosure, may for example comprise a smart connection manager that can select the best available wireless link(s) (e.g., Wi-Fi, 802.11p, cellular, vehicle mesh, etc.) with which to access the Internet. The OBU may also, for example, provide geo-location capabilities (e.g., GPS, etc.), motion detection sensors to determine if the vehicle is in motion, and a power control subsystem (e.g., to ensure that the OBU does not deplete the vehicle battery, etc.). The OBU may, for example, comprise any or all of the sensors (e.g., environmental sensors, etc.) discussed herein.

The OBU may also, for example, comprise a manager that manages machine-to-machine data acquisition and transfer (e.g., in a real-time or delay-tolerant fashion) to and from the cloud. For example, the OBU may log and/or communicate information of the vehicles.

The OBU may, for example, comprise a connection and/or routing manager that operates to perform routing of communications in a vehicle-to-vehicle/vehicle-to-infrastructure multi-hop communication. A mobility manager (or controller, MC) may, for example, ensure that communication sessions persist over one or more handoff(s) (also referred to herein as a "handover" or "handovers") (e.g., between different Mobile APs, Fixed APs, base stations, hot spots, etc.), among different technologies (e.g., 802.11p, cellular, Wi-Fi, satellite, etc.), among different MCs (e.g., in a fail-over scenario, load redistribution scenario, etc.), across different interfaces (or ports), etc. Note that the MC may also be referred to herein as a Local Mobility Anchor (LMA), a Network Controller, etc. Note that the MC, or a plurality thereof, may for example be implemented as part of the backbone, but may also, or alternatively, be implemented as part of any of a variety of components or combinations thereof. For example, the MC may be implemented in a Fixed AP (or distributed system thereof), as part of an OBU (or a distributed system thereof), etc. Various non-limiting examples of system components and/or methods are provided in U.S. Provisional Application No. 62/222,098, filed Sep. 22, 2015, and titled "Systems and Method for Managing Mobility in a Network of Moving Things," the entire contents of which are hereby incorporated herein by reference. Note that in an example implementation including a plurality of MCs, such MCs may be co-located and/or may be geographically distributed.

Various aspects of the present disclosure also provide a cloud-based service-oriented architecture that handles the real-time management, monitoring and reporting of the network and clients, the functionalities required for data storage, processing and management, the Wi-Fi client authentication and Captive Portal display, etc.

A communication network (or component thereof) in accordance with various aspects of the present disclosure may, for example, support a wide range of smart city applications (or controlled scenarios, or connected scenarios, etc.) and/or use-cases, as described herein.

For example, an example implementation may operate to turn each vehicle (e.g., both public and private taxis, buses, trucks, etc.) into a Mobile AP (e.g., a mobile Wi-Fi hotspot), offering Internet access to employees, passengers and mobile users travelling in the city, waiting in bus stops, sitting in parks, etc. Moreover, through an example vehicular mesh network formed between vehicles and/or fleets of vehicles, an implementation may be operable to offload cellular traffic through the mobile Wi-Fi hotspots and/or fixed APs (e.g., 802.11p-based APs) spread over the city and connected to the wired infrastructure of public or private telecom operators in strategic places, while ensuring the widest possible coverage at the lowest possible cost.

An example implementation (e.g., of a communication network and/or components thereof) may, for example, be operable as a massive urban scanner that gathers large amounts of data (e.g., continuously) on-the-move, actionable or not, generated by a myriad of sources spanning from the in-vehicle sensors or On Board Diagnostic System port (e.g., OBD2, etc.), interface with an autonomous vehicle driving system, external Wi-Fi/Bluetooth-enabled sensing units spread over the city, devices of vehicles' drivers and passengers (e.g., information characterizing such devices and/or passengers, etc.), positioning system devices (e.g., position information, velocity information, trajectory information, travel history information, etc.), etc.

Depending on the use case, the OBU may for example process (or computer, transform, manipulate, aggregate, summarize, etc.) the data before sending the data from the vehicle, for example providing the appropriate granularity (e.g., value resolution) and sampling rates (e.g., temporal resolution) for each individual application. For example, the OBU may, for example, process the data in any manner deemed advantageous by the system. The OBU may, for example, send the collected data (e.g., raw data, preprocessed data, information of metrics calculated based on the collected data, etc.) to the Cloud (e.g., to one or more networked servers coupled to any portion of the network) in an efficient and reliable manner to improve the efficiency, environmental impact and social value of municipal city operations and transportation services. Various example use cases are described herein.

In an example scenario in which public buses are moving along city routes and/or taxis are performing their private transportation services, the OBU is able to collect large quantities of real-time data from the positioning systems (e.g., GPS, etc.), from accelerometer modules, etc. The OBU may then, for example, communicate such data to the Cloud, where the data may be processed, reported and viewed, for example to support such public or private bus and/or taxi operations, for example supporting efficient remote monitoring and scheduling of buses and taxis, respectively.

In an example implementation, small cameras (or other sensors) may be coupled to small single-board computers (SBCs) that are placed above the doors of public buses to allow capturing image sequences of people entering and leaving buses, and/or on stops along the bus routes in order to estimate the number of people waiting for a bus. Such data may be gathered by the OBU in order to be sent to the Cloud. With such data, public transportation systems may detect peaks; overcrowded buses, routes and stops; underutilized buses, routes and stops; etc., enabling action to be taken in real-time (e.g., reducing bus periodicity to decrease fuel costs and $CO_2$ emissions where and when passenger flows are smaller, etc.) as well as detecting systematic transportation problems.

An OBU may, for example, be operable to communicate with any of a variety of Wi-Fi-enabled sensor devices equipped with a heterogeneous collection of environmental sensors. Such sensors may, for example, comprise noise sensors (microphones, etc.), gas sensors (e.g., sensing CO, $NO_2$, $O_3$, volatile organic compounds (or VOCs), $CO_2$, etc.), smoke sensors, pollution sensors, meteorological sensors (e.g., sensing temperature, humidity, luminosity, particles, solar radiation, wind speed (e.g., anemometer), wind direction, rain (e.g., a pluviometer), optical scanners, biometric scanners, cameras, microphones, etc.). Such sensors may also comprise sensors associated with users (e.g., vehicle operators or passengers, passersby, etc.) and/or their personal devices (e.g., smart phones or watches, biometrics sensors, wearable sensors, implanted sensors, etc.). Such sensors may, for example, comprise sensors and/or systems associated with on-board diagnostic (OBD) units for vehicles, autonomous vehicle driving systems, etc. Such sensors may, for example, comprise positioning sensors (e.g., GPS sensors, Galileo sensors, GLONASS sensors, etc.). Note that such positioning sensors may be part of a vehicle's operational system (e.g., a local human-controlled vehicle, an autonomous vehicle, a remote human-controlled vehicle, etc.) Such sensors may, for example, comprise container sensors (e.g., garbage can sensors, shipping container sensors, container environmental sensors, container tracking sensors, etc.).

Once a vehicle enters the vicinity of such a sensor device, a wireless link may be established, so that the vehicle (or OBU thereof) can collect sensor data from the sensor device and upload the collected data to a database in the Cloud. The appropriate action can then be taken. In an example waste management implementation, several waste management (or collection) trucks may be equipped with OBUs that are able to periodically communicate with sensors installed on containers in order to gather information about waste level, time passed since last collection, etc. Such information may then sent to the Cloud (e.g., to a waste management application coupled to the Internet, etc.) through the vehicular mesh network, in order to improve the scheduling and/or routing of waste management trucks. Note that various sensors may always be in range of the Mobile AP (e.g., vehicle-mounted sensors). Note that the sensor may also (or alternatively) be mobile (e.g., a sensor mounted to another vehicle passing by a Mobile AP or Fixed AP, a drone-mounted sensor, a pedestrian-mounted sensor, etc.).

In an example implementation, for example in a controlled space (e.g., a port, harbor, airport, factory, plantation, mine, etc.) with many vehicles, machines and employees, a communication network in accordance with various aspects of the present disclosure may expand the wireless coverage of enterprise and/or local Wi-Fi networks, for example without resorting to a Telco-dependent solution based on SIM cards or cellular fees. In such an example scenario, apart from avoiding expensive cellular data plans, limited data rate and poor cellular coverage in some places, a communication network in accordance with various aspects of the present disclosure is also able to collect and/or communicate large amounts of data, in a reliable and real-time manner, where such data may be used to optimize harbor logistics, transportation operations, etc.

For example in a port and/or harbor implementation, by gathering real-time information on the position, speed, fuel consumption and $CO_2$ emissions of the vehicles, the communication network allows a port operator to improve the coordination of the ship loading processes and increase the throughput of the harbor. Also for example, the communication network enables remote monitoring of drivers' behaviors, behaviors of autonomous vehicles and/or control systems thereof, trucks' positions and engines' status, and then be able to provide real-time notifications to drivers (e.g., to turn on/off the engine, follow the right route inside the harbor, take a break, etc.), for example human drivers and/or automated vehicle driving systems, thus reducing the number and duration of the harbor services and trips. Harbor authorities may, for example, quickly detect malfunctioning trucks and abnormal trucks' circulation, thus avoiding accidents in order to increase harbor efficiency, security, and safety. Additionally, the vehicles can also connect to Wi-Fi access points from harbor local operators, and provide Wi-Fi Internet access to vehicles' occupants and surrounding harbor employees, for example allowing pilots to save time by filing reports via the Internet while still on the water.

FIG. 1 shows a block diagram of a communication network 100, in accordance with various aspects of this disclosure. Any or all of the functionality discussed herein may be performed by any or all of the example components of the example network 100. Also, the example network 100 may, for example, share any or all characteristics with the other example networks and/or network components 200, 300, 400, 500-570, and 600, discussed herein.

The example network 100, for example, comprises a Cloud that may, for example comprise any of a variety of network level components. The Cloud may, for example, comprise any of a variety of server systems executing applications that monitor and/or control components of the network 100. Such applications may also, for example, manage the collection of information from any of a large array of networked information sources, many examples of which are discussed herein. The Cloud (or a portion thereof) may also be referred to, at times, as an API. For example, Cloud (or a portion thereof) may provide one or more application programming interfaces (APIs) which other devices may use for communicating/interacting with the Cloud.

An example component of the Cloud may, for example, manage interoperability with various multi-cloud systems and architectures. Another example component (e.g., a Cloud service component) may, for example, provide various cloud services (e.g., captive portal services, authentication, authorization, and accounting (AAA) services, API Gateway services, etc.). An additional example component (e.g., a DevCenter component) may, for example, provide network monitoring and/or management functionality, manage the implementation of software updates, etc. A further example component of the Cloud may manage data storage, data analytics, data access, etc. A still further example component of the Cloud may include any of a variety of third-partly applications and services.

The Cloud may, for example, be coupled to the Backbone/Core Infrastructure of the example network 100 via the Internet (e.g., utilizing one or more Internet Service Providers). Though the Internet is provided by example, it should be understood that scope of the present disclosure is not limited thereto.

The Backbone/Core may, for example, comprise any one or more different communication infrastructure components. For example, one or more providers may provide backbone networks or various components thereof. As shown in the example network 100 illustrated in FIG. 1, a Backbone provider may provide wireline access (e.g., PSTN, fiber, cable, etc.). Also for example, a Backbone provider may provide wireless access (e.g., Microwave, LTE/Cellular, 5G/TV Spectrum, etc.).

The Backbone/Core may also, for example, comprise one or more Local Infrastructure Providers. The Backbone/Core may also, for example, comprise a private infrastructure (e.g., run by the network 100 implementer, owner, etc.). The Backbone/Core may, for example, provide any of a variety of Backbone Services (e.g., AAA, Mobility, Monitoring, Addressing, Routing, Content services, Gateway Control services, etc.).

The Backbone/Core Infrastructure may comprise any of a variety of characteristics, non-limiting examples of which are provided herein. For example, the Backbone/Core may be compatible with different wireless or wired technologies for backbone access. The Backbone/Core may also be adaptable to handle public (e.g., municipal, city, campus, etc.) and/or private (e.g., ports, campus, etc.) network infrastructures owned by different local providers, and/or owned by the network implementer or stakeholder. The Backbone/Core may, for example, comprise and/or interface with different Authentication, Authorization, and Accounting (AAA) mechanisms.

The Backbone/Core Infrastructure may, for example, support different modes of operation (e.g., L2 in port implementations, L3 in on-land public transportation implementations, utilizing any one or more of a plurality of different layers of digital IP networking, any combinations thereof, equivalents thereof, etc.) or addressing pools. The Backbone/Core may also for example, be agnostic to the Cloud provider(s) and/or Internet Service Provider(s). Additionally for example, the Backbone/Core may be agnostic to requests coming from any or all subsystems of the network 100 (e.g., Mobile APs or OBUs (On Board Units), Fixed APs or RSUs (Road Side Units), MCs (Mobility Controllers) or LMAs (Local Mobility Anchors) or Network Controllers, etc.) and/or third-party systems.

The Backbone/Core Infrastructure may, for example, comprise the ability to utilize and/or interface with different data storage/processing systems (e.g., MongoDB, MySql, Redis, etc.). The Backbone/Core Infrastructure may further, for example, provide different levels of simultaneous access to the infrastructure, services, data, etc.

Figure 2:
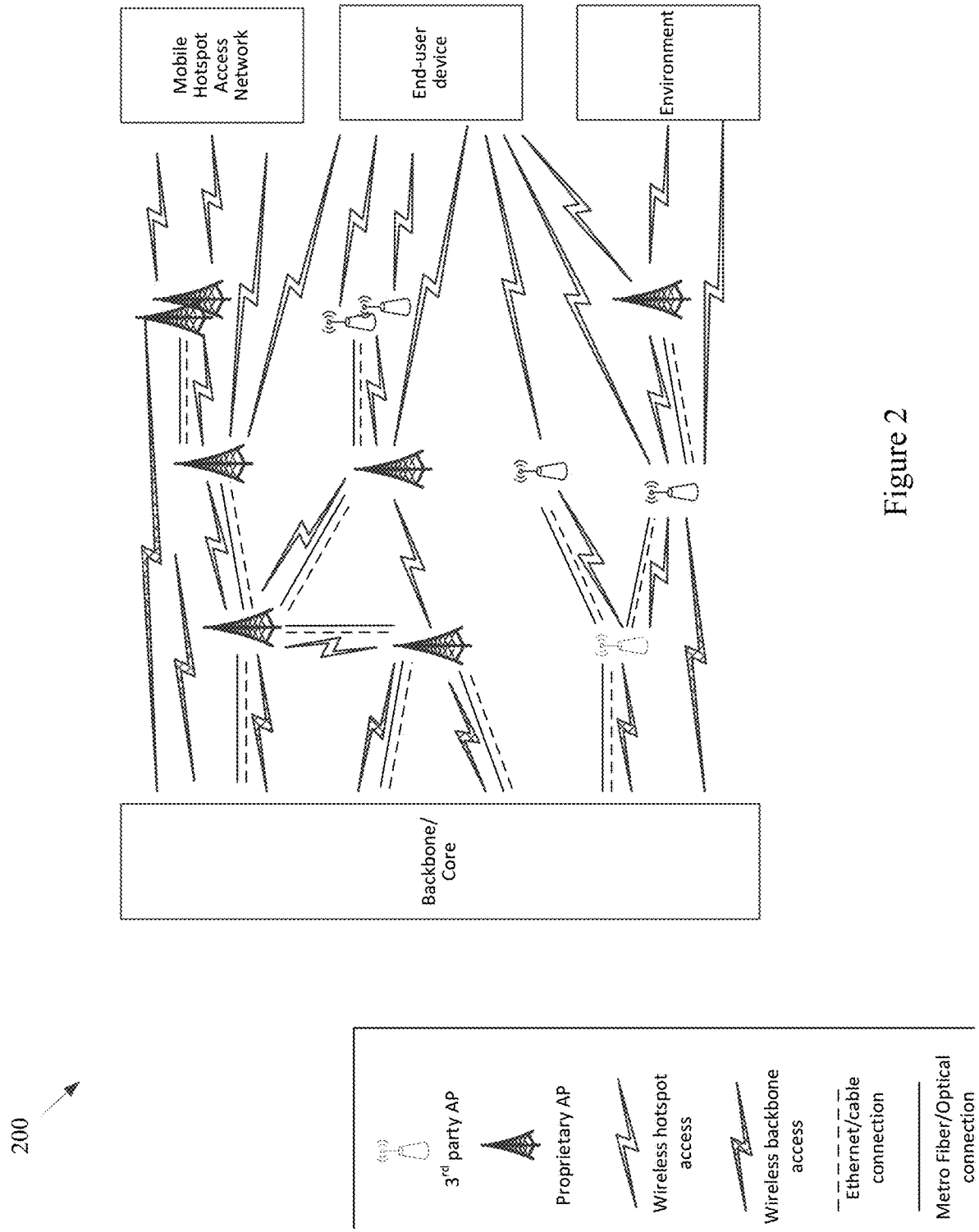
FIG. 2 shows a block diagram of a communication network, in accordance with various aspects of this disclosure.

The example network 100 may also, for example, comprise a Fixed Hotspot Access Network. Various example characteristics of such a Fixed Hotspot Access Network 200 are shown at FIG. 2. The example network 200 may, for example, share any or all characteristics with the other example networks and/or network components 100, 300, 400, 500-570, and 600, discussed herein.

In the example network 200, the Fixed APs (e.g., the proprietary APs, the public third party APs, the private third party APs, etc.) may be directly connected to the local infrastructure provider and/or to the wireline/wireless backbone. Also for example, the example network 200 may comprise a mesh between the various APs via wireless technologies. Note, however, that various wired technologies may also be utilized depending on the implementation. As shown, different fixed hotspot access networks can be connected to a same backbone provider, but may also be connected to different respective backbone providers. In an example implementation utilizing wireless technology for backbone access, such an implementation may be relatively fault tolerant. For example, a Fixed AP may utilize wireless communications to the backbone network (e.g., cellular, 3G, LTE, other wide or metropolitan area networks, etc.) if the backhaul infrastructure is down. Also for example, such an implementation may provide for relatively easy installation (e.g., a Fixed AP with no cable power source that can be placed virtually anywhere).

In the example network 200, the same Fixed AP can simultaneously provide access to multiple Fixed APs, Mobile APs (e.g., vehicle OBUs, etc.), devices, user devices, sensors, things, etc. For example, a plurality of mobile hotspot access networks (e.g., OBU-based networks, etc.) may utilize the same Fixed AP. Also for example, the same Fixed AP can provide a plurality of simultaneous accesses to another single unit (e.g., another Fixed AP, Mobile AP, device, etc.), for example utilizing different channels, different radios, etc.).

Note that a plurality of Fixed APs may be utilized for fault-tolerance/fail-recovery purposes. In an example implementation, a Fixed AP and its fail-over AP may both be normally operational (e.g., in a same switch). Also for example, one or more Fixed APs may be placed in the network at various locations in an inactive or monitoring mode, and ready to become operational when needed (e.g., in response to a fault, in response to an emergency services need, in response to a data surge, etc.).

Referring back to FIG. 1, the example Fixed Hotspot Access Network is shown with a wireless communication link to a backbone provider (e.g., to one or more Backbone Providers and/or Local Infrastructure Providers), to a Mobile Hotspot Access Network, to one or more End User Devices, and to the Environment. Also, the example Fixed Hotspot Access Network is shown with a wired communication link to one or more Backbone Providers, to the Mobile Hotspot Access Network, to one or more End User Devices, and to the Environment. The Environment may comprise any of a variety of devices (e.g., in-vehicle networks, devices, and sensors; autonomous vehicle networks, devices, and sensors; maritime (or watercraft) and port networks, devices, and sensors; general controlled-space networks, devices, and sensors; residential networks, devices, and sensors; disaster recovery & emergency networks, devices, and sensors; military and aircraft networks, devices, and sensors; smart city networks, devices, and sensors; event (or venue) networks, devices, and sensors; underwater and underground networks, devices, and sensors; agricultural networks, devices, and sensors; tunnel (auto, subway, train, etc.) networks, devices, and sensors; parking networks, devices, and sensors; security and surveillance networks, devices, and sensors; shipping equipment and container networks, devices, and sensors; environmental control or monitoring networks, devices, and sensors; municipal networks, devices, and sensors; waste management networks, devices, and sensors, road maintenance networks, devices, and sensors, traffic management networks, devices, and sensors; advertising networks, devices and sensors; etc.).

Figure 3:
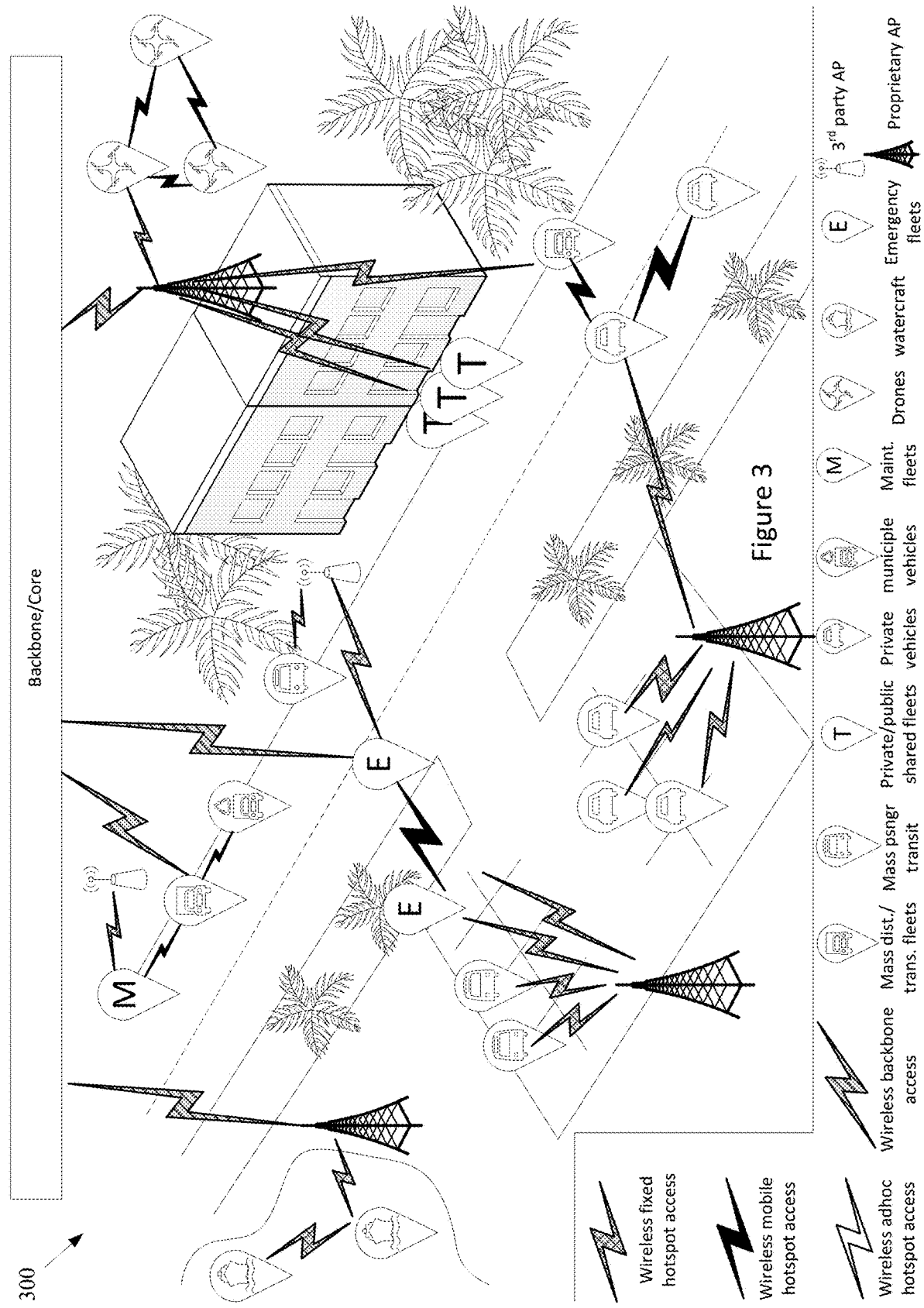
FIG. 3 shows a diagram of a metropolitan area network, in accordance with various aspects of this disclosure.

The example network 100 of FIG. 1 also comprises a Mobile Hotspot Access Network. Various example characteristics of such a Mobile Hotspot Access Network 300 are shown at FIG. 3. Note that various fixed network components (e.g., Fixed APs) are also illustrated. The example network 300 may, for example, share any or all characteristics with the other example networks and/or network components 100, 200, 400, 500-570, and 600 discussed herein.

The example network 300 comprises a wide variety of Mobile APs (or hotspots) that provide access to user devices, provide for sensor data collection, provide multi-hop connectivity to other Mobile APs, etc. For example, the example network 300 comprises vehicles from different fleets (e.g., aerial, terrestrial, underground, (under)water, etc.). For example, the example network 300 comprises one or more mass distribution/transportation fleets, one or more mass passenger transportation fleets, private/public shared-user fleets, private vehicles, urban and municipal fleets, maintenance fleets, drones, watercraft (e.g., boats, ships, speedboats, tugboats, barges, etc.), emergency fleets (e.g., police, ambulance, firefighter, etc.), etc.

The example network 300, for example, shows vehicles from different fleets directly connected and/or mesh connected, for example using same or different communication technologies. The example network 300 also shows fleets simultaneously connected to different Fixed APs, which may or may not belong to different respective local infrastructure providers. As a fault-tolerance mechanism, the example network 300 may for example comprise the utilization of long-range wireless communication network (e.g., cellular, 3G, 4G, LTE, etc.) in vehicles if the local network infrastructure is down or otherwise unavailable. A same vehicle (e.g., Mobile AP or OBU) can simultaneously provide access to multiple vehicles, devices, things, etc., for example using a same communication technology (e.g., shared channels and/or different respective channels thereof) and/or using a different respective communication technology for each. Also for example, a same vehicle can provide multiple accesses to another vehicle, device, thing, etc., for example using a same communication technology (e.g., shared channels and/or different respective channels thereof, and/or using a different communication technology).

Additionally, multiple network elements may be connected together to provide for fault-tolerance or fail recovery, increased throughput, or to achieve any or a variety of a client's networking needs, many of examples of which are provided herein. For example, two Mobile APs (or OBUs) may be installed in a same vehicle, etc.

Referring back to FIG. 1, the example Mobile Hotspot Access Network is shown with a wireless communication link to a backbone provider (e.g., to one or more Backbone Providers and/or Local Infrastructure Providers), to a Fixed Hotspot Access Network, to one or more End User Device, and to the Environment (e.g., to any one of more of the sensors or systems discussed herein, any other device or machine, etc.). Though the Mobile Hotspot Access Network is not shown having a wired link to the various other components, there may (at least at times) be such a wired link, at least temporarily.

Figure 4:
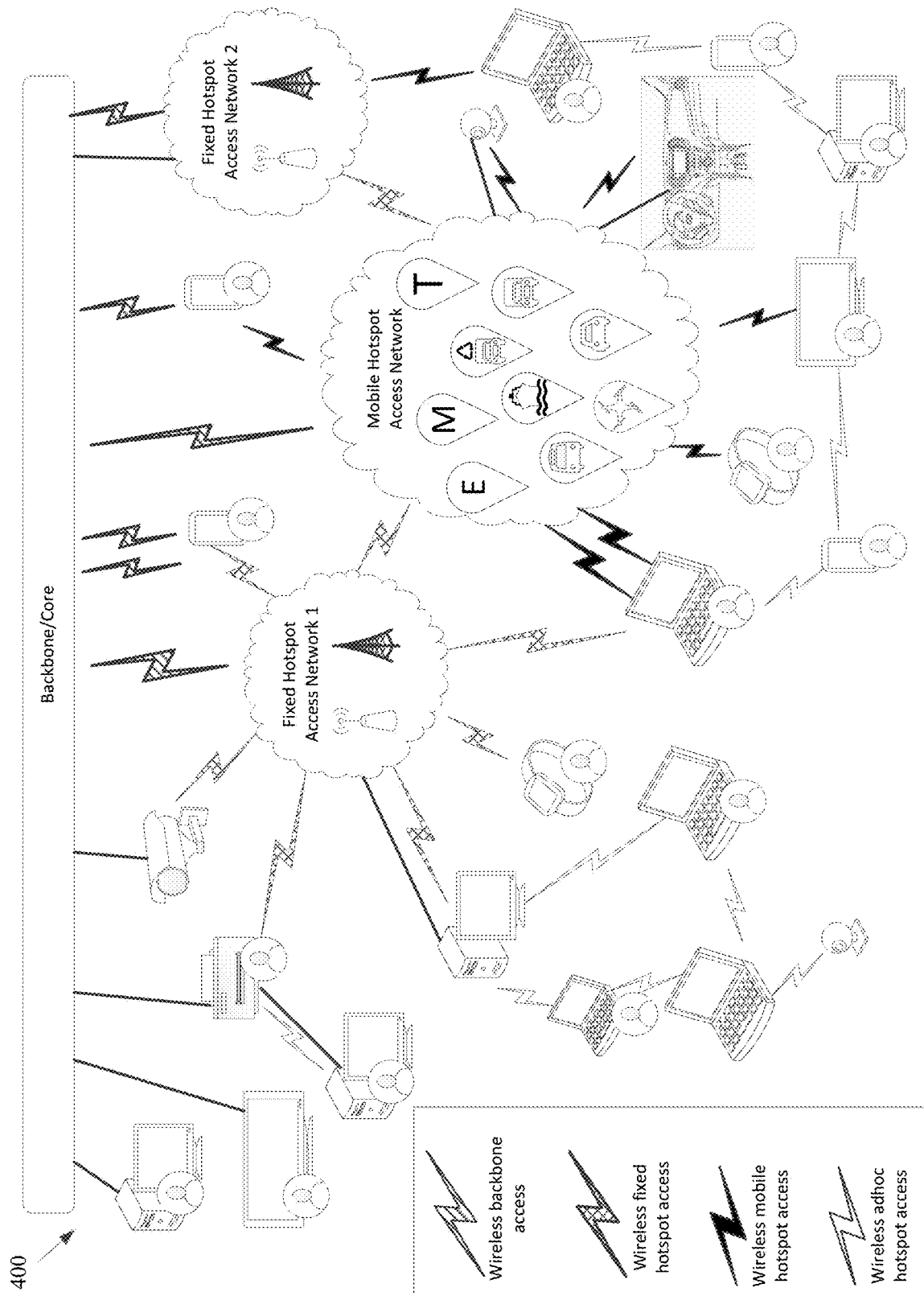
FIG. 4 shows a block diagram of a communication network, in accordance with various aspects of this disclosure.

The example network 100 of FIG. 1 also comprises a set of End-User Devices. Various example end user devices are shown at FIG. 4. Note that various other network components (e.g., Fixed Hotspot Access Networks, Mobile Hotspot Access Network(s), the Backbone/Core, etc.) are also illustrated. The example network 400 may, for example, share any or all characteristics with the other example networks and/or network components 100, 200, 300, 500-570, and 600, discussed herein.

The example network 400 shows various mobile networked devices. Such network devices may comprise end-user devices (e.g., smartphones, tablets, smartwatches, laptop computers, webcams, personal gaming devices, personal navigation devices, personal media devices, personal cameras, health-monitoring devices, personal location devices, monitoring panels, printers, etc.). Such networked devices may also comprise any of a variety of devices operating in the general environment, where such devices might not for example be associated with a particular user (e.g. any or all of the sensor devices discussed herein, vehicle sensors, municipal sensors, fleet sensors road sensors, environmental sensors, security sensors, traffic sensors, waste sensors, meteorological sensors, any of a variety of different types of municipal or enterprise equipment, etc.). Any of such networked devices can be flexibly connected to distinct backbone, fixed hotspot access networks, mobile hotspot access networks, etc., using the same or different wired/wireless technologies.

A mobile device may, for example, operate as an AP to provide simultaneous access to multiple devices/things, which may then form ad hoc networks, interconnecting devices ultimately connected to distinct backbone networks, fixed hotspot, and/or mobile hotspot access networks. Devices (e.g., any or all of the devices or network nodes discussed herein) may, for example, have redundant technologies to access distinct backbone, fixed hotspot, and/or mobile hotspot access networks, for example for fault-tolerance and/or load-balancing purposes (e.g., utilizing multiple SIM cards, etc.). A device may also, for example, simultaneously access distinct backbone, fixed hotspot access networks, and/or mobile hotspot access networks, belonging to the same provider or to different respective providers. Additionally for example, a device can provide multiple accesses to another device/thing (e.g., via different channels, radios, etc.).

Referring back to FIG. 1, the example End-User Devices are shown with a wireless communication link to a backbone provider (e.g., to one or more Backbone Providers and/or Local Infrastructure Providers), to a Fixed Hotspot Access Network, to a Mobile Hotspot Access Network, and to the Environment. Also for example, the example End-User Devices are shown with a wired communication link to a backbone provider, to a Fixed Hotspot Access Network, to a Mobile Hotspot Access Network, and to the Environment.

Figure 5A:
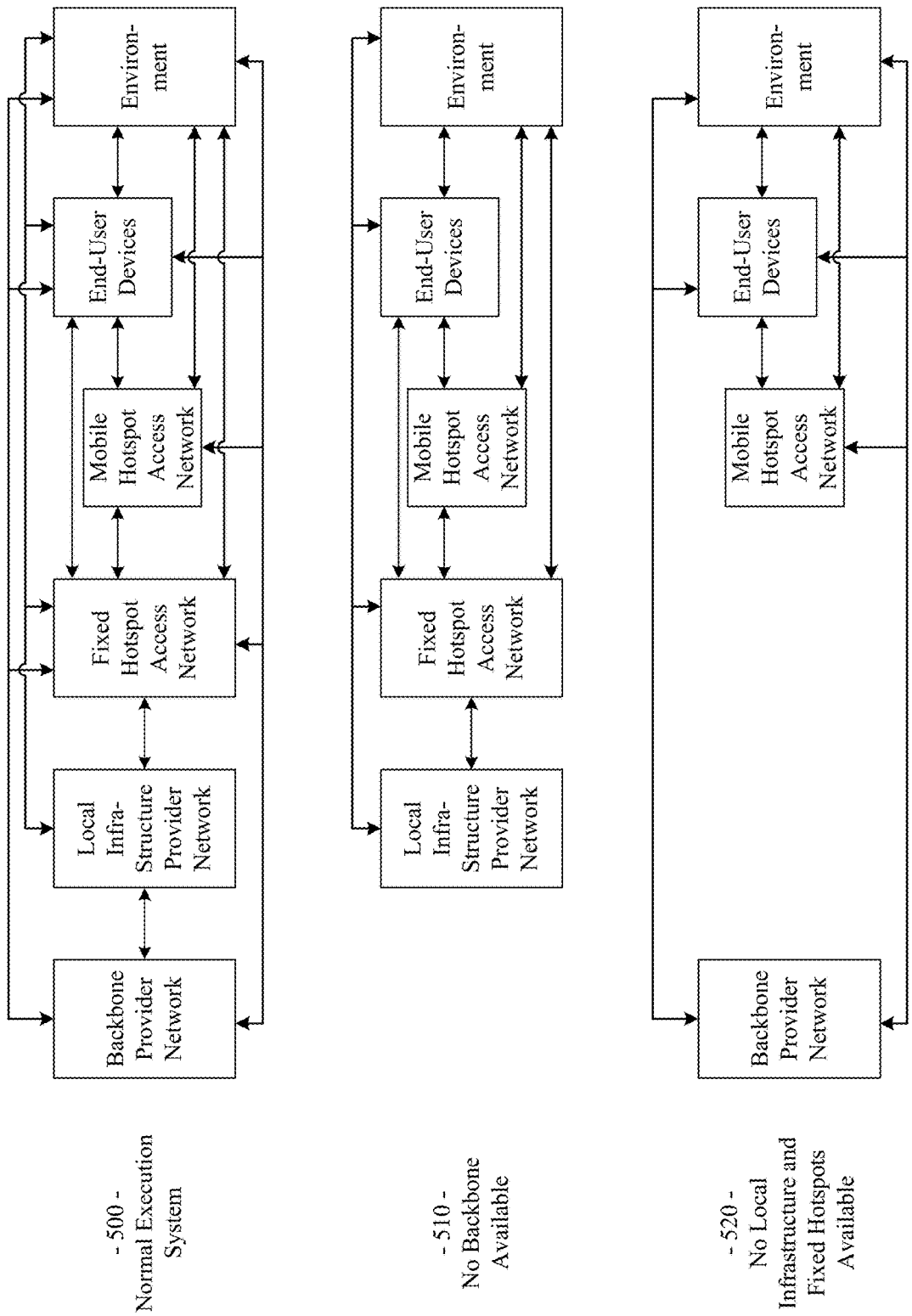
FIGS. 5A-5C show a plurality of network configurations illustrating the flexibility and/or and resiliency of a communication network, in accordance with various aspects of this disclosure.
Figure 5B:
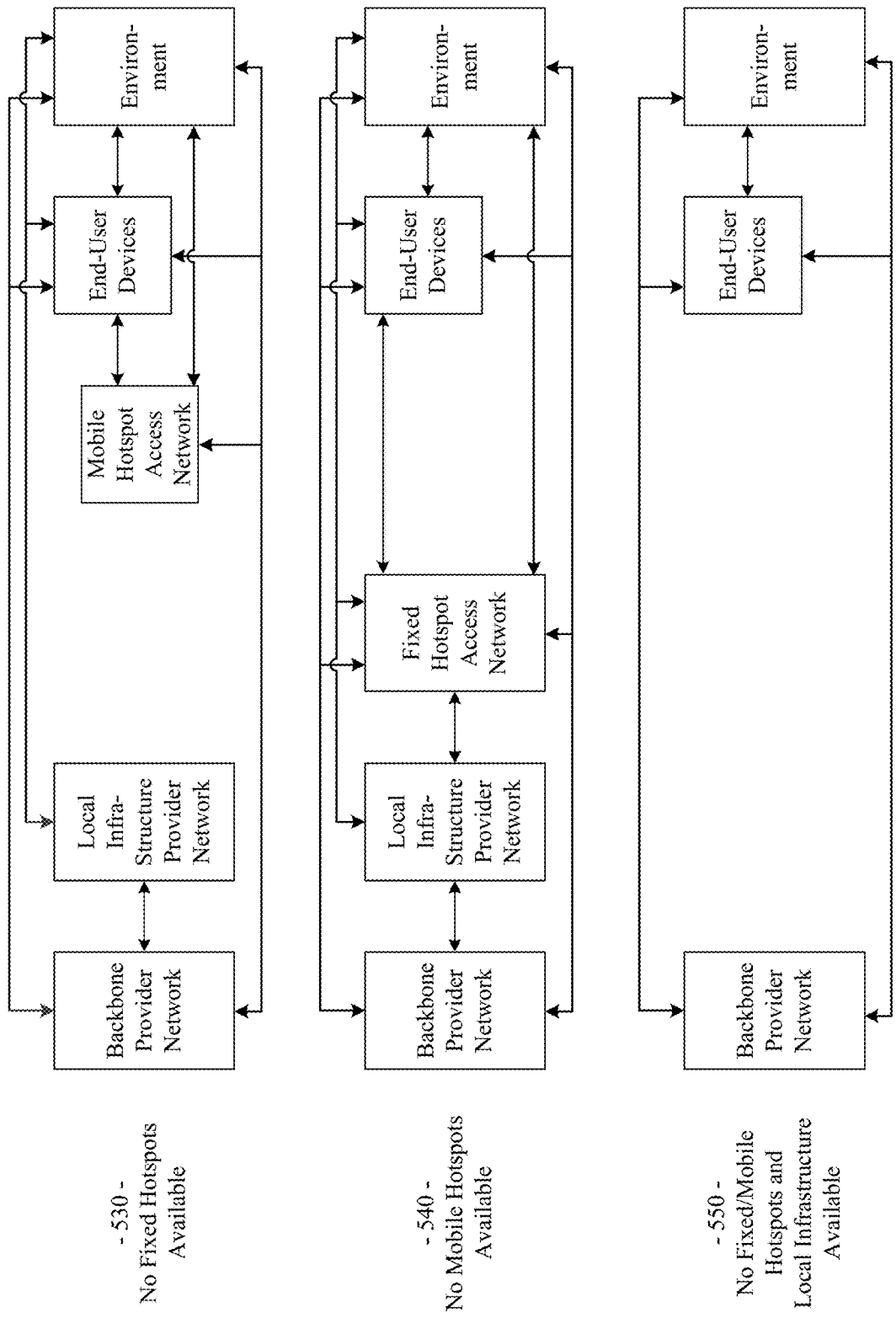
Figure 5C:
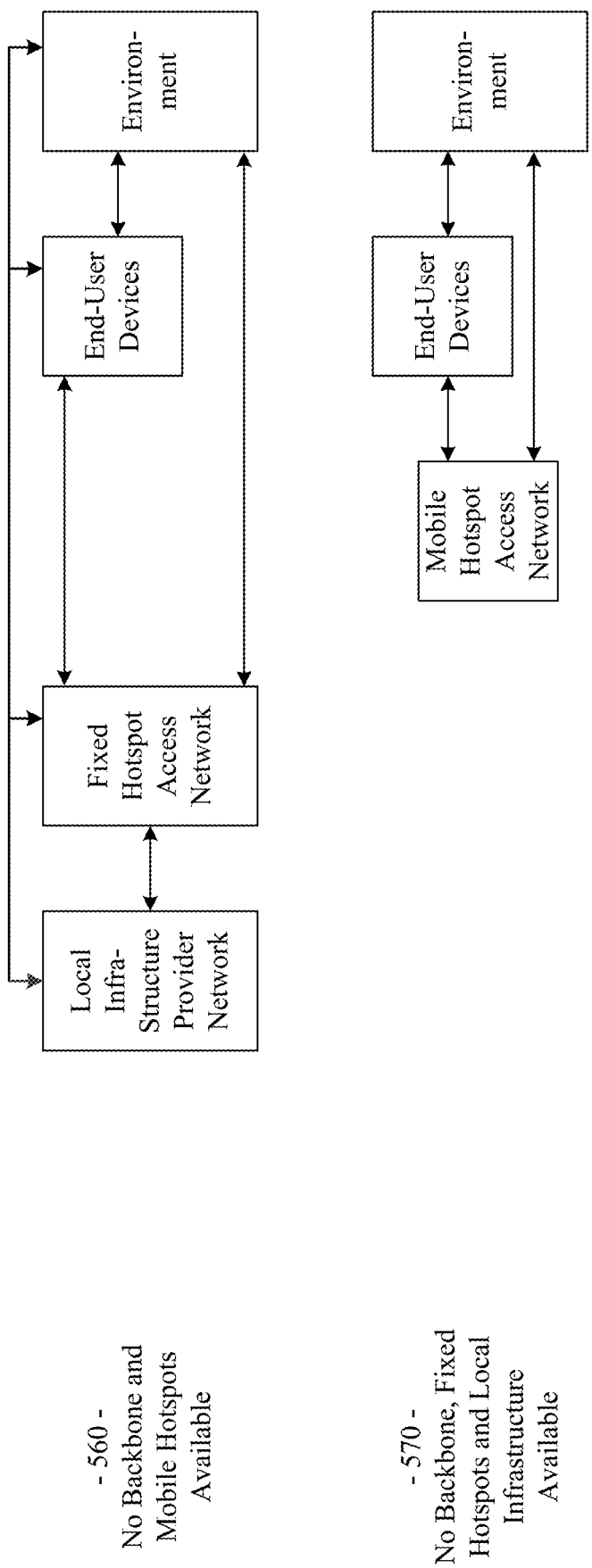

The example network 100 illustrated in FIG. 1 has a flexible architecture that is adaptable at implementation time (e.g., for different use cases) and/or adaptable in real-time, for example as network components enter and leave service. FIGS. 5A-5C illustrate such flexibility by providing example modes (or configurations). The example networks 500-570 may, for example, share any or all characteristics with the other example networks and/or network components 100, 200, 300, 400, and 600, discussed herein. For example and without limitation, any or all of the communication links (e.g., wired links, wireless links, etc.) shown in the example networks 500-570 are generally analogous to similarly positioned communication links shown in the example network 100 of FIG. 1.

For example, various aspects of this disclosure provide communication network architectures, systems, and methods for supporting a dynamically configurable communication network comprising a complex array of both static and moving communication nodes (e.g., the Internet of moving things). For example, a communication network implemented in accordance with various aspects of the present disclosure may operate in one of a plurality of modalities comprising various fixed nodes, mobile nodes, and/or a combination thereof, which are selectable to yield any of a variety of system goals (e.g., increased throughput, reduced latency and packet loss, increased availability and robustness of the system, extra redundancy, increased responsiveness, increased security in the transmission of data and/or control packets, reduced number of configuration changes by incorporating smart thresholds (e.g., change of technology, change of certificate, change of IP, etc.), providing connectivity in dead zones or zones with difficult access, reducing the costs for maintenance and accessing the equipment for updating/upgrading, etc.). At least some of such modalities may, for example, be entirely comprised of fixed-position nodes, at least temporarily if not permanently.

For illustrative simplicity, many of the example aspects shown in the example system or network 100 of FIG. 1 (and other Figures herein) are omitted from FIGS. 5A-5C, but may be present. For example, the Cloud, Internet, and ISP aspects shown in FIG. 1 and in other Figures are not explicitly shown in FIGS. 5A-5C, but may be present in any of the example configurations (e.g., as part of the backbone provider network or coupled thereto, as part of the local infrastructure provider network or coupled thereto, etc.).

For example, the first example mode 500 is presented as a normal execution mode, for example a mode (or configuration) in which all of the components discussed herein are present. For example, the communication system in the first example mode 500 comprises a backbone provider network, a local infrastructure provider network, a fixed hotspot access network, a mobile hotspot access network, end-user devices, and environment devices.

As shown in FIG. 5A, and in FIG. 1 in more detail, the backbone provider network may be communicatively coupled to any or all of the other elements present in the first example mode 500 (or configuration) via one or more wired (or tethered) links. For example, the backbone provider network may be communicatively coupled to the local infrastructure provider network (or any component thereof), fixed hotspot access network (or any component thereof), the end-user devices, and/or environment devices via a wired link. Note that such a wired coupling may be temporary. Also note that in various example configurations, the backbone provider network may also, at least temporarily, be communicatively coupled to the mobile hotspot access network (or any component thereof) via one or more wired (or tethered) links.

Also shown in FIG. 5A, and in FIG. 1 in more detail, the backbone provider network may be communicatively coupled to any or all of the other elements present in the first example mode 500 (or configuration) via one or more wireless links (e.g., RF link, non-tethered optical link, etc.). For example, the backbone provider network may be communicatively coupled to the fixed hotspot access network (or any component thereof), the mobile hotspot access network (or any component thereof), the end-user devices, and/or environment devices via one or more wireless links. Also note that in various example configurations, the backbone provider network may also be communicatively coupled to the local infrastructure provider network via one or more wireless (or non-tethered) links.

Though not shown in the first example mode 500 (or any of the example modes of FIGS. 5A-5C), one or more servers may be communicatively coupled to the backbone provider network and/or the local infrastructure network. FIG. 1 provides an example of cloud servers being communicatively coupled to the backbone provider network via the Internet.

As additionally shown in FIG. 5A, and in FIG. 1 in more detail, the local infrastructure provider network may be communicatively coupled to any or all of the other elements present in the first example mode 500 (or configuration) via one or more wired (or tethered) links. For example, the local infrastructure provider network may be communicatively coupled to the backbone provider network (or any component thereof), fixed hotspot access network (or any component thereof), the end-user devices, and/or environment devices via one or more wired links. Note that such a wired coupling may be temporary. Also note that in various example configurations, the local infrastructure provider network may also, at least temporarily, be communicatively coupled to the mobile hotspot access network (or any component thereof) via one or more wired (or tethered) links.

Also, though not explicitly shown, the local infrastructure provider network may be communicatively coupled to any or all of the other elements present in the first example mode 500 (or configuration) via one or more wireless links (e.g., RF link, non-tethered optical link, etc.). For example, the local infrastructure provider network may be communicatively coupled to the backbone provider network (or any component thereof), the fixed hotspot access network (or any component thereof), the mobile hotspot access network (or any component thereof), the end-user devices, and/or environment devices via one or more wireless links. Note that the communication link shown in the first example mode 500 of FIG. 5A between the local infrastructure provider network and the fixed hotspot access network may be wired and/or wireless.

The fixed hotspot access network is also shown in the first example mode 500 to be communicatively coupled to the mobile hotspot access network, the end-user devices, and/or environment devices via one or more wireless links. Many examples of such wireless coupling are provided herein. Additionally, the mobile hotspot access network is further shown in the first example mode 500 to be communicatively coupled to the end-user devices and/or environment devices via one or more wireless links. Many examples of such wireless coupling are provided herein. Further, the end-user devices are also shown in the first example mode 500 to be communicatively coupled to the environment devices via one or more wireless links. Many examples of such wireless coupling are provided herein. Note that in various example implementations any of such wireless links may instead (or in addition) comprise a wired (or tethered) link.

In the first example mode 500 (e.g., the normal mode), information (or data) may be communicated between an end-user device and a server (e.g., a computer system) via the mobile hotspot access network, the fixed hotspot access network, the local infrastructure provider network, and/or the backbone provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the fixed hotspot access network, the local infrastructure provider network, and/or the backbone provider network (e.g., skipping the mobile hotspot access network). Also for example, information communicated between an end user device and a server may be communicated via the backbone provider network (e.g., skipping the mobile hotspot access network, fixed hotspot access network, and/or local infrastructure provider network).

Similarly, in the first example mode 500 (e.g., the normal mode), information (or data) may be communicated between an environment device and a server via the mobile hotspot access network, the fixed hotspot access network, the local infrastructure provider network, and/or the backbone provider network. Also for example, an environment device may communicate with or through an end-user device (e.g., instead of or in addition to the mobile hotspot access network). As will be seen in the various example modes presented herein, such communication may flexibly occur between an environment device and a server (e.g., communicatively coupled to the local infrastructure provider network and/or backbone provider network) via any of a variety of different communication pathways, for example depending on the availability of a network, depending on bandwidth utilization goals, depending on communication priority, depending on communication time (or latency) and/or reliability constraints, depending on cost, etc.

For example, information communicated between an environment device and a server may be communicated via the fixed hotspot access network, the local infrastructure provider network, and/or the backbone provider network (e.g., skipping the mobile hotspot access network). Also for example, information communicated between an environment device and a server may be communicated via the backbone provider network (e.g., skipping the mobile hotspot access network, fixed hotspot access network, and/or local infrastructure provider network). Additionally for example, information communicated between an environment device and a server may be communicated via the local infrastructure provider network (e.g., skipping the mobile hotspot access network and/or fixed hotspot access network).

As discussed herein, the example networks presented herein are adaptively configurable to operate in any of a variety of different modes (or configurations). Such adaptive configuration may occur at initial installation and/or during subsequent controlled network evolution (e.g., adding or removing any or all of the network components discussed herein, expanding or removing network capacity, adding or removing coverage areas, adding or removing services, etc.). Such adaptive configuration may also occur in real-time, for example in response to real-time changes in network conditions (e.g., networks or components thereof being available or not based on vehicle or user-device movement, network or component failure, network or component replacement or augmentation activity, network overloading, etc.). The following example modes are presented to illustrate characteristics of various modes in which a communication system may operate in accordance with various aspects of the present disclosure. The following example modes will generally be discussed in relation to the first example mode 500 (e.g., the normal execution mode). Note that such example modes are merely illustrative and not limiting.

The second example mode (or configuration) 510 (e.g., a no backbone available mode) may, for example, share any or all characteristics with the first example mode 500, albeit without the backbone provider network and communication links therewith. For example, the communication system in the second example mode 510 comprises a local infrastructure provider network, a fixed hotspot access network, a mobile hotspot access network, end-user devices, and environment devices.

As shown in FIG. 5A, and in FIG. 1 in more detail, the local infrastructure provider network may be communicatively coupled to any or all of the other elements present in the second example mode 510 (or configuration) via one or more wired (or tethered) links. For example, the local infrastructure provider network may be communicatively coupled to the fixed hotspot access network (or any component thereof), the end-user devices, and/or environment devices via one or more wired links. Note that such a wired coupling may be temporary. Also note that in various example configurations, the local infrastructure provider network may also, at least temporarily, be communicatively coupled to the mobile hotspot access network (or any component thereof) via one or more wired (or tethered) links.

Also, though not explicitly shown, the local infrastructure provider network may be communicatively coupled to any or all of the other elements present in the second example mode 510 (or configuration) via one or more wireless links (e.g., RF link, non-tethered optical link, etc.). For example, the local infrastructure provider network may be communicatively coupled to the fixed hotspot access network (or any component thereof), the mobile hotspot access network (or any component thereof), the end-user devices, and/or environment devices via one or more wireless links. Note that the communication link(s) shown in the second example mode 510 of FIG. 5A between the local infrastructure provider network and the fixed hotspot access network may be wired and/or wireless.

The fixed hotspot access network is also shown in the second example mode 510 to be communicatively coupled to the mobile hotspot access network, the end-user devices, and/or environment devices via one or more wireless links. Many examples of such wireless coupling are provided herein. Additionally, the mobile hotspot access network is further shown in the second example mode 510 to be communicatively coupled to the end-user devices and/or environment devices via one or more wireless links. Many examples of such wireless coupling are provided herein. Further, the end-user devices are also shown in the second example mode 510 to be communicatively coupled to the environment devices via one or more wireless links. Many examples of such wireless coupling are provided herein. Note that in various example implementations any of such wireless links may instead (or in addition) comprise a wired (or tethered) link.

In the second example mode 510 (e.g., the no backbone available mode), information (or data) may be communicated between an end-user device and a server (e.g., a computer, etc.) via the mobile hotspot access network, the fixed hotspot access network, and/or the local infrastructure provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the fixed hotspot access network and/or the local infrastructure provider network (e.g., skipping the mobile hotspot access network). Also for example, information communicated between an end user device and a server may be communicated via the local infrastructure provider network (e.g., skipping the mobile hotspot access network and/or fixed hotspot access network).

Similarly, in the second example mode 510 (e.g., the no backbone available mode), information (or data) may be communicated between an environment device and a server via the mobile hotspot access network, the fixed hotspot access network, and/or the local infrastructure provider network. Also for example, an environment device may communicate with or through an end-user device (e.g., instead of or in addition to the mobile hotspot access network). As will be seen in the various example modes presented herein, such communication may flexibly occur between an environment device and a server (e.g., communicatively coupled to the local infrastructure provider network) via any of a variety of different communication pathways, for example depending on the availability of a network, depending on bandwidth utilization goals, depending on communication priority, depending on communication time (or latency) and/or reliability constraints, depending on cost, etc.

For example, information communicated between an environment device and a server may be communicated via the fixed hotspot access network and/or the local infrastructure provider network (e.g., skipping the mobile hotspot access network). Also for example, information communicated between an environment device and a server may be communicated via the local infrastructure provider network (e.g., skipping the mobile hotspot access network and/or fixed hotspot access network).

The second example mode 510 may be utilized for any of a variety of reasons, non-limiting examples of which are provided herein. For example, due to security and/or privacy goals, the second example mode 510 may be utilized so that communication access to the public Cloud systems, the Internet in general, etc., is not allowed. For example, all network control and management functions may be within the local infrastructure provider network (e.g., wired local network, etc.) and/or the fixed access point network.

In an example implementation, the communication system might be totally owned, operated and/or controlled by a local port authority. No extra expenses associated with cellular connections need be spent. For example, cellular connection capability (e.g., in Mobile APs, Fixed APs, end user devices, environment devices, etc.) need not be provided. Note also that the second example mode 510 may be utilized in a scenario in which the backbone provider network is normally available but is currently unavailable (e.g., due to server failure, due to communication link failure, due to power outage, due to a temporary denial of service, etc.).

The third example mode (or configuration) 520 (e.g., a no local infrastructure and fixed hotspots available mode) may, for example, share any or all characteristics with the first example mode 500, albeit without the local infrastructure provider network, the fixed hotspot access network, and communication links therewith. For example, the communication system in the third example mode 520 comprises a backbone provider network, a mobile hotspot access network, end-user devices, and environment devices.

As shown in FIG. 5A, and in FIG. 1 in more detail, the backbone provider network may be communicatively coupled to any or all of the other elements present in the third example mode 520 (or configuration) via one or more wired (or tethered) links. For example, the backbone provider network may be communicatively coupled to the end-user devices and/or environment devices via one or more wired links. Note that such a wired coupling may be temporary. Also note that in various example configurations, the backbone provider network may also, at least temporarily, be communicatively coupled to the mobile hotspot access network (or any component thereof) via one or more wired (or tethered) links.

Also shown in FIG. 5A, and in FIG. 1 in more detail, the backbone provider network may be communicatively coupled to any or all of the other elements present in the third example mode 520 (or configuration) via one or more wireless links (e.g., RF link, non-tethered optical link, etc.). For example, the backbone provider network may be communicatively coupled to the mobile hotspot access network (or any component thereof), the end-user devices, and/or environment devices via one or more wireless links.

The mobile hotspot access network is further shown in the third example mode 520 to be communicatively coupled to the end-user devices and/or environment devices via one or more wireless links. Many examples of such wireless coupling are provided herein. Further, the end-user devices are also shown in the third example mode 520 to be communicatively coupled to the environment devices via one or more wireless links. Many examples of such wireless coupling are provided herein. Note that in various example implementations any of such wireless links may instead (or in addition) comprise a wired (or tethered) link.

In the third example mode 520 (e.g., the no local infrastructure and fixed hotspots available mode), information (or data) may be communicated between an end-user device and a server (e.g., a computer, etc.) via the mobile hotspot access network and/or the backbone provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the backbone provider network (e.g., skipping the mobile hotspot access network).

Similarly, in the third example mode 520 (e.g., the no local infrastructure and fixed hotspots available mode), information (or data) may be communicated between an environment device and a server via the mobile hotspot access network and/or the backbone provider network. Also for example, an environment device may communicate with or through an end-user device (e.g., instead of or in addition to the mobile hotspot access network). As will be seen in the various example modes presented herein, such communication may flexibly occur between an environment device and a server (e.g., communicatively coupled to the backbone provider network) via any of a variety of different communication pathways, for example depending on the availability of a network, depending on bandwidth utilization goals, depending on communication priority, depending on communication time (or latency) and/or reliability constraints, depending on cost, etc. For example, information communicated between an environment device and a server may be communicated via the backbone provider network (e.g., skipping the mobile hotspot access network).

In the third example mode 520, all control/management functions may for example be implemented within the Cloud. For example, since the mobile hotspot access network does not have a communication link via a fixed hotspot access network, the Mobile APs may utilize a direct connection (e.g., a cellular connection) with the backbone provider network (or Cloud). If a Mobile AP does not have such capability, the Mobile AP may also, for example, utilize data access provided by the end-user devices communicatively coupled thereto (e.g., leveraging the data plans of the end-user devices).

The third example mode 520 may be utilized for any of a variety of reasons, non-limiting examples of which are provided herein. In an example implementation, the third example mode 520 may be utilized in an early stage of a larger deployment, for example deployment that will grow into another mode (e.g., the example first mode 500, example fourth mode 530, etc.) as more communication system equipment is installed. Note also that the third example mode 520 may be utilized in a scenario in which the local infrastructure provider network and fixed hotspot access network are normally available but are currently unavailable (e.g., due to equipment failure, due to communication link failure, due to power outage, due to a temporary denial of service, etc.).

The fourth example mode (or configuration) 530 (e.g., a no fixed hotspots available mode) may, for example, share any or all characteristics with the first example mode 500, albeit without the fixed hotspot access network and communication links therewith. For example, the communication system in the fourth example mode 530 comprises a backbone provider network, a local infrastructure provider network, a mobile hotspot access network, end-user devices, and environment devices.

As shown in FIG. 5B, and in FIG. 1 in more detail, the backbone provider network may be communicatively coupled to any or all of the other elements present in the fourth example mode 530 (or configuration) via one or more wired (or tethered) links. For example, the backbone provider network may be communicatively coupled to the local infrastructure provider network (or any component thereof), the end-user devices, and/or environment devices via one or more wired links. Note that such a wired coupling may be temporary. Also note that in various example configurations, the backbone provider network may also, at least temporarily, be communicatively coupled to the mobile hotspot access network (or any component thereof) via one or more wired (or tethered) links.

Also shown in FIG. 5B, and in FIG. 1 in more detail, the backbone provider network may be communicatively coupled to any or all of the other elements present in the fourth example mode 530 (or configuration) via one or more wireless links (e.g., RF link, non-tethered optical link, etc.). For example, the backbone provider network may be communicatively coupled to the mobile hotspot access network (or any component thereof), the end-user devices, and/or environment devices via one or more wireless links. Also note that in various example configurations, the backbone provider network may also be communicatively coupled to the local infrastructure provider network via one or more wireless (or non-tethered) links.

As additionally shown in FIG. 5B, and in FIG. 1 in more detail, the local infrastructure provider network may be communicatively coupled to any or all of the other elements present in the fourth example mode 530 (or configuration) via one or more wired (or tethered) links. For example, the local infrastructure provider network may be communicatively coupled to the backbone provider network (or any component thereof), the end-user devices, and/or environment devices via one or more wired links. Note that such a wired coupling may be temporary. Also note that in various example configurations, the local infrastructure provider network may also, at least temporarily, be communicatively coupled to the mobile hotspot access network (or any component thereof) via one or more wired (or tethered) links.

Also, though not explicitly shown, the local infrastructure provider network may be communicatively coupled to any or all of the other elements present in the fourth example mode 530 (or configuration) via one or more wireless links (e.g., RF link, non-tethered optical link, etc.). For example, the local infrastructure provider network may be communicatively coupled to the backbone provider network (or any component thereof), the mobile hotspot access network (or any component thereof), the end-user devices, and/or environment devices via one or more wireless links.

The mobile hotspot access network is further shown in the fourth example mode 530 to be communicatively coupled to the end-user devices and/or environment devices via one or more wireless links. Many examples of such wireless coupling are provided herein. Further, the end-user devices are also shown in the fourth example mode 530 to be communicatively coupled to the environment devices via one or more wireless links. Many examples of such wireless coupling are provided herein.

In the fourth example mode 530 (e.g., the no fixed hotspots mode), information (or data) may be communicated between an end-user device and a server via the mobile hotspot access network, the local infrastructure provider network, and/or the backbone provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the local infrastructure provider network and/or the backbone provider network (e.g., skipping the mobile hotspot access network). Also for example, information communicated between an end user device and a server may be communicated via the backbone provider network (e.g., skipping the mobile hotspot access network and/or local infrastructure provider network).

Similarly, in the fourth example mode 530 (e.g., the no fixed hotspots available mode), information (or data) may be communicated between an environment device and a server via the mobile hotspot access network, the local infrastructure provider network, and/or the backbone provider network. Also for example, an environment device may communicate with or through an end-user device (e.g., instead of or in addition to the mobile hotspot access network). As will be seen in the various example modes presented herein, such communication may flexibly occur between an environment device and a server (e.g., communicatively coupled to the local infrastructure provider network and/or backbone provider network) via any of a variety of different communication pathways, for example depending on the availability of a network, depending on bandwidth utilization goals, depending on communication priority, depending on communication time (or latency) and/or reliability constraints, depending on cost, etc.

For example, information communicated between an environment device and a server may be communicated via the local infrastructure provider network and/or the backbone provider network (e.g., skipping the mobile hotspot access network). Also for example, information communicated between an environment device and a server may be communicated via the backbone provider network (e.g., skipping the mobile hotspot access network and/or local infrastructure provider network). Additionally for example, information communicated between an environment device and a server may be communicated via the local infrastructure provider network (e.g., skipping the mobile hotspot access network and/or backbone provider network).

In the fourth example mode 530, in an example implementation, some of the control/management functions may for example be implemented within the local backbone provider network (e.g., within a client premises). For example, communication to the local infrastructure provider may be performed through the backbone provider network (or Cloud). Note that in a scenario in which there is a direct communication pathway between the local infrastructure provider network and the mobile hotspot access network, such communication pathway may be utilized.

For example, since the mobile hotspot access network does not have a communication link via a fixed hotspot access network, the Mobile APs may utilize a direct connection (e.g., a cellular connection) with the backbone provider network (or Cloud). If a Mobile AP does not have such capability, the Mobile AP may also, for example, utilize data access provided by the end-user devices communicatively coupled thereto (e.g., leveraging the data plans of the end-user devices).

The fourth example mode 530 may be utilized for any of a variety of reasons, non-limiting examples of which are provided herein. In an example implementation, the fourth example mode 530 may be utilized in an early stage of a larger deployment, for example a deployment that will grow into another mode (e.g., the example first mode 500, etc.) as more communication system equipment is installed. The fourth example mode 530 may, for example, be utilized in a scenario in which there is no fiber (or other) connection available for Fixed APs (e.g., in a maritime scenario, in a plantation scenario, etc.), or in which a Fixed AP is difficult to access or connect. For example, one or more Mobile APs of the mobile hotspot access network may be used as gateways to reach the Cloud. The fourth example mode 530 may also, for example, be utilized when a vehicle fleet and/or the Mobile APs associated therewith are owned by a first entity and the Fixed APs are owned by another entity, and there is no present agreement for communication between the Mobile APs and the Fixed APs. Note also that the fourth example mode 530 may be utilized in a scenario in which the fixed hotspot access network is normally available but are currently unavailable (e.g., due to equipment failure, due to communication link failure, due to power outage, due to a temporary denial of service, etc.).

The fifth example mode (or configuration) 540 (e.g., a no mobile hotspots available mode) may, for example, share any or all characteristics with the first example mode 500, albeit without the mobile hotspot access network and communication links therewith. For example, the communication system in the fifth example mode 540 comprises a backbone provider network, a local infrastructure provider network, a fixed hotspot access network, end-user devices, and environment devices.

As shown in FIG. 5B, and in FIG. 1 in more detail, the backbone provider network may be communicatively coupled to any or all of the other elements present in the fifth example mode 540 (or configuration) via one or more wired (or tethered) links. For example, the backbone provider network may be communicatively coupled to the local infrastructure provider network (or any component thereof), fixed hotspot access network (or any component thereof), the end-user devices, and/or environment devices via one or more wired links. Note that such a wired coupling may be temporary.

Also shown in FIG. 5B, and in FIG. 1 in more detail, the backbone provider network may be communicatively coupled to any or all of the other elements present in the fifth example mode 540 (or configuration) via one or more wireless links (e.g., RF link, non-tethered optical link, etc.). For example, the backbone provider network may be communicatively coupled to the fixed hotspot access network (or any component thereof), the end-user devices, and/or environment devices via one or more wireless links. Also note that in various example configurations, the backbone provider network may also be communicatively coupled to the local infrastructure provider network via one or more wireless (or non-tethered) links.

As additionally shown in FIG. 5B, and in FIG. 1 in more detail, the local infrastructure provider network may be communicatively coupled to any or all of the other elements present in the fifth example mode 540 (or configuration) via one or more wired (or tethered) links. For example, the local infrastructure provider network may be communicatively coupled to the backbone provider network (or any component thereof), fixed hotspot access network (or any component thereof), the end-user devices, and/or environment devices via one or more wired links. Note that such a wired coupling may be temporary. Also note that in various example configurations, the local infrastructure provider network may also, at least temporarily, be communicatively coupled to the mobile hotspot access network (or any component thereof) via one or more wired (or tethered) links.

Also, though not explicitly shown, the local infrastructure provider network may be communicatively coupled to any or all of the other elements present in the fifth example mode 540 (or configuration) via one or more wireless links (e.g., RF link, non-tethered optical link, etc.). For example, the local infrastructure provider network may be communicatively coupled to the backbone provider network, the fixed hotspot access network (or any component thereof), the end-user devices, and/or environment devices via one or more wireless links. Note that the communication link(s) shown in the fifth example mode 540 of FIG. 5B between the local infrastructure provider network and the fixed hotspot access network may be wired and/or wireless.

The fixed hotspot access network is also shown in the fifth example mode 540 to be communicatively coupled to the end-user devices and/or environment devices via one or more wireless links. Many examples of such wireless coupling are provided herein. Further, the end-user devices are also shown in the fifth example mode 540 to be communicatively coupled to the environment devices via one or more wireless links. Many examples of such wireless coupling are provided herein.

In the fifth example mode 540 (e.g., the no mobile hotspots available mode), information (or data) may be communicated between an end-user device and a server via the fixed hotspot access network, the local infrastructure provider network, and/or the backbone provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the local infrastructure provider network, and/or the backbone provider network (e.g., skipping the fixed hotspot access network). Also for example, information communicated between an end user device and a server may be communicated via the backbone provider network (e.g., skipping the fixed hotspot access network and/or local infrastructure provider network).

Similarly, in the fifth example mode 540 (e.g., the no mobile hotspots available mode), information (or data) may be communicated between an environment device and a server via the fixed hotspot access network, the local infrastructure provider network, and/or the backbone provider network. Also for example, an environment device may communicate with or through an end-user device (e.g., instead of or in addition to the fixed hotspot access network). As will be seen in the various example modes presented herein, such communication may flexibly occur between an environment device and a server (e.g., communicatively coupled to the local infrastructure provider network and/or backbone provider network) via any of a variety of different communication pathways, for example depending on the availability of a network, depending on bandwidth utilization goals, depending on communication priority, depending on communication time (or latency) and/or reliability constraints, depending on cost, etc.

For example, information communicated between an environment device and a server may be communicated via the local infrastructure provider network and/or the backbone provider network (e.g., skipping the fixed hotspot access network). Also for example, information communicated between an environment device and a server may be communicated via the backbone provider network (e.g., skipping the fixed hotspot access network and/or local infrastructure provider network). Additionally for example, information communicated between an environment device and a server may be communicated via the local infrastructure provider network (e.g., skipping the fixed hotspot access network and/or the backbone provider network).

In the fifth example mode 540, in an example implementation, the end-user devices and environment devices may communicate directly to Fixed APs (e.g., utilizing Ethernet, Wi-Fi, etc.). Also for example, the end-user devices and/or environment devices may communicate directly with the backbone provider network (e.g., utilizing cellular connections, etc.).

The fifth example mode 540 may be utilized for any of a variety of reasons, non-limiting examples of which are provided herein. In an example implementation in which end-user devices and/or environment devices may communicate directly with Fixed APs, such communication may be utilized instead of Mobile AP communication. For example, the fixed hotspot access network might provide coverage for all desired areas.

Note also that the fifth example mode 540 may be utilized in a scenario in which the fixed hotspot access network is normally available but is currently unavailable (e.g., due to equipment failure, due to communication link failure, due to power outage, due to a temporary denial of service, etc.).

The sixth example mode (or configuration) 550 (e.g., the no fixed/mobile hotspots and local infrastructure available mode) may, for example, share any or all characteristics with the first example mode 500, albeit without the local infrastructure provider network, fixed hotspot access network, mobile hotspot access network, and communication links therewith. For example, the communication system in the sixth example mode 550 comprises a backbone provider network, end-user devices, and environment devices.

As shown in FIG. 5B, and in FIG. 1 in more detail, the backbone provider network may be communicatively coupled to any or all of the other elements present in the sixth example mode 550 (or configuration) via one or more wired (or tethered) links. For example, the backbone provider network may be communicatively coupled to the end-user devices and/or environment devices via one or more wired links. Note that such a wired coupling may be temporary.

Also shown in FIG. 5B, and in FIG. 1 in more detail, the backbone provider network may be communicatively coupled to any or all of the other elements present in the sixth example mode 550 (or configuration) via one or more wireless links (e.g., RF link, non-tethered optical link, etc.). For example, the backbone provider network may be communicatively coupled to the end-user devices and/or environment devices via one or more wireless links.

The end-user devices are also shown in the sixth example mode 550 to be communicatively coupled to the environment devices via one or more wireless links. Many examples of such wireless coupling are provided herein.

In the sixth example mode 550 (e.g., the no fixed/mobile hotspots and local infrastructure available mode), information (or data) may be communicated between an end-user device and a server via the backbone provider network. Similarly, in the sixth example mode 550 (e.g., the no fixed/mobile hotspots and local infrastructure mode), information (or data) may be communicated between an environment device and a server via the backbone provider network. Also for example, an environment device may communicate with or through an end-user device (e.g., instead of or in addition to the mobile hotspot access network).

The sixth example mode 550 may be utilized for any of a variety of reasons, non-limiting examples of which are provided herein. In an example implementation, for example in which an end-user has not yet subscribed to the communication system, the end-user device may subscribe to the system through a Cloud application and by communicating directly with the backbone provider network (e.g., via cellular link, etc.). The sixth example mode 550 may also, for example, be utilized in rural areas in which Mobile AP presence is sparse, Fixed AP installation is difficult or impractical, etc.

Note also that the sixth example mode 550 may be utilized in a scenario in which the infrastructure provider network, fixed hotspot access network, and/or mobile hotspot access network are normally available but are currently unavailable (e.g., due to equipment failure, due to communication link failure, due to power outage, due to a temporary denial of service, etc.).

The seventh example mode (or configuration) 560 (e.g., the no backbone and mobile hotspots available mode) may, for example, share any or all characteristics with the first example mode 500, albeit without the backbone provider network, mobile hotspot access network, and communication links therewith. For example, the communication system in the seventh example mode 560 comprises a local infrastructure provider network, fixed hotspot access network, end-user devices, and environment devices.

As shown in FIG. 5C, and in FIG. 1 in more detail, the local infrastructure provider network may be communicatively coupled to any or all of the other elements present in the seventh example mode 560 (or configuration) via one or more wired (or tethered) links. For example, the local infrastructure provider network may be communicatively coupled to the fixed hotspot access network (or any component thereof), the end-user devices, and/or environment devices via one or more wired links. Note that such a wired coupling may be temporary.

Also, though not explicitly shown, the local infrastructure provider network may be communicatively coupled to any or all of the other elements present in the seventh example mode 560 (or configuration) via one or more wireless links (e.g., RF link, non-tethered optical link, etc.). For example, the local infrastructure provider network may be communicatively coupled to the fixed hotspot access network (or any component thereof), the end-user devices, and/or environment devices via one or more wireless links. Note that the communication link shown in the seventh example mode 560 of FIG. 5C between the local infrastructure provider network and the fixed hotspot access network may be wired and/or wireless.

The fixed hotspot access network is also shown in the seventh example mode 560 to be communicatively coupled to the end-user devices and/or environment devices via one or more wireless links. Many examples of such wireless coupling are provided herein. Additionally, the end-user devices are also shown in the seventh example mode 560 to be communicatively coupled to the environment devices via one or more wireless links. Many examples of such wireless coupling are provided herein.

In the seventh example mode 560 (e.g., the no backbone and mobile hotspots available mode), information (or data) may be communicated between an end-user device and a server via the fixed hotspot access network and/or the local infrastructure provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the local infrastructure provider network (e.g., skipping the fixed hotspot access network).

Similarly, in the seventh example mode 560 (e.g., the no backbone and mobile hotspots available mode), information (or data) may be communicated between an environment device and a server via the fixed hotspot access network and/or the local infrastructure provider network. Also for example, an environment device may communicate with or through an end-user device (e.g., instead of or in addition to the mobile hotspot access network). As will be seen in the various example modes presented herein, such communication may flexibly occur between an environment device and a server (e.g., communicatively coupled to the local infrastructure provider network) via any of a variety of different communication pathways, for example depending on the availability of a network, depending on bandwidth utilization goals, depending on communication priority, depending on communication time (or latency) and/or reliability constraints, depending on cost, etc. For example, information communicated between an environment device and a server may be communicated via the local infrastructure provider network (e.g., skipping the fixed hotspot access network).

The seventh example mode 560 may be utilized for any of a variety of reasons, non-limiting examples of which are provided herein. In an example controlled space implementation, Cloud access might not be provided (e.g., for security reasons, privacy reasons, etc.), and full (or sufficient) coverage of the coverage area is provided by the fixed hotspot access network, and thus the mobile hotspot access network is not needed. For example, the end-user devices and environment devices may communicate directly (e.g., via Ethernet, Wi-Fi, etc.) with the Fixed APs Note also that the seventh example mode 560 may be utilized in a scenario in which the backbone provider network and/or fixed hotspot access network are normally available but are currently unavailable (e.g., due to equipment failure, due to communication link failure, due to power outage, due to a temporary denial of service, etc.).

The eighth example mode (or configuration) 570 (e.g., the no backbone, fixed hotspots, and local infrastructure available mode) may, for example, share any or all characteristics with the first example mode 500, albeit without the backbone provider network, local infrastructure provider network, fixed hotspot access network, and communication links therewith. For example, the communication system in the eighth example mode 570 comprises a mobile hotspot access network, end-user devices, and environment devices.

As shown in FIG. 5C, and in FIG. 1 in more detail, the mobile hotspot access network is shown in the eighth example mode 570 to be communicatively coupled to the end-user devices and/or environment devices via one or more wireless links. Many examples of such wireless coupling are provided herein. Further, the end-user devices are also shown in the eighth example mode 570 to be communicatively coupled to the environment devices via one or more wireless links. Many examples of such wireless coupling are provided herein.

In the eighth example mode 570 (e.g., the no backbone, fixed hotspots, and local infrastructure available mode), information (or data) might not (at least currently) be communicated between an end-user device and a server (e.g., a coupled to the backbone provider network, local infrastructure provider network, etc.). Similarly, information (or data) might not (at least currently) be communicated between an environment device and a server (e.g., a coupled to the backbone provider network, local infrastructure provider network, etc.). Note that the environment device may communicate with or through an end-user device (e.g., instead of or in addition to the mobile hotspot access network).

The eighth example mode 570 may be utilized for any of a variety of reasons, non-limiting examples of which are provided herein. In an example implementation, the eighth example mode 570 may be utilized for gathering and/or serving data (e.g., in a delay-tolerant networking scenario), providing peer-to-peer communication through the mobile hotspot access network (e.g., between clients of a single Mobile AP, between clients of respective different Mobile APs, etc.), etc. In another example scenario, the eighth example mode 570 may be utilized in a scenario in which vehicle-to-vehicle communications are prioritized above vehicle-to-infrastructure communications. In yet another example scenario, the eighth example mode 570 may be utilized in a scenario in which all infrastructure access is lost (e.g., in tunnels, parking garages, etc.).

Note also that the eighth example mode 570 may be utilized in a scenario in which the backbone provider network, local infrastructure provider network, and/or fixed hotspot access network are normally available but are currently unavailable (e.g., due to equipment failure, due to communication link failure, due to power outage, due to a temporary denial of service, etc.).

As shown and discussed herein, it is beneficial to have a generic platform that allows multi-mode communications of multiple users or machines within different environments, using multiple devices with multiple technologies, connected to multiple moving/static things with multiple technologies, forming wireless (mesh) hotspot networks over different environments, connected to multiple wired/wireless infrastructure/network backbone providers, ultimately connected to the Internet, Cloud or private network infrastructure.

Figure 6:
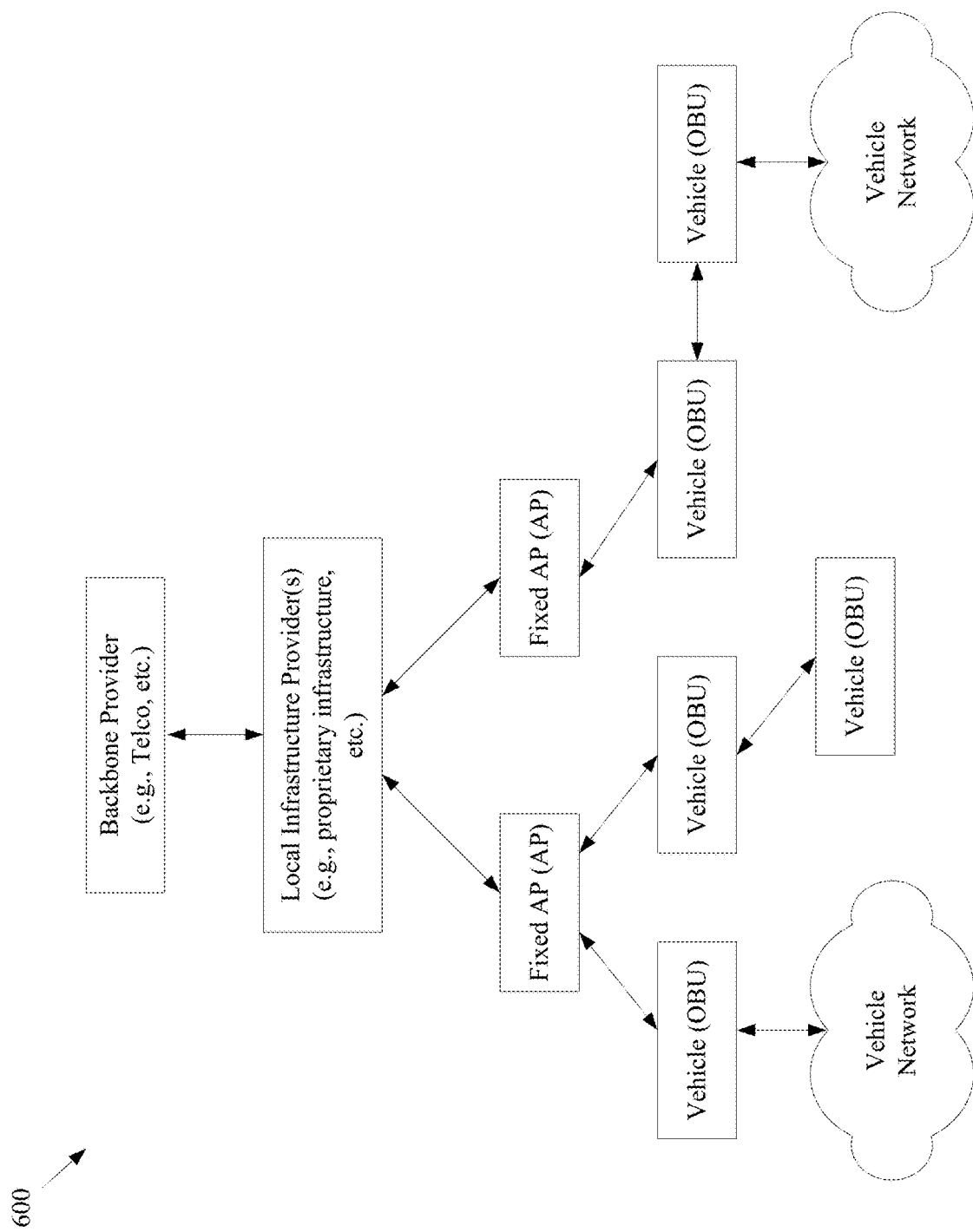
FIG. 6 shows a block diagram of an example communication network, in accordance with various aspects of the present disclosure.

FIG. 6 shows yet another block diagram of an example network configuration, in accordance with various aspects of the present disclosure. The example network 600 may, for example, share any or all characteristics with the other example networks and/or network components 100, 200, 300, 400, and 500-570, discussed herein. Notably, the example network 600 shows a plurality of Mobile APs (or OBUs), each communicatively coupled to a Fixed AP (or RSU), where each Mobile AP may provide network access to a vehicle network (e.g., comprising other vehicles or vehicle networks, user devices, sensor devices, etc.).

In accordance with various aspects of the present disclosure, systems and methods are provided that manage a vehicle communication network, for example in accordance with the location of nodes and end devices, in a way that provides for stable TCP/IP Internet access, among other things. For example, an end user may be provided with a clean and stable Wi-Fi Internet connection that may appear to the end user to be the same as the Wi-Fi Internet connection at the user's home, user's workplace, fixed public Wi-Fi hotspots, etc. For example, for a user utilizing a communication network as described herein, a TCP session may stay active, downloads may process normally, calls may proceed without interruption, etc. As discussed herein, a vehicle communication network in accordance with various aspects of this disclosure may be applied as a transport layer for regular Internet traffic and/or for private network traffic (e.g., extending the access of customer private LANs from the wired network to vehicles and users around them, etc.).

In accordance with an example network implementation, although a user might be always connected to a single Wi-Fi AP of a vehicle, the vehicle (or the access point thereof, for example an OBU) is moving between multiple access points (e.g., Fixed APs, other Mobile APs, cellular base stations, fixed Wi-Fi hotspots, etc.). For example, mobility management implemented in accordance with various aspects of the present disclosure supports the mobility of each vehicle and its users across different communication technologies (e.g., 802.11p, cellular, Wi-Fi, etc.) as the Mobile APs migrate among Fixed APs (and/or Mobile APs) and/or as users migrate between Mobile APs.

In accordance with various aspects of the present disclosure, a mobility controller (MC), which may also be referred to as an LMA or Network Controller, may monitor the location (e.g., network location, etc.) of various nodes (e.g., Mobile APs, etc.) and/or the location of end users connected through them. The mobility controller (MC) may, for example, provide seamless handovers (e.g., maintaining communication session continuity) between different access points and/or different technologies with low link latency and low handover times.

The architecture provided herein is scalable, for example taking advantage of redundant elements and/or functionality to provide load-balancing of control and/or data communication functionality, as well as to decrease failure probability. Various aspects of the present disclosure also provide for decreased control signaling (e.g., in amount and/or frequency), which reduces the control overhead and reduces the size of control tables and tunneling, for example both in backend servers and in APs (e.g., Fixed APs and/or Mobile APs).

Additionally, a communication network (or components thereof) in accordance with various aspects of this disclosure may comprise the ability to interact with mobile devices in order to control some or all of their connection choices and/or to leverage their control functionality. For example, in an example implementation, a mobile application can run in the background, managing the available networks and/or nodes thereof and selecting the one that best fits, and then triggering a handoff to the selected network (or node thereof) before breakdown of the current connection.

The communication network (or components thereof) is also configurable, according to the infrastructure requirements and/or mobility needs of each client, etc. For example, the communication network (or components thereof) may comprise the capability to support different Layer 2 (L2) or Layer 3 (L3) implementations, or combinations thereof, as well as IPv4/IPv6 traffic.

There is an ever growing amount of data generated throughout the huge variety of connected devices in the network of moving things. Aspects of this disclosure provide for cost-effective retention and dissemination of such data through the vehicular network infrastructure, while meeting the QoS needs of the applications/services that use such data. Such applications/services may be located in the Cloud, may be provided by network nodes (e.g., mobile or fixed access points (MAPs or FAPs), or may be run by the end-user devices connected to the APs. As used herein, "data retention and dissemination rules" may be used to govern where (i.e., in which network nodes and/or which storage devices of which network nodes), when (i.e., at what times and/or for how long), and/or how (i.e., in what format or form of organization (e.g., compressed, non-compressed, structured as "objects", unstructured files, etc.), via which type(s) of network communication link(s) (e.g., Wi-Fi (e.g., IEEE 802.11a/b/g/n/ac/ad/ad), cellular (e.g., 3G, 4G, LTE, GSM, CDMA, etc.)) data is: routed, stored, dropped, replicated, shared, prioritized, scheduled, and/or the like, in the upstream and/or downstream directions. As used herein, the term "bundle" may be used to refer to a block/package/unit of data (e.g., comprising one or more fragments of data from one or more files from one or more sources) sent between a first network node and a second network node. A bundle may consist of a single packet (e.g., an IP packet) or may be a set of such packets that belong to the same piece of data. It should be noted that while the length of a packet may, for example, be defined in terms of a Maximum Transfer Unit (MTU) number of bytes (e.g., 1500 bytes in some networks), a bundle may be made up of one or more packets, depending upon the amount of data to be transferred from the sending network node to receiving network node. In accordance with various aspects of the present disclosure, a bundle may be split at the sending node and aggregated again at the receiving node.

The highly mobile and constantly changing nature of mobile APs can make it difficult to communicate large amounts of data to and from the mobile APs in a timely and cost-efficient manner. Accordingly, various aspects of this disclosure enable taking advantage of the intermittent contacts that may occur among mobile APs and between mobile APs and fixed APs, in order to reduce the cost of storing and transferring the data. By taking advantage of aspects of this disclosure, the data can be better balanced among mobile APs, thus reducing the amount of storage capacity required of the mobile APs, while still meeting latency/QoS requirements of the end-users of the data and reducing reliance on expensive (e.g., cellular) data connections. For example, in prior art networks, a mobile AP that does not frequently connect to any fixed APs may be forced to resort to, for example, a cellular data connection to enable the mobile AP to reach a resource or system located in, for example, the Cloud/Internet. Aspects of the present disclosure, however, enables such mobile APs to communicatively couple to other mobile AP(s) that more-frequently connect to one or more fixed AP(s), thus enabling those APs to reach the Internet/Cloud without having to resort to a more costly (e.g., cellular) data connection.

Aspects of this disclosure provide various methods and systems that may be used to optimize (e.g., in terms of overhead such as cellular network usage, amount of network congestion introduced, number of data connections established, etc.) the flow of data between mobile APs both in the upstream and downstream directions.

In an example implementation, a sending node of a network as described herein (e.g., a mobile AP) may broadcast a bundle to be received by one or more neighboring nodes of the network (e.g., MAPs and/or FAPs within communication range of the sending MAP). Each of those neighboring nodes may then decide, based upon context information available to the respective neighboring node, whether or not to store the received bundle, and whether or not to acknowledge the receipt of the bundle to the sending node.

In accordance with aspects of the present disclosure, the sending mobile AP may decide, based on context information available to the sending MAP, whether or not to replicate a bundle to one or more of its neighboring nodes using, for example, unicast messages (addressed to a single receiver), and if so, whether or not to wait for acknowledgement of the unicast message by the neighboring node. Thus, in such an implementation, the decision/knowledge regarding how to handle the bundle is centralized at the sender.

In a network according to aspects of the present disclosure, one or more nodes of the network (e.g., devices such as mobile APs, fixed APs, Delay Tolerant Network/Disruption Tolerant Network (DTN) servers, etc.) may advertise information about one or more bundles that the one or more network nodes are currently storing (e.g., by sending unicast, multicast, and/or broadcast messages into the network). Such advertised information may include, for example, the type of data in the bundle(s), the size of the bundle(s), whether the network node is trying to send the bundle(s), the destination of the bundle(s), etc. Other network nodes receiving such advertisements may then use context information available to the other network nodes to decide whether the other network nodes want/need the bundle(s), and/or whether the other network nodes can accept receipt of the bundle(s) for subsequently forwarding to yet another network node.

In accordance with various aspects of the present disclosure, one or more nodes of the network (e.g., devices such as mobile APs, fixed APs, DTN servers, etc.) may advertise information about one or more bundle(s) that they are currently in need of or want to receive (e.g., by sending unicast, multicast, and/or broadcast messages into the network). Other network nodes receiving such advertisements may then use context information available to the other nodes to decide whether they are in possession of the wanted/desired bundle(s), and, if so, whether the other nodes can and/or should agree to deliver the bundles to the node advertising the need/want.

In a network according to aspects of the present disclosure, network nodes (e.g., mobile APs or other devices) may establish what may be referred to herein as a "control channel" with one or more fixed APs and/or the Cloud, in order to gather context information that may be used in selecting and implementing data dissemination and retention rules.

In a network as described herein, for communication in the "upstream" direction (i.e., in which the Internet/Cloud is the end destination), many or all of the nodes of the network may attempt to send data to the same destination (e.g., DTN server), whereas communication in the "downstream" direction (i.e., from the Internet/Cloud to the APs) may involve the use of "flooding" mechanisms to distribute data to the nodes of the network. Accordingly, in such a network, a first set of one or more data dissemination and retention rules may be used for the "upstream" communication, and a second, possibly different, set of one or more data dissemination and retention rules may be used for "downstream" communications. Such data dissemination and retention rules may be a part of configuration information distributed to the nodes of a network according to the present disclosure. Additional information about the distribution of such configuration information may be found, for example, in U.S. patent application Ser. No. 15/138,370, titled "Systems and Methods for Remote Configuration Update and Distribution in a Network of Moving Things," filed Apr. 26, 2016, the complete subject matter of which is hereby incorporated herein, in its entirety.

In a network according to various aspects of the present disclosure, the context information used by a particular network node at any particular time may comprise, by way of example and not limitation, characteristics of the particular node (e.g., the network or geographic location, speed, direction, path of travel, uptime, hardware configuration, software configuration, and/or the like); characteristics of data to be sent or received by the particular node (e.g., the size, QoS requirements, and/or the like); and/or characteristics of any wireless link(s) available for communicating the data (e.g., maximum available bandwidth, currently available bandwidth, amount of congestion, error rate, etc.). The context information used by the particular network node may also comprise, for example, characteristics of neighbor device(s) such as, for example, the speed, direction, and/or path of travel of each neighbor; the type and/or amount of data storage available on each neighbor; an operator of each neighbor; and/or the like, where the neighbor(s) may comprise one or more mobile APs, fixed APs, cellular base stations, and/or end-user devices. In addition, the context information used by the particular network node may comprise, by way of example and not limitation, characteristics of the environment of the particular network node such as, for example, a number/density of nodes present within a determined region or area surrounding the network node; an amount of wireless interference or activity present in an area around the network node; the presence/size/location/etc. of physical obstructions that may affect the particular network node (e.g., whether line-of-sight vs. non-line-of-sight communication is possible); and/or an expected time until being in-range of a fixed AP, and/or the like).

In accordance with various aspects of the present disclosure, such context information may be provided by, for example, devices in the Internet/Cloud, mobile APs of the vehicular network, fixed APs of the vehicular network, sensors of the vehicular network, and/or end-user devices of the vehicular network. For example, one or more of these network nodes and/or devices may probe the network and may provide context information in real time.

As a few, non-limiting examples, context information used by a particular node for a particular bundle may comprise the number of replicas of the particular bundle that currently exist in the network; a probability that the particular node can wirelessly communicate with a particular neighbor node (e.g., without using a cellular connection); a probability that the particular node can communicate with any neighbor node; and/or a probability that the particular node will be at or in proximity to a particular geographic location within some determined time interval (e.g., for nodes that are mobile). Context information used by the particular node for a particular bundle may also comprise, for example, a probability that the particular node will be able to wirelessly connect to a fixed AP (e.g., based on its current geographic location, historical information of the geographic location of the particular node, and/or the geographic location(s) of one or more fixed APs of the network). In addition, context information used by the particular node for a particular bundle may also comprise, for example amount of unused storage in the particular node; an amount of unused storage in one or more neighboring nodes; a number of missing fragments of a specific file that are needed in order to decode the entire file; a "time-to-live" for the particular bundle; a latency tolerance of the particular bundle; a number of hops the bundle has traversed and/or should traverse; and/or a past, present, and/or predicted future number of nodes that have been/are/will be neighbor nodes of the particular node. The term "time-to-live" may be used herein to refer to a maximum amount of time that a bundle is allowed to be in transit within the network before an action is taken to delete the bundle from each node of the network. In accordance with various aspects of the present disclosure, a bundle may, for example, contain a "date/time of creation" (e.g., 15:30 02/02/17 UTC) and a "time-to-live" (e.g., 3600 seconds or 60 minutes). In an alternate instance according to the present disclosure, each bundle may, for example, contain a "date-to-live" or "expiration date" (e.g., 16:30 02/02/17 UTC), which may define a date/time when the bundle is no longer valid. Using such information, a network node (e.g., a mobile AP, fixed AP, NC, sensor, etc.) may calculate, using current date/time information from, for example, a GNSS/GPS receiver or a Network Time Protocol (NTP) server, whether the bundle is valid. In accordance with aspects of the present disclosure, a "time-to-live" or "date-to-live" may provide for a bundle life of, for example, up to 60 seconds, up to an hour, or as much as a day.

Various aspects of this disclosure enable prioritizing and/or scheduling communication and/or delivery of a bundle based on a "time-to-live" of the bundle, an indication of priority and/or importance of the bundle, an indication of latency sensitivity of the bundle, and/or other characteristics of the bundle. A network in accordance with aspects of the present disclosure includes methods and systems for scheduling bundles carrying real-time data that is to be communicated with highest priority.

Various aspects of the present disclosure provide methods and systems for dealing with a variety of characteristics of different types of storage systems which may be in use at the nodes (e.g., FAPs, MAPs, NCs, sensor(s)) of the network. By way of example and not limitation, the context information may include storage capacity, read/write speed, organization, etc. of storage devices and file systems from which the data will be read and/or to which the data will be stored. For example, some storage systems of a network node may comprise hard disk drives, and some may comprise solid state devices (e.g., FLASH-based or battery backed RAM). Some storage in network nodes may, for example, be organized as file-based storage, some may be organized as object-based storage, and some may use other types of organization/structure.

In accordance with various aspects of the present disclosure, data compression may be applied to a particular bundle at a particular time, and the algorithms for such data compression may be determined based on context information. For example, the data compression algorithm employed, the target compression ratio, and other aspects, may be determined based on the type of data contained in the bundle. By way of example and not limitation, the data contained in a bundle may be characterized by metadata such as a file extension that associates the data with a particular software application, by latency sensitivity of the bundle, by a "time-to-live" of the bundle, by a type of network connection over which the bundle is to be communicated, to name only a few characteristics that are contemplated.

In a network according to aspects of the present disclosure, context information may be used to determine which bundles a network node (e.g., FAPs, MAPs, NCs, etc.) is to drop/delete/overwrite in order to maintain a sufficient quality of service (QoS). Whether a particular network node stores or drops a particular bundle may depend upon, by way of example and not limitation, one or more indicators of the urgency, delay-sensitivity, loss-tolerance, and/or "time-to-live" of the bundle; an amount of bandwidth available on communication links to/from the network node currently handling the bundle, and/or an amount or type of storage available in the node handling the bundle. In addition, if a decision is made to store the particular bundle at the particular node (e.g., based on any of the context information discussed herein), the duration of time for which the particular bundle should be stored at the particular node may be determined based on any of the context information described herein.

A node of a network according to aspects of the present disclosure (e.g., a fixed AP, mobile AP, network controller) may, for example, be configured to predict the impact of various possible data dissemination and retention rules, to assess which rule(s) will be the best, or at least a suitable choice. Such a prediction may be based, for example, on context information advertised by the Cloud, by fixed APs, by mobile APs, by sensors, and/or by end-user devices. In accordance with some aspects of the disclosure, such predictions may be based on context information collected and/or derived from previous surveys and/or analyses performed in a network context similar to the context that a mobile AP is currently experiencing, or may be predicted to experience in the near term. Some example characteristics used in making such predictions may include, by way of example and not limitation, a network or geographic location, a measure of density of mobile APs, a measure of density of fixed APs, obstructions that may impact wireless communication, requirements set by the end-users of the data being communicated, to name just a few.

Methods and systems in accordance with aspects of this disclosure may use hysteresis and/or other techniques to reduce frequency of switching between different data retention and dissemination rules, so as to avoid oscillations that may occur between different rules, and to reduce any computational and/or resource costs of managing the data dissemination and retention rules. For example, switching to a different data retention and dissemination rule may involve arriving at a consensus of a defined set of nodes (e.g., one or more nodes in the same geographic region or same cluster).

Aspects of this disclosure enable gathering data from multiple and heterogeneous sources in a network of moving things, while taking into account the limited resources (e.g., CPU computing capacity, data storage capacity and types, operating power, etc.) of many of the nodes that are part of the network, to ensure that software applications that use the gathered data receive it in accordance with their QoS expectations. Aspects of this disclosure provide a network that is scalable, reliable, and that provides high-performance support for the gathering, transportation, dissemination, and sharing of information among different network elements, while ensuring selection of suitable trade-offs between the various requirements of all the software applications and services that make use of such data.

In a network as described herein, data storage/retention and dissemination rules may comprise various parameters which may be dynamically configured/adapted. Changing one or more such parameter values is referred to herein as changing the data storage/retention and dissemination rule or switching between different data storage and dissemination rules. As previously noted, a network in accordance with aspects of the present disclosure may have multiple sets of data storage/retention and dissemination rules for communication of data traffic in "upstream" and "downstream" directions. Some examples of such parameters include, but are not limited to, a maximum number of replicas (i.e., copies) that should be generated for a bundle at a network node, a maximum number of hops (i.e., communication paths or links) onto which to replicate a particular bundle, priorities of various data types, priorities of various senders of bundles, priorities of various recipients of bundles, whether or not a recipient of a bundle is to send an acknowledgement (ACK) of receipt of the bundle, and whether a node is to use broadcast, multicast, and/or unicast in communicating a bundle.

Figure 7:
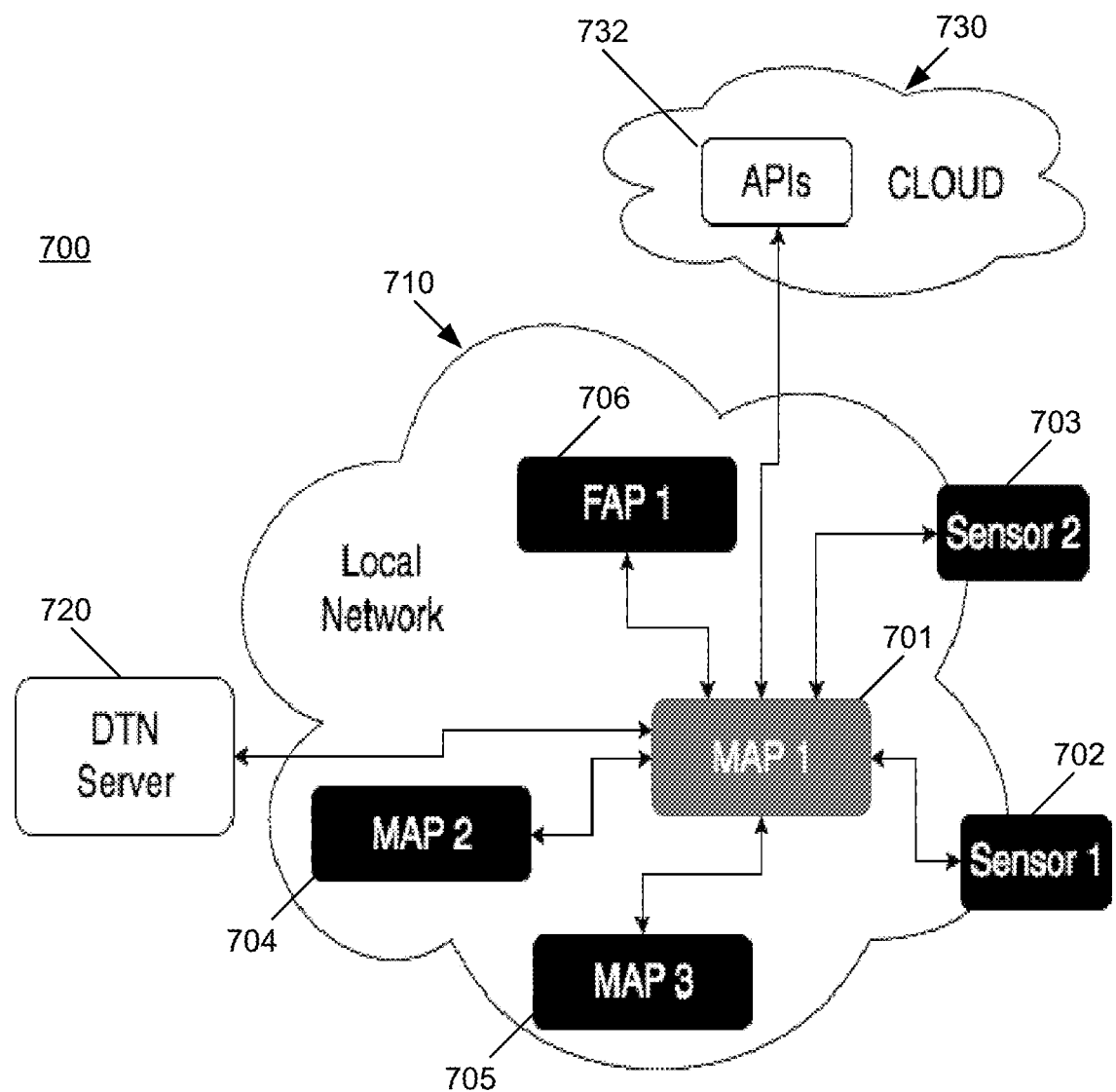
FIG. 7 shows a block diagram of an example mobile AP in a network of moving things, in accordance with various aspects of the present disclosure.

FIG. 7 shows a block diagram of an example mobile AP 701 in a network of moving things 710, in accordance with various aspects of the present disclosure. In the example shown in FIG. 7, the mobile AP MAP 1 701 is configured to communicate with a delay tolerant networking (DTN) server 720 and a set of application programming interfaces 732 of a Cloud 730, to implement data retention and dissemination rules as described herein. Functionality (e.g., circuitry, logic, and/or executable instructions) supporting delay tolerant networking in accordance with this disclosure may, for example, be integrated into one or more APs (e.g., mobile APs and/or fixed APs) or other nodes of the network 710 including, for example, one or more Cloud-based servers (e.g., the DTN server 720 shown in FIG. 7). The MAP 1 701 of the network 710 is also communicatively coupled to a sensor 1 702 and sensor 2 703, a fixed AP FAP 1 706, and mobile APs MAP 2 704 and MAP 3 705. In the example arrangement of FIG. 7, the functionality of the DTN server 720, the mobile APs MAP 1 701, MAP 2 704, and MAP 3 705; and the fixed AP FAP 1 706 manage and implement data storage and dissemination rules for the upstream transfer (i.e., "uploading") of data from the APs (e.g., the FAP 1 706, MAP 1 701, MAP 2 704, and MAP 3 705) to the DTN server 720, and for the "downstream" transfer (i.e., "downloading" or distribution) of data from the DTN server 720 to the APs (e.g., the FAPs and MAPS). For example, in accordance with various aspects of the present disclosure, the DTN functionality of the mobile AP MAP 1 701 of FIG. 7 may, for example, be fed with context information from the current neighbors of the mobile AP MAP 1 701 (i.e., FAP 1 706, MAP 2 704, MAP 3, Sensor 1 702, and Sensor 2 703), and with context information from the Cloud and the DTN server 720.

Figure 8:
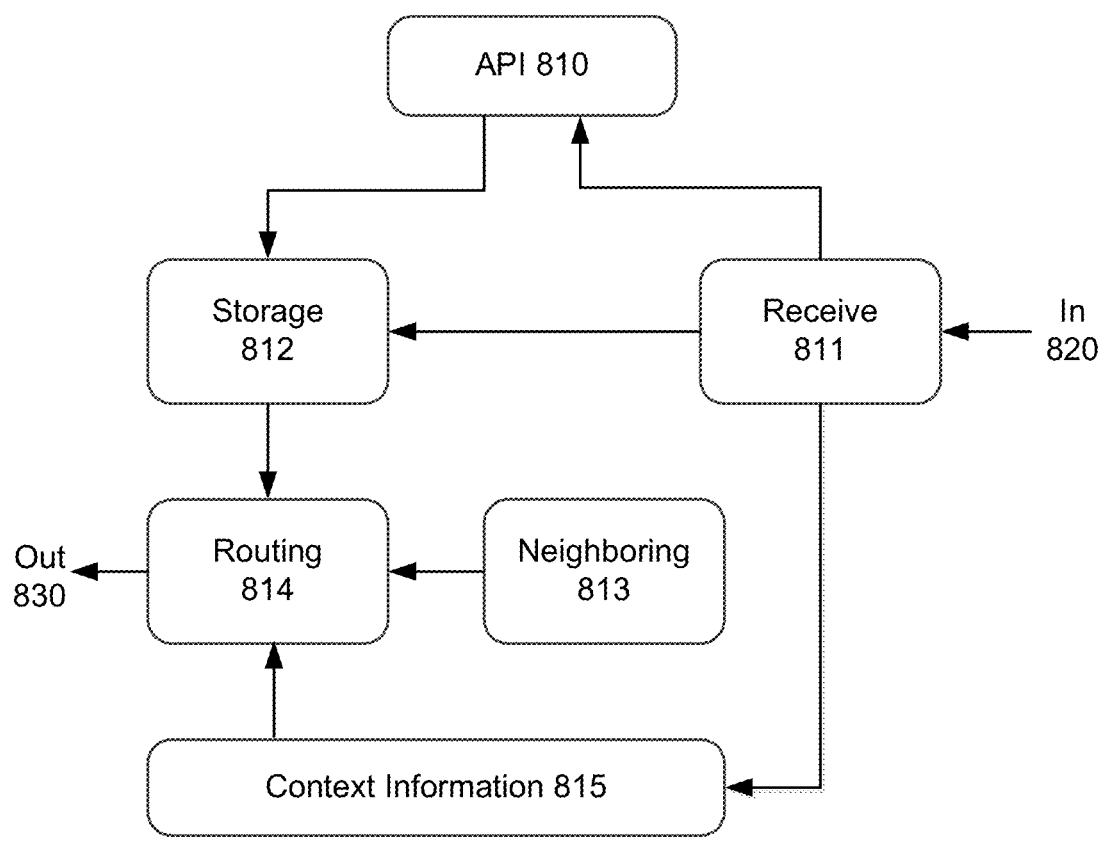
FIG. 8 shows a block diagram of example delay tolerant networking functionality for implementing data retention and dissemination rules of nodes of a network of moving things, in accordance with various aspects of the present disclosure.

FIG. 8 shows a block diagram of example delay tolerant networking functionality 800 for implementing data retention and dissemination rules of nodes of a network of moving things, in accordance with various aspects of the present disclosure. The DTN functionality 800 illustrated in FIG. 8 comprises an API functional block 810, a receive functional block 811, a storage functional block 812, a neighboring functional block 813, a routing functional block 814, and a context information functional block 815. It should be noted that the functionality of the various blocks of FIG. 8 may be realized in hardware/circuitry, executable instructions/software code, logic, and/or any combination of the above.

The neighboring functional block 813 of FIG. 8 is configured to maintain an updated list of all neighbor nodes of the network node containing the functionality of FIG. 8. Such a list of neighbor nodes may contain data items/entries for each neighbor node, where the data items/entries for each neighbor node may include any of the context information discussed above with respect to neighbor nodes. For example, such a list entry for a neighbor node may include, by way of example and not limitation, the type of the neighbor node (e.g., FAP, MAP, Sensor, NC, etc.); the geographic location of the neighbor node (e.g., latitude/longitude); the speed, direction, and/or a path of travel of the neighbor node (i.e., for neighbor nodes that are MAPs); as well as other context information such as a received signal strength indication (RSSI) for the neighbor node. The neighboring functional block 813 may interact with, for example, an operating system of the node in which the functionality of FIG. 8 resides, to obtain information about the available neighbors of the node, such as mobile and fixed APs, Wi-Fi neighbors, or neighbors in other technology (e.g., Bluetooth, DSRC, etc.).

The receive functional block 811 is configured to receive and process incoming bundles (i.e., via In 820) from other nodes of the network. The receive functional block 811 may interact with the storage functional block 812 to store received bundles and characteristics about the stored bundles, and to access characteristics about the stored bundles. Such characteristics may include those described herein such as, for example, the size of the bundle, metadata such as a file extension that associates the data of the bundle with a particular software application, a type of data of the bundle, a latency sensitivity of the bundle, a "time-to-live" of the bundle, and a type of network connection over which the bundle is to be communicated, to name just a few characteristics. Such stored characteristics may be accessed for the purpose of creating acknowledgements (ACKs) and/or other messages (e.g., a response indicating that the data of the bundle was previously received, a response indicating that the storage for bundles at the node is full, etc.), regarding the received and/or stored bundles. The receive functional block 811 may, for example, implement data retention rules that are used to determine which received bundles are to be stored in the storage functional block 812.

The routing functional block 814 is configured to generate and send messages to other nodes of the network. The routing functional block 814 may, for example, interact with neighbors of a network node (e.g., nodes within wireless communication range of the node in which the routing functional block 814 resides), to acquire and maintain updated information about the current neighbors of the node, and may interact with the storage functional block 812, to "peek" a bundle. The term "peek a bundle" may be used herein to refer to an action by a network node (e.g., a fixed or mobile AP, NC, sensor, etc.) to, for example, get access to or a copy of a bundle, or access to or a copy of the headers of a bundle (e.g., from storage), to enable the network node to determine using the information in the bundle, when, where, and to whom to send the bundle. The routing functional block 814 may be configured to implement data dissemination rules used to determine, by way of example and not limitation, which received bundles are to be sent, which node(s) are to receive the bundles that are sent, the communication link(s) (e.g., Wi-Fi, DSRC, Bluetooth, cellular) to be used for sending the bundles, the settings to be used on the communication link(s) (e.g., the data rate, the modulation scheme, any time-out values, maximum number of retries, etc.) to be used when sending the bundles, etc. The routing functional block 814 of a node may, for example, operate to define data storage and dissemination rules related to one or more conditions in which bundles are dropped by the node, and how prioritization and scheduling of the transmission of bundles is done by the node. Such rules may, for example, provide for multiple classes of service in regards to bundle delivery delay and loss tolerance.

The storage functional block 812 is configured to maintain a data structure having records/entries for all bundles received by the node (e.g., organized in different lists, organized by a type of storage device used to store the bundle (e.g., a memory card (e.g., SD/SDHC/SDXC, CF, etc.), system FLASH memory, battery-backed RAM, and/or other forms of data storage). The storage functional block 812 may interact with the receive functional block 811 and the routing functional block 814, to provide access to, to retrieve, and/or to store data, as well as other functions that may be used to collect/generate context information.

The context information functional block 815 is configured to collect information from the neighbors of a node, from a remote server (e.g., the DTN server 720 of FIG. 7), and from the Cloud. The routing functional block 814 and the receive functional block 811 may then use the context information to configure and implement data storage and dissemination rules.

The application programming interface (API) functional block 810 of a network node is configured to parse instructions, referred to herein as "API calls," that are received by the node via the receive functional block 811. The API functional block 810 may then validate and/or authenticate the received API calls, and may then perform or cause the performance of operations requested by valid and/or authenticated API calls. Such API calls may include, for example, an API call to store data to the storage functional block 812, and an API call to fetch data from the storage functional block 812 for transmission via the routing functional block 814.

In an example implementation in accordance with various aspects of the present disclosure, control communications among network nodes (e.g., mobile APs, fixed APs, and a DTN server) may use a short "common header" for all types of messages, and may use a "type-specific header" that follows the "common header." Such type-specific headers may include, for example, what may be referred to herein as a "bundle header" (e.g., a header specifically used for messages carrying data being disseminated), what may be referred to herein as an "ACK header" for use in an acknowledgment message, and other type-specific headers for various "control messages."

The term "control message" may be used herein to refer to any type of packet used to communicate information/context between/among two or more network entities including, for example, one or more MAPs, FAPs, DTN server(s), sensor(s), and/or the Cloud. A control message may be a "request control message" that may be used, for example, to request any type of information from one or more other node(s), or a "response control message" that may be used to provide a response to a request from another node. For example, a "response control message" may be used to provide context information about status of particular bundles, about the probability of being within range of wireless communication (e.g., "contact") with a particular network node, and/or about the presence of new bundles in a network in accordance with various aspects of a network of moving things as described herein.

In a network in accordance with aspects of the present disclosure, an "ACK message", as well "response control messages" or any type of "control message" may include space for one or more "flags." Such flags may be used by a receiving node to provide additional information about the status of delivery of a control message, as well as the status of the responding neighbor, to the sending node. Examples of such status information include, but are not limited to, whether storage at the neighbor is full, whether the neighbor is experiencing any sort of technical problem(s), whether the neighbor accepts custody of the data just sent to the neighbor, whether the neighbor received and stored the data just received, whether a sufficient number of data fragments are available to enable reconstruction of the file of which the data is a part, and whether the data sent to the neighbor was already stored at the neighbor.

In an example implementation according to aspects of the present disclosure, the neighboring functional block 813 may provide context information including, for example, updates on the state of neighboring nodes. Such context information may be real-time context information, in that such information may reflect the state of a neighbor node within a short period of delay (e.g., within millisecond, tens of milliseconds, or a few hundred milliseconds of existence of the state at the neighbor node). In accordance with aspects of the present disclosure, changes in a list of neighbors maintained by any given network node (e.g., located in an operating system Kernel of the node) may be announced to the DTN. Such an announcement of changes may be sent to any network node that belongs to the DTN including, for example, neighbor nodes, neighbors of neighbor nodes, and a DTN server. In accordance with aspects of the present disclosure, the neighboring functional block 813 of any network node may pre-filter the list of neighbors that the node maintains. The pre-filtering may be performed before the list of neighbors of the node is announced to the DTN. Such pre-filtering may, for example, be based on context information maintained by the node including, by way of example and not limitation, RSSI measurements of wireless signal(s) from the neighbor node(s), an average time between reboots of the neighbor node(s), an indication of one or more technical (e.g., electrical, software, etc.) problem(s) at the neighbor node(s), and/or other information that is a factor in assessing the reliability or stability of the neighbor node(s). Such pre-filtering may produce a list of the "best" or "healthiest" neighbors, which may identify those neighbors that may be relied upon to operate predictably and reliably. In this manner, the routing functional block 814 of a node may then use the filtered list of neighbor nodes in configuring and implementing data storage/retention and dissemination rules. In accordance with various aspects of the present disclosure, one or more thresholds for one or more parameter values used in the pre-filtering process (e.g., a minimum RSSI for a node to be considered as providing a usable wireless communication link) may be adjusted dynamically, based on a variety of factors including, for example, feedback from previous communication with neighbor nodes, the size of a particular bundle to be transmitted to a neighbor node, and/or the like.

In accordance with aspects of the present disclosure, data storage/retention and dissemination rules for upstream data may determine, by way of example and not limitation, whether a bundle is sent as unicast or broadcast traffic; whether a recipient of the bundle is to send an ACK; and/or whether an end-to-end ACKs for a bundle is to be sent to and/or from a DTN server (e.g., DTN server 720). Such data storage/retention and dissemination rules for upstream data may also determine, for example, how many replicas/copies of a particular bundle should be sent by a particular sender or a particular type of sender (e.g., the sender originating the bundle and communicating the bundle to an intermediate node, an intermediate node communicating the bundle to another intermediate node, a sender communicating the bundle to a DTN server, and/or other types). Data storage/retention and dissemination rules for upstream data of a network, in accordance with aspects of the present disclosure, may determine, by way of example and not limitation, whether to use fixed access points as anchors (i.e., whether a mobile AP should only send or receive a bundle that originated at a fixed AP, when in range of a fixed AP). Such data storage/retention and dissemination rules for upstream data may also determine, by way of example and not limitation, whether to request control information from fixed APs and/or the Cloud, to help the upload of a particular file (e.g., information about how many more fragments are needed to be able to decode the particular file, how many fragments of a particular file have been received so far, and/or the like); and/or whether a device, or a bundle is currently on, or should be added to, a "blacklist." The term "device" may be used in this context to refer to, for example, a network node (e.g., a fixed or mobile AP, NC), an end-user device (e.g., a cellphone; smart phone; tablet, laptop, or other type of computer), or a sensor, if such a device is part of a DTN. In accordance with aspects of the present disclosure, a "blacklisted" device or node may not be used to send bundles, and may be avoided by other network nodes, etc., since the device or node may be "blacklisted" for many reasons including, for example, poor network performance, full/limited storage capacity, and/or security issues, to name only a few reasons.

Figure 9:
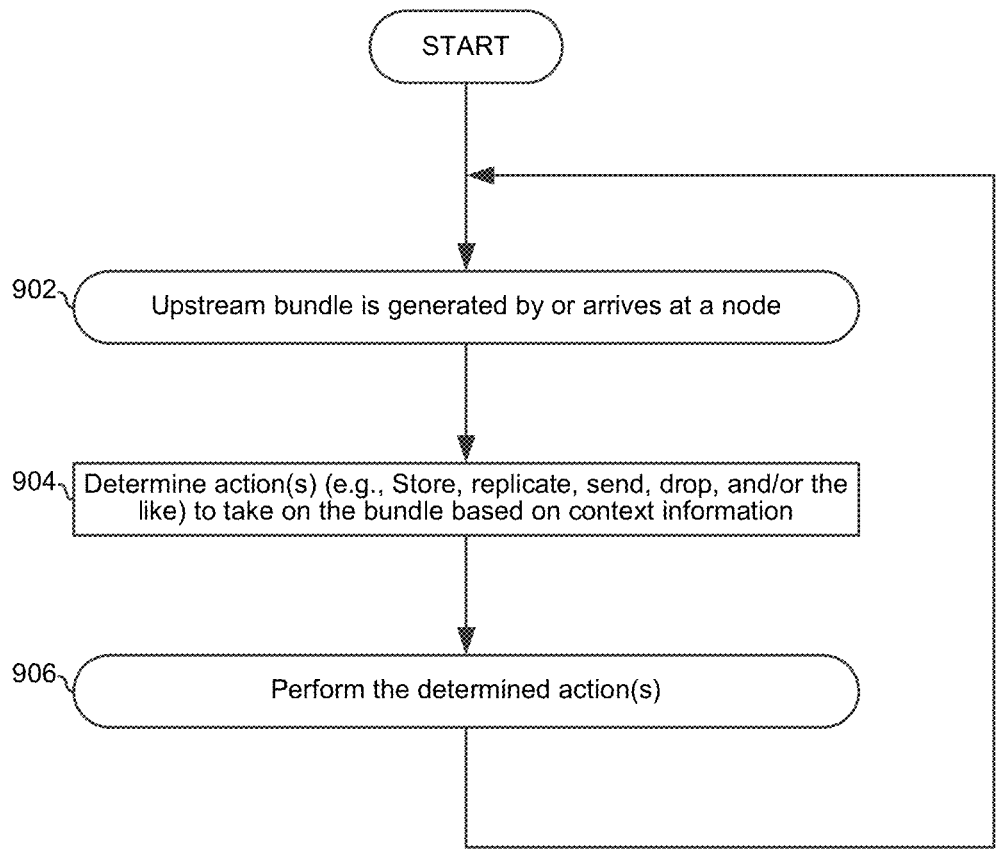
FIG. 9 is a flowchart illustrating an example process for managing data storage/retention and dissemination of a bundle in the upstream direction, in accordance with various aspects of the present disclosure.

FIG. 9 is a high-level flowchart 900 illustrating an example process for managing data storage/retention and dissemination of a bundle in the upstream direction, in accordance with various aspects of the present disclosure. In block 902, an upstream bundle is generated or received by a device of the network of moving things. In various scenarios, the device referred to in FIG. 9 may be a mobile AP, a fixed AP, or an end-user device. In block 904, the device determines which action(s) to take with the upstream bundle (e.g., whether to store it, forward it, replicate it, drop it, and/or the like) based on context information available to the device. In block 906 the device performs the action(s) determined in block 904.

At block 904, the method of FIG. 9 may comprise, for example, deciding whether to forward/send the bundle and, if so, whether to send it in a unicast message to a single neighbor node, or whether to broadcast or multicast it to multiple neighbor nodes. In accordance with aspects of the present disclosure, context information which may be used to make this decision includes, by way of example and not limitation, whether and/or how many "one-hop neighbors" are available to the node, the RSSI for each such neighbor node, the storage capabilities of each such neighbor node, and/or the number of replicas/copies of the bundle that have already been communicated by the device and/or by other devices.

An advantage of sending the bundle in one or more unicast transmissions is that sending one or more unicast transmissions enables finer control of how many replicas/copies of the bundle are disseminated throughout the network, reducing the burden on other nodes which would have to demodulate/decode a broadcast message that may not be relevant to the other nodes. A disadvantage of sending the bundle in one or more unicast messages is that doing so fails to take advantage of the promiscuous nature of the wireless medium used for communication. One example scenario in which a network node (e.g., a device such as a MAP, FAP, NC, etc.) may decide to send a bundle in one or more unicast messages, is where there is a large number of neighbor nodes in the network (i.e., a really high vehicle density (e.g., more than 10, more than 20, or more than 30 nodes/vehicles a members of a DTN)), but there are relatively few (e.g., only one or a few) node(s) that has/have a much higher likelihood than other node(s) of successfully delivering the bundle. Using this approach, replication of the bundle may be more accurately controlled than broadcasting the bundle into a crowded environment (possibly worsening network congestion, etc.).

An advantage of broadcasting a bundle is that several replicas of the bundle are shared in a single transmission. That is, a bundle that is broadcast is a single physical transmission by the source node that is shared with multiples recipients. It should be noted that, although only a single bundle is physically transmitted by the source node, multiple copies of the bundle may be distributed throughout the DTN at nodes that accepted the bundle that was broadcast. Another advantage is that the sender may avoid implementing resource-intensive data dissemination rules to decide to which node(s) the bundle should be replicated. A disadvantage of broadcasting the bundle is that there is less control over how many replicas of the bundle get shared than when, for example, a bundle is sent using one or more unicast transmissions. It should be noted, however, that it is possible to control the number of broadcast transmissions in a network in accordance with various aspects of the present disclosure. One example scenario in which a node may decide that a bundle is to be broadcast is when there is a high density of network nodes (e.g., MAPs of vehicles), so that the sender can make use of the same transmission to reach multiple destination nodes. In accordance with aspects of the present disclosure, a sending node may decide to broadcast a particular bundle when, for example, the sending node knows that all/most of the neighbor nodes have at least a certain threshold amount of storage space still available in which to store the bundle. Such a storage space requirement may be mandatory, or may be overridden when, for example, one or more characteristics of the particular bundle indicate that the priority or importance of delivery of the bundle to the nodes of the network is at or above a certain threshold.

At block 904, the method of FIG. 9 may comprise, for example, deciding whether to send an ACK message in response to receipt of a bundle and, if so, whether to send one or more unicast ACK messages or to send a broadcast ACK message. An advantage of not sending an ACK is that it reduces congestion on the wireless medium. A disadvantage of not sending an ACK is that the sending node does not know the status of the bundle and whether it was successfully received by the destination node(s). The failure to employ an ACK message may lead to the transmission of unnecessary replicas of the bundle. In accordance with various aspects of the present disclosure, a network node may decide to not send an ACK message for a received bundle when the wireless medium used for communication is overloaded (e.g., in areas with high node density). An overload condition may be considered to exist when, for example, utilization or occupancy of the wireless medium being used by the sender is above one or more certain thresholds. A network node may also decide to not send an ACK message for a bundle when, for example, one or more fixed APs are within a certain distance proximity to the sender of the bundle and/or receiving signals above one or more thresholds indicating wireless communication with the sender is available, because the sender may be able to get information about the bundle from the Cloud, when the sender is directly connected, via a wireless network, to the fixed AP.

An advantage of a recipient node sending an ACK message is that the ACK message may, for example, provide information such as an amount of storage currently available at the recipient node, a notification that the sender may delete the bundle because the recipient node is accepting custody of it, a notification that the recipient node already had a copy of the bundle in storage at the recipient node, and/or a notification that enough fragments of a file, part of which may be contained in the bundle, have now been received to enable reconstruction of the entire file. An advantage of sending a unicast ACK (e.g., as opposed to a broadcast ACK) is that only the recipient of the ACK (i.e., the sender of the bundle) received and therefore may need to process the ACK. One example scenario in which a network node may decide to send a unicast ACK is when the sending and/or receiving nodes do not often come within range of a fixed AP, and thus storage of the bundle would be too large a storage burden for the node to store all received/generated bundles until a fixed AP is in communication range. Another example scenario in which a recipient node may decide to send a unicast ACK is when the RSSI of the wireless signal from the sender as measured at the recipient is within a range of RSSI values in which successful delivery of a bundle is uncertain, as opposed to RSSI values below such a range, where delivery is likely to fail, or RSSI values above such a range, where delivery of a bundle is likely to succeed. An advantage of sending a broadcast ACK is that all neighbors of the sender become aware of the wireless communications in their area or region, and the status of various bundles being communicated. One example scenario in which a network node according to the present disclosure may decide to send a broadcast ACK, is where the nodes of a group of nodes (e.g., mobile APs) are within wireless communication range of one other (i.e., may be neighbor nodes of one another) for at least a certain amount of time, and are also within wireless communication range of a fixed AP. In this scenario, sending an ACK as a broadcast transmission may enable the nodes of the group to learn which of the other nodes in the group have already received particular bundle, and thereby reduce unnecessary transmissions of the bundle among the group of nodes.

As used herein, the term "end-to-end (E2E) ACK" may refer to an ACK sent by a DTN server (e.g., DTN server 720) that indicates that a complete file, or enough parts of the file so that the complete file can be reconstructed, has been received by the DTN server. At block 904, the method of FIG. 9 may comprise, for example, a DTN server (e.g., DTN server 720) deciding whether to send an E2E ACK, and, if so, whether to disseminate the E2E ACK via mobile APs, fixed APs, or a mix. An advantage of not sending an E2E ACK is that not sending an E2E ACK avoids placing additional load on the communication network. One example scenario in which a DTN server may decide to not send an E2E ACK is when bundle dissemination rules are such that a burdensome number of unnecessary replicas are not likely to be sent. Another example scenario, in which a DTN server may decide to not send an E2E ACK is where a file is small, is able to be contained in a single bundle, and the source of the bundle used to carry the file is the network node that delivers the entire file.

In accordance with various aspects of the present disclosure, a DTN server (or any other node that is a final destination of a bundle) may send an E2E ACK back to the source node. Sending an E2E ACK introduces more load upon the DTN, as the E2E ACK is similar to a data packet, albeit of a possibly smaller size. The E2E ACK is, however, important to the source node and other network nodes in the path from the destination node to the source node to, for example, enable the source node to stop sending packets/fragments from the current bundle, and also to enable other network nodes along the path to be able to delete the bundle from the storage of the other network nodes. The network node that is the final destination of a bundle may, for example, consider a number of factors before sending an E2E ACK including, by way of example and not limitation, the size of the full bundle, how close the current time is to the bundle expiration date/time, the receive data rate of the current bundle, and the likely distance (e.g., in hops) from the sender of the E2E ACK, to the source node.

An advantage of sending an E2E ACK is that the network node that is the source of the bundles that contain a particular file may be notified that the entire file has arrived at the destination node, and that the source node is then able to update its replication/storage strategies accordingly. For example, in such a situation, a source node may stop sending replicas of the bundle(s) and/or drop the bundle(s) that contain a file. An advantage of sending E2E ACKs using fixed APs as anchors is that the use of such an approach may avoid the utilization of resources required for disseminating the E2E ACKs via the mobile APs. A disadvantage of sending E2E ACKs when using fixed APs as anchors is that such an approach may involve extra coordination between the source node and a DTN server when the source is near a fixed AP, and may involve additional processing at the DTN server. An advantage of disseminating E2E ACKs via mobile APs is that the source node may not need to come within wireless communication range of a fixed AP before the source node is able to determine whether or not the file (and therefore the bundle(s) carrying the file) has been successfully received at the DTN. A disadvantage of disseminating E2E ACKs via the mobile APs is that such an approach may introduce additional load into the network, as the E2E ACKs are broadcast on the wireless network until the source node is reached, and the source node may be far from nodes that are transporting such E2E ACKs.

In accordance with various aspects of the present disclosure, the node performing the method of FIG. 9 may be an intermediate node between the source of a bundle and a DTN server acting as the destination node. In such a situation, the actions of block 904 may comprise the intermediate node deciding whether the intermediate node should replicate the bundle or store the bundle until the intermediate node comes within wireless communication range of a fixed AP. In accordance with various aspects of the present disclosure, data storage and dissemination rules used by the intermediate node may, for example, set a maximum number of hops onto which the bundle should be replicated, and if the bundle hasn't reached the DTN in the maximum number of hops, the last mobile AP to receive it may store it until coming into range of a fixed AP. The term "hop" may be used herein to refer to one part/segment/link of the communication path from a source to a destination. In a network in accordance with the present disclosure, data storage and dissemination rules at a network node may set the maximum number of times a bundle may be replicated by that network node, and if the bundle hasn't reached the destination node (e.g., a DTN server) at the point where the bundle has been replicated the maximum number of times, the last network node to receive the bundle (e.g., a mobile AP) may, for example, store the bundle until the network node comes into wireless communication range of a particular type of node (e.g., a fixed AP). Replicating a bundle one or more times allows the bundle to arrive quickly at the destination node, since the bundle may be present in storage of several nodes of the network (e.g., multiple mobile APs) and the first node carrying the bundle (e.g., a mobile AP) that comes into wireless communication range of the particular node (e.g., the fixed AP) may then send the bundle to the destination node (e.g., the DTN server). Replicating a bundle also increases the probability of delivery of the bundle, since there are multiple copies of the same bundle in nodes of the network. Even if a copy of the bundle is dropped by one node (e.g., a mobile AP, due to full storage device), the bundle may still be delivered by another node having a copy of the bundle.

At block 904, the method of FIG. 9 may comprise, for example, a first node that receives a bundle and may forward that bundle to a second network node (e.g., another device such as a MAP, FAP, NC, etc.), and that the first node may then decide whether to drop the bundle from its storage. For example, an ACK for the bundle, received by the first node from the second node, may comprise an indication that the second node is accepting custody of the bundle. In such a situation, the first node may determine that it no longer has to store the bundle. One advantage of this approach is that such transfer of custody between nodes reduces overall storage required in the network. A disadvantage of this approach is that transferring custody to the second node and deleting the bundle at the first node may increase the likelihood that a bundle fails to reach its destination. Whether the second node accepts custody of the bundle may, for example, be based on context information available to the second node. Such context information may include information about the first (sending) node and/or the second (receiving) node that permits the second node to determine whether or not the second node is more likely to deliver the bundle to its final destination than the first node. For example, the context information available to the second node may be analyzed by the second node or a Cloud-based resource. Such a determination may, for example, indicate that the second node is within wireless communication range of a particular type of network node (e.g., a fixed AP) more frequently and/or for longer period(s) of time than the first node, from which it received the bundle. Similarly, whether the first node drops the bundle in response to the ACK indicating acceptance of custody by the second node may, for example, be based on context information available to the first node that indicates which of the first node and the second node is more likely to deliver the bundle to the final destination of the bundle.

In a network according to various aspects of the present disclosure, one or more particular type(s) of network nodes (e.g., a fixed AP, a mobile AP in a stopped/parked vehicle (e.g., an autonomous electric vehicle that is being charged)) may be used as anchor nodes for communication of control information between a first network node (e.g., a DTN server) and other network nodes (e.g., mobile APs). The anchor nodes (e.g., fixed APs) may reliably communicate with the first network node (e.g., the DTN server), and thus can be used to retrieve information about the status of the bundles/files that arrive at the first network node (e.g., DTN server), or any other information that helps to manage the data being stored and disseminated in a network as described herein. An advantage of using anchor nodes (e.g., fixed APs, MAPs of stopped/parked vehicles, etc.) in this manner is that such an arrangement may improve the efficiency of bundle storage and opportunistic communication of data, since the other network nodes (e.g., mobile APs) may then know which bundles have already been delivered and which bundles are still waiting to be delivered. In accordance with various aspects of the present disclosure, network nodes such as, for example, fixed APs and MAPs of stopped/parked vehicles may be used as anchors for control information between a DTN server (e.g., DTN server 720) and other network nodes (e.g., mobile APs), when the density of the other network nodes is too low to reliably ensure dissemination of the information, and may not be used as anchors when density of the other network nodes (e.g., mobile APs) is high enough such that the other network nodes (e.g., mobile APs) are able to obtain all of the relevant information from neighboring nodes (e.g., other mobile APs in proximity).

In accordance with various aspects of the present disclosure, certain types of network nodes (e.g., mobile APs) may choose to use a certain type of communication link (e.g., a cellular connection, a Wi-Fi connection, a DSRC connection) to access context information as described above, from a remote resource (e.g., the Cloud). An advantage of this aspect of a network node of the present disclosure is that the remote resource (e.g., the Cloud) may be equipped with significant more computing and storage resources than nodes of the network, which may enable the remote resource to quickly analyze data from the entire network. Whether or not, and/or when any given node of the network (e.g., mobile AP) chooses to use the certain type of communication link in this manner may depend on context information that may indicate, for example, when a particular mobile AP is predicted to be in-range of a fixed AP, how long a particular mobile AP typically spends in-range of a fixed AP, etc.

In accordance with aspects of the present disclosure, a particular type of network node (e.g., a mobile AP) may resort to the use of a specific type of communication link (e.g., a cellular connection) for the delivery of a bundle only as a last resort. This may happen when, for example, the storage of a network node of the particular type (e.g., mobile AP) is nearing maximum capacity, and the network node has no neighbor network nodes to which one or more bundles may be offloaded, or when the "time-to-live" of the bundle is expiring soon and the network node is not predicted to be within wireless communication range of another node (e.g., a fixed AP) before the "time-to-live" of the bundle will expire.

In accordance with various aspects of the present disclosure, context information may include, for example, distributed and/or probabilistic metrics calculated by one or more nodes of the network (e.g., MAPs, FAPs, NCs, etc.). This may involve, for example, each mobile AP locally sharing context information with neighbor nodes (e.g., FAPs, NCs, other MAPs, etc.), and each mobile AP may then decide how to handle received bundles based on history and such probabilistic metrics. A network node may, for example, estimate one or more "contact times" and "contact durations" when opportunities for wireless communication with another network node (e.g., one or more fixed APs) may occur; determine respective amounts of storage available in one or more neighbor nodes; receive the identities and sizes of bundles stored in neighbor nodes, etc.; and may, in response, configure its own data storage and dissemination rules accordingly.

In accordance with various aspects of the present disclosure, nodes of the network (e.g., devices such as mobile APs, fixed APs, and/or a DTN server) may maintain (e.g., either individually and/or collectively) one or more "whitelists" and/or "blacklists" of specific network nodes to which bundles should not be sent, for some particular period of time. A blacklist maintained locally by a network node helps the node to manage the bundles, avoiding useless communications with neighbor nodes that may, for example, be dynamically evaluated and marked as not being reliable. Certain nodes of the network may be placed on a blacklist when, for example, one or more network nodes determine that the storage of such network nodes is almost/totally full, that previous communications with such network nodes have failed, that such network nodes are having software and/or hardware problems, and/or the like. Such lists of network nodes help to avoid unnecessary network traffic, and make more efficient usage of opportunities to communicate between nodes.

Figure 10A:
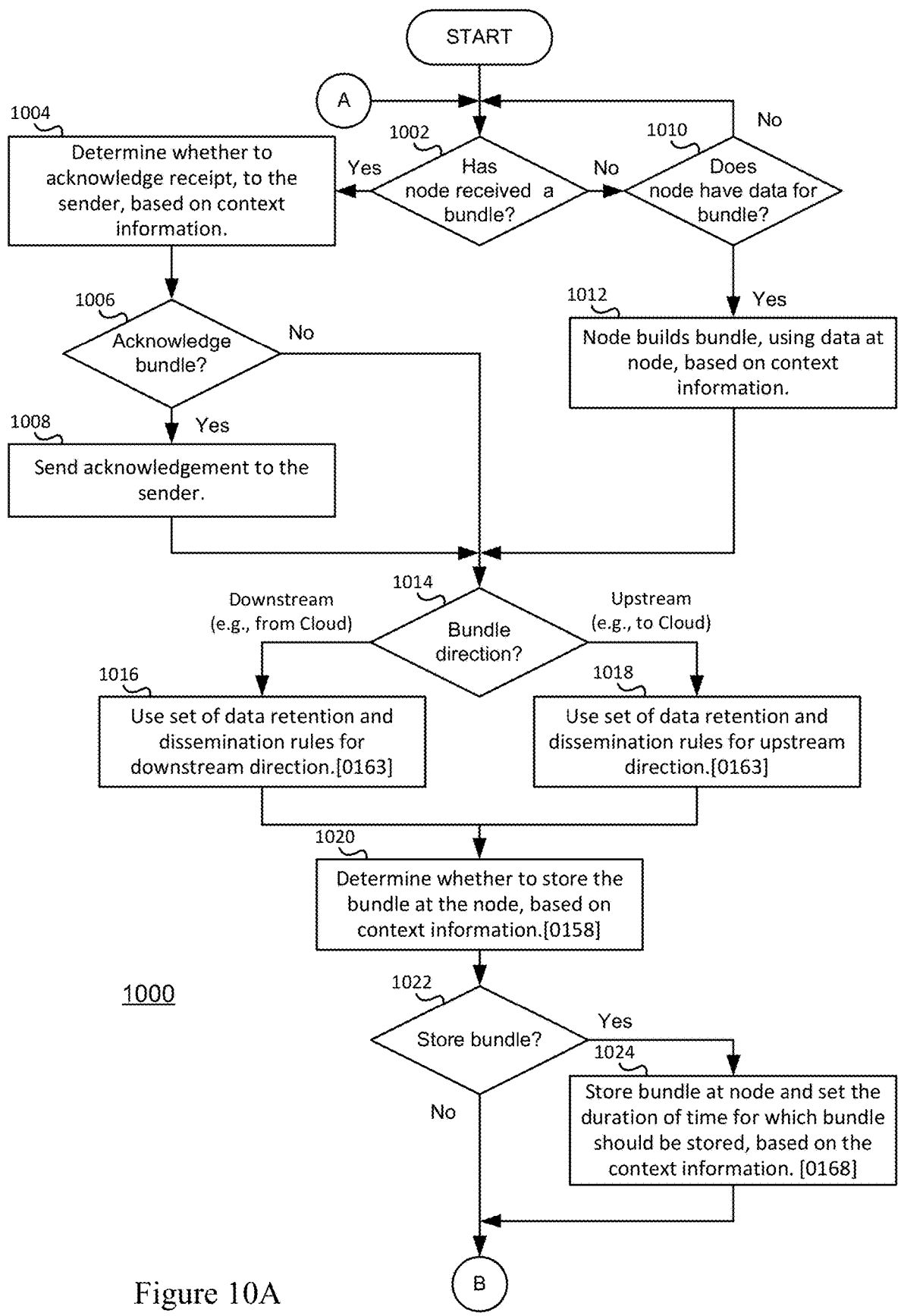
FIGS. 10A and 10B show a flowchart illustrating an example method of routing and replication of data, in accordance with various aspects of the present disclosure.
Figure 10B:
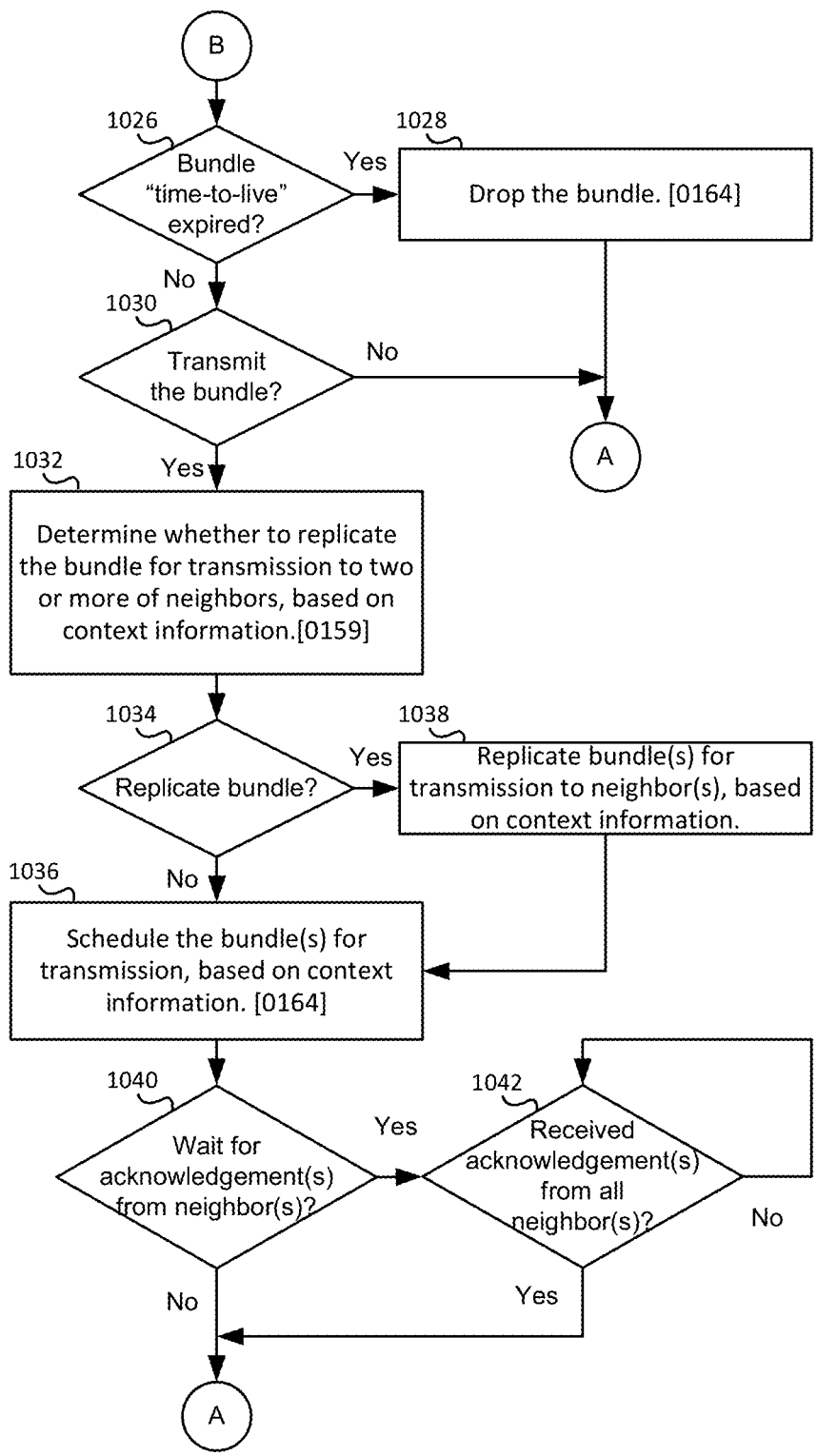

FIGS. 10A and 10B show a flowchart 1000 illustrating an example method of routing and replication of data, in accordance with various aspects of the present disclosure. FIGS. 10A-10B show additional detail of some of the actions of the flowchart 900 illustrated in FIG. 9. The method of FIGS. 10A-10B may be performed by, for example, a node (e.g., a MAP) of a network as illustrated and described in regards to FIGS. 1-8. The following discussion makes frequent reference to the use of "context information." Additional details about the nature of such "context information" have been previously described above.

The method of FIGS. 10A-10B may be initiated at the startup of various nodes of the network (e.g., as a process/thread started when an underlying operating system begins running), and may run on a continuing basis, once started. The actions of the method begin at block 1002, where the node performing the method (e.g., a mobile AP) determines whether the node has received a bundle of data. A bundle of data may be received from, for example, another node (e.g., a FAP or MAP of FIGS. 1-7) in the network. If, at block 1002, the node determines that a bundle has been received, the node may then, at block 1004, determine (e.g., based on the contents of the bundle, and/or on context information, described above) whether to acknowledge receipt of the bundle to the sender of the bundle. Next, at block 1006, the node may determine whether an acknowledgement (i.e., ACK) is to be sent, and the node may then send the acknowledgement, at block 1008. As previously discussed above, for example with regard to FIGS. 8 and 9, such an acknowledgement may, for example, include one or more flags, and may indicate that the node is accepting custody of the bundle. The method of FIG. 10A then continues to block 1014. If, however, at block 1006, it is determined that no acknowledgement is to be sent, control may pass to block 1014.

Returning to block 1002, if it is determined that the node has not received a bundle from another network node, the method may then continue at block 1010, where a determination is made as to whether the node itself has data to be sent in a bundle. For example, the node may have data from one or more sensors connected to the node, or the node may have a bundle that was stored and is to be sent to, for example, another node (e.g., a node that requested the bundle), or another destination (e.g., the DTN or Cloud). If, at block 1010, it is determined that the node has data to be sent, then control is passed to block 1012, and the node performing the method assembles a bundle, using its own data and/or data from one or more stored bundles, based on, for example, context information and data retention and dissemination rules. If, at block 1010, it is determined that there is no data to be sent by the node, the method of FIG. 10A may simply return to block 1002.

When the method of FIG. 10A arrives at block 1014, the node performing the method of FIG. 10A is in possession of a bundle (e.g., either received from another node, or assembled/built at the node). At block 1014, the method determines whether the direction of the bundle is "upstream" (i.e., to the Cloud or DTN server), or "downstream" (i.e., from the Cloud or DTN server to a destination node of the network). If it is determined that the bundle is directed "downstream," the method proceeds to block 1016, where the node records that handling of the bundle is to use a set of data retention and dissemination rules for use in processing bundles directed "downstream." If, however, the node performing the method, at block 1014, determined that the destination of the bundle is "upstream," the method then proceeds to block 1018, where the node records that handling of the bundle is to use a set of data retention and dissemination rules for use in processing bundles directed "upstream."

Next, at block 1020, the method may make a determination of whether or not to store the bundle at the node performing the method. The determination may be based, for example, on the set of retention and dissemination rules for the direction of the bundle (i.e., "upstream" or "downstream"), and on context information such as that previously described above (that may be continually gathered by the node). Then, at block 1022, if the determination of block 1020 was to store the bundle, control passes to block 1024, where the bundle may be stored in any of the types of memory available at the node, based on the context information and the set of retention and dissemination rules currently in use. The method may also set a period of time during which the bundle may be stored at the node. After that period of time, the bundle may be discarded/dropped by the node, and may be sent to the destination by an alternate, possibly more costly, communication path. The method may then continue at block 1026 shown in FIG. 10B. If, however, at block 1022, the determination of block 1020 was found to not store the bundle, the control in the method of FIG. 10A simply passes to block 1026 of FIG. 10B.

At block 1026 of FIG. 10B, a determination is made as to whether a "time-to-live" of the bundle has expired. A "time-to-live" parameter may be part of the bundle and may, for example, indicate an amount of real time, or a number of network hops until the "time-to-live" is considered to have expired and alternative action (e.g., dropping the bundle) may be taken. If, at block 1026, it is found that the "time-to-live" of the bundle has expired then, at block 1028, the bundle may be "dropped" (i.e., discarded) and storage for the bundle may be freed by the node performing the method, and the method may then return to node 1002, described above. However, if it is found, at block 1026, that the "time-to-live" of the bundle has not yet expired then, at block 1030, the method may determine whether the bundle may be transmitted by the node at this time. If it was determined, at block 1030, that the bundle is not to be transmitted, then control of the method may return to block 1002, described above. If, however, it was determined that the bundle is to be transmitted at this time, the method of FIG. 10B may continue at block 1032.

At block 1032, the method makes a determination as to whether to replicate the bundle for transmission to two or more neighbor nodes. This determination may be made using, for example, the set of retention and dissemination rules for the direction of bundle transport, and the transmission may use, for example, unicast messages. Bundle replication may occur when transmit paths from the current node to neighboring nodes suffer interference, low signal strengths, or other impairments or restrictions, as indicated by context information, and replication may permit faster, more reliable and higher quality delivery of the bundle in such conditions. If the method determines, at block 1032, to replicate the current bundle then, at block 1034, control may be passed to block 1038, where the bundle may be replicated for transmission to neighbor nodes over multiple communication paths, based on the context information gathered by the node, and the method of FIG. 10B continues at block 1036, described below. If, however, the method determines, at block 1032, that replication of the bundle is not necessary then, at block 1034 control is passed to block 1036, described below.

At block 1036, the bundle(s) may be scheduled for transmission via the available communication path(s), according to the context information know to the node, and the set of retention and dissemination rules in effect for the direction of the bundle(s). Next, at block 1040, a determination is made as to whether the node is to wait for acknowledgement from the neighbor(s) to which the bundle(s) were transmitted. If, for example, the context information known to the node and the set of retention and dissemination rules for the bundle direction indicate that the node is to wait for acknowledgements then, at block 1042, the node may verify that an acknowledgement has been received from each neighbor(s) to which the bundle was transmitted, before the method returns to block 1002, described above. If, however, the determination made at block 1030 as to whether the node is to wait for acknowledgement from the neighbor(s) to which the bundle(s) were transmitted indicates that no acknowledgements are required, the method of FIG. 10B may return to block 1002, described above.

Figure 11A:
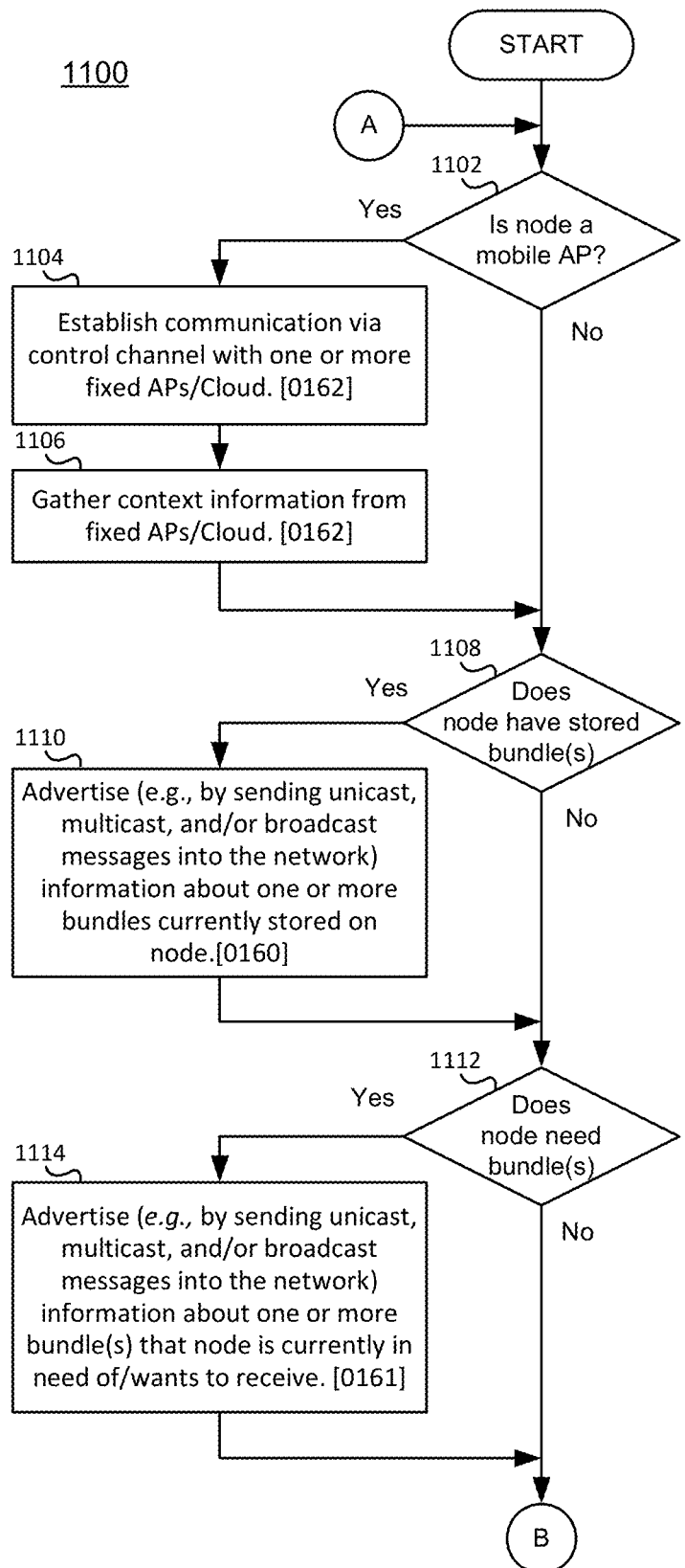
FIGS. 11A through 11C are a flowchart illustrating an example method of operating a node, in accordance with various aspects of the present disclosure.
Figure 11B:
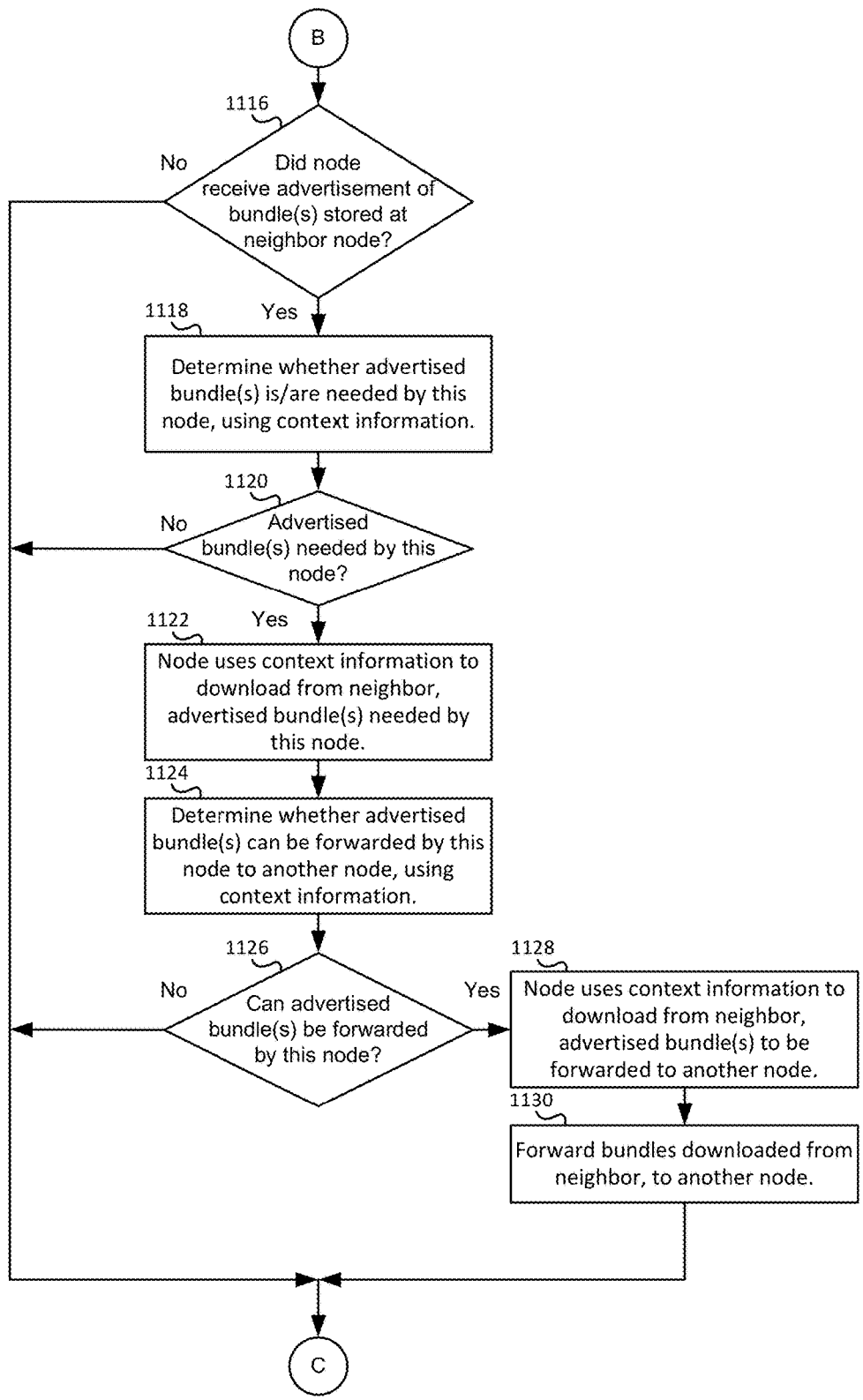
Figure 11C:
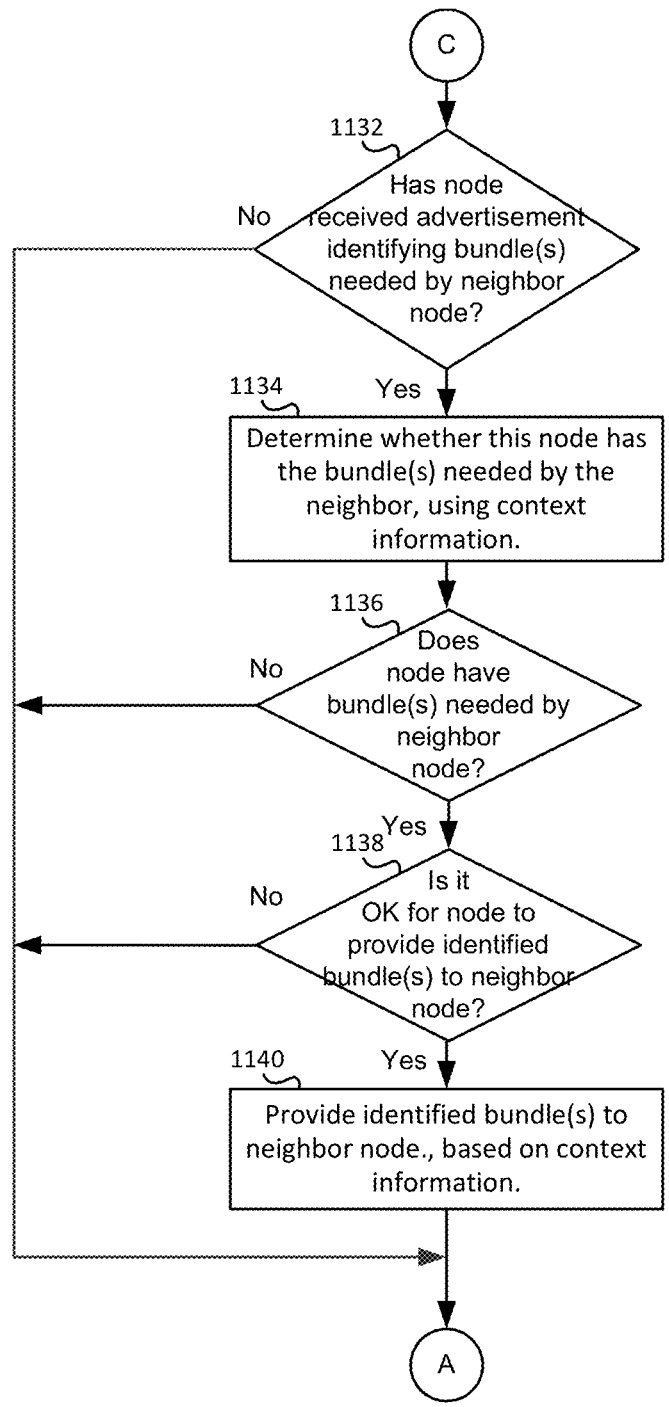

FIGS. 11A through 11C are a flowchart 1100 illustrating an example method of operating a node, in accordance with various aspects of the present disclosure. FIGS. 11A-11C show additional detail of some of the actions of the flowchart illustrated in FIG. 9. The method of FIGS. 11A-11C may be performed by, for example, a node (e.g., a MAP) of a network as illustrated and described in regards to FIGS. 1-8. The following discussion makes frequent reference to the use of "context information," additional details, the nature of, which have been previously described above. The method of FIGS. 11A-11C may be initiated at the startup of various nodes of the network (e.g., as a process/thread started when an underlying operating system begins running), and may run on a continuing basis, once started. The actions of the method begin at block 1102. It should be noted that the actions shown in FIGS. 11A-11C may not be performed in the order shown, and that actions of a block may, for example, be performed by a separate process/thread, while the process/thread of the method as a while continues on with other actions.

At block 1102, the example method of FIG. 11A determines whether the node running the method is a certain type of node (e.g., a mobile AP), and if the node is determined to be the certain type of node, the method may continue at block 1104, where the method may establish communication via a control channel (e.g., using DSRC) with one or more other network nodes (e.g., fixed APs, a DTN server and/or the Cloud). The node may then, at block 1106, gather the network context information referred to above, from the network nodes with which communication was able to be established, and then may continue on at block 1108. If, however, the node performing the method of FIGS. 11A-11C is determined, at block 1102, to be a type of network node other than certain type of node then, at block 1102, the node performing the method may continue at block 1108.

Next, at block 1108, the method of FIG. 11A may determine whether the node has any bundles stored in the various types of memory that may be present on the node. If one or more bundle(s) is/are stored on the node, the method may continue at block 1110, where the node may begin to periodically advertise information about the bundles currently stored on the node. Advertisement may permit the neighbor nodes to determine whether any bundles that those neighbor nodes need are available from the node sending the advertisement. Such advertisements may be transmitted as one or a series of repeating transmissions of bundles available from the node using, for example, unicast, multicast, or broadcast-type messages sent into the network by, for example, a process/thread of the node. Once transmission of such advertisements has been initiated, the method of FIG. 11A may then continue at block 1112. If, however, at block 1108, the method of FIG. 11A determines that the current node has no stored bundles to advertise, the method of FIG. 11A may end transmission of any advertisements of needed/wanted bundles (e.g., terminating any corresponding process/thread), and may continue at block 1112 of FIG. 11A.

At block 1112, the method of FIG. 11A may determine whether the node needs/wants any bundles that may be stored in the various types of memory that may be present on a neighbor node. If one or more bundle(s) are needed/wanted by the node, the method may continue at block 1114, where the node may begin to periodically advertise information about the bundles that are needed/wanted by the node. This may permit the neighbor nodes to determine whether any bundles that those neighbor nodes have stored in memory are needed/wanted by the node that sent the advertisement. Such advertisements may be transmitted as one or a series of repeating transmissions of bundles needed/wanted by the node using, for example, unicast, multicast, or broadcast-type messages sent into the network by a process/thread. Once transmission of such advertisements has been initiated, the method may then continue at block 1116 of FIG. 11B. If, however, at block 1112, the method determines that the current node does not need/want any bundles, the method of FIG. 11A may then end any such advertisements, if active, and continue at block 1116 of FIG. 11B.

At block 1116, the node performing the method of FIGS. 11A-11C may determine whether it has received any advertisements of bundles stored at one or more neighbor node(s). If no such advertisements have been received by this node, the method may pass control to block 1132, described below. If, however, at block 1116, the node determines that one or more advertisements of stored bundles have been received by this node then, at block 1118, the node may determine whether any of the bundles advertised by a neighbor node are needed/wanted by this node using, by way of example and not limitation, information in the advertisements, and/or one or more items from the gathered context information previously discussed, above. Next, at block 1120, if it was determined that one or more bundles needed/wanted by this node have been advertised as available at one or more neighbor node(s), the node performing the method may then, at block 1122, request and receive the needed/wanted bundles from the advertising neighbor node(s) (e.g., via download). The method of FIG. 11B then continues at block 1124.

At block 1124, the node performing the method of FIG. 11B may then determine whether one or more of the bundles in advertisements received by this node may be forwarded to other nodes. For example, in accordance with aspects of the present disclosure, a node may receive an advertisement of bundles needed/wanted by a first neighbor node, and may receive an advertisement of bundles available from a second neighbor node, and may then determine that certain bundles needed/wanted by the first neighbor node are available from the second neighbor node. Such forwarding may, for example, be governed by the context information at the node, the set of retention and dissemination rules in effect for the node(s) (e.g., based upon bundle direction), and parameters of the bundle(s). At block 1126, if there are no bundles to be forwarded between neighbor nodes, the method of FIG. 11B may then continue at block 1132 of FIG. 11C. If, however, it is determined, at block 1126, that there are bundles that may be forwarded by this node from one neighbor node to another neighbor node, the node performing the method of FIG. 11B may, at block 1128 and block 1128, perform the downloading and forwarding of the bundles. The method of FIG. 11B then proceeds to block 1132 of FIG. 11C.

At block 1132 of FIG. 11C, the method of FIGS. 11A-11C may determine whether the node performing the method has received, from one or more neighbor nodes, advertisements that identify one or more bundles needed/wanted by the neighbor node(s). If the node has not received any such advertisements, the node performing the method may then return to block 1102, described above. If, however, the node has received one or more advertisements of regarding bundles needed/wanted by one or more neighbor node(s), then, at block 1134, the node performing the method may then determine whether the bundles needed/wanted by the neighbor node(s) is/are stored at the node performing the method. Next, at block 1136, it is determined that the node does not have the bundle(s) needed/wanted by the neighbor node then the method of FIG. 11C returns to block 1102. If, however, it was determined, at block 1136, that the node performing the method does have one or more of the bundles(s) needed/wanted by the neighbor node(s) then, at block 1138, a check may be made to determine whether it is permissible for the node performing the method to provide the needed/wanted bundles to the neighbor nodes that advertised to find those bundles. If, at block 1138, it is determined that it is permissible for the node performing the method to provide the needed/wanted bundles to the neighbor node(s), then the node, at block 1140, provides the bundle(s) needed/wanted by the neighbor node(s) and stored at the node performing the method, to the neighbor node(s) that advertise the need/want for the respective bundle(s). The method of FIG. 11C then returns to block 1102, described above.

Various aspects of the present disclosure may be found in a method of managing routing and replication of data at a first node of a network comprising a plurality of nodes. Such a method may comprise wirelessly establishing communication with one or more other nodes of the plurality of nodes; and gathering operating parameters of the first node and of the one or more other nodes via one or more wireless communication links, the gathering producing a collection of context information at the first node. The method may also comprise determining whether a data bundle is available for processing by the first node. The method may further comprise, if a data bundle is available for processing by the first node, choosing to perform one of the following actions with the data bundle, based on the context information and a set of rules for the first node for a direction of communication of the data bundle: transmitting the data bundle from the first node towards a second node of the plurality of nodes via a number of communication links, storing the data bundle at the first node, and dropping the data bundle from memory of the first node.

In accordance with various aspects of the present disclosure, the first node may be located in a vehicle movable about a service area of the network, and the first node may be a mobile access point configured to wirelessly communicate with end-user devices accessing the network. The plurality of nodes may comprise one or more nodes that are located at a fixed geographic location and one or more nodes that are mobile. Determining whether a data bundle is available may comprise one or more of determining that a data bundle is available and assembling the data bundle using data originating at the first node, if data originating at the first node is available for transmission by the first node; determining that a data bundle is available and providing the data bundle from storage of the first node, if one or more data bundles are available in storage at the first node for transmission by the first node; and determining that a data bundle is not available, otherwise. Assembling the data bundle using data originating at the first node may comprise forming the data bundle using signals from one or more sensors operatively coupled to the first node. The set of rules for the first node for a direction of communication of the data bundle may be selected from two or more sets of rules comprising a set of rules for first direction through the network and a set of rules for a downstream a second direction through the network. In accordance with aspects of the disclosure, the first direction may be towards a Cloud-based system and the second direction may be away from the Cloud-based system. Transmitting the data bundle from the first node towards a second node of the plurality of nodes via the number of communication links may comprise determining that the number of communication links is two or more, based on the context information indicative of quality of communication of the first node with neighbor nodes of the plurality of nodes. Transmitting the data bundle from the first node may comprise replicating the data bundle to result in the number of copies of the data bundle for transmission by the first node via respective communication links.

Various aspects of the present disclosure may be observed in a non-transitory computer-readable medium having a plurality of code sections, where each code section stores a plurality of instructions executable by one or more processors. The executable instructions may cause the one or more processors to perform a method of managing routing and replication of data at a first node of a network comprising a plurality of nodes, where the steps of the method are as described above.

Further aspects of the present disclosure may be seen in a system for managing routing and replication of data at a first node of a network comprising a plurality of nodes. Such a system may comprise one or more processors operatively coupled to at least one wireless interface for communicatively coupling the first node to other nodes of the network. In such a system, the one or more processors may be operable to, at least, perform the steps of a method of managing routing and replication of data at a first node of a network, such as the method described above.

In accordance with various aspects of this disclosure, examples of the networks and/or components thereof presented herein are provided in U.S. Provisional Application Ser. No. 62/222,192, titled "Communication Network of Moving Things," filed on Sep. 22, 2015, which is hereby incorporated herein by reference in its entirety.

In accordance with various aspects of this disclosure, the networks and/or components thereof presented herein are provided with systems and methods for integrating such networks and/or components with other networks and systems, non-limiting examples of which are provided in U.S. Provisional Application Ser. No. 62/221,997, titled "Integrated Communication Network for A Network of Moving Things," filed on Sep. 22, 2015, which is hereby incorporated herein by reference in its entirety.

Also, in accordance with various aspects of this disclosure, the networks and/or components thereof presented herein are provided with systems and methods for synchronizing such networks and/or components, non-limiting examples of which are provided in U.S. Provisional Application Ser. No. 62/222,016, titled "Systems and Methods for Synchronizing a Network of Moving Things," filed on Sep. 22, 2015, which is hereby incorporated herein by reference in its entirety.

Additionally, in accordance with various aspects of this disclosure, the networks and/or components thereof presented herein are provided with systems and methods for managing such networks and/or components, non-limiting examples of which are provided in U.S. Provisional Application Ser. No. 62/222,042, titled "Systems and Methods for Managing a Network of Moving Things," filed on Sep. 22, 2015, which is hereby incorporated herein by reference in its entirety.

Further, in accordance with various aspects of this disclosure, the networks and/or components thereof presented herein are provided with systems and methods for monitoring such networks and/or components, non-limiting examples of which are provided in U.S. Provisional Application Ser. No. 62/222,066, titled "Systems and Methods for Monitoring a Network of Moving Things," filed on Sep. 22, 2015, which is hereby incorporated herein by reference in its entirety.

Still further, in accordance with various aspects of this disclosure, the networks and/or components thereof presented herein are provided with systems and methods for detecting and/or classifying anomalies in such networks and/or components, non-limiting examples of which are provided in U.S. Provisional Application Ser. No. 62/222,077, titled "Systems and Methods for Detecting and Classifying Anomalies in a Network of Moving Things," filed on Sep. 22, 2015, which is hereby incorporated herein by reference in its entirety.

Yet further, in accordance with various aspects of this disclosure, the networks and/or components thereof presented herein are provided with systems and methods for managing mobility in such networks and/or components, non-limiting examples of which are provided in U.S. Provisional Application Ser. No. 62/222,098, titled "Systems and Methods for Managing Mobility in a Network of Moving Things," filed on Sep. 22, 2015, which is hereby incorporated herein by reference in its entirety.

Also, in accordance with various aspects of this disclosure, the networks and/or components thereof presented herein are provided with systems and methods for managing connectivity in such networks and/or components, non-limiting examples of which are provided in U.S. Provisional Application Ser. No. 62/222,121, titled "Systems and Methods for Managing Connectivity a Network of Moving Things," filed on Sep. 22, 2015, which is hereby incorporated herein by reference in its entirety.

Additionally, in accordance with various aspects of this disclosure, the networks and/or components thereof presented herein are provided with systems and methods for collecting sensor data in such networks and/or components, non-limiting examples of which are provided in U.S. Provisional Application Ser. No. 62/222,135, titled "Systems and Methods for Collecting Sensor Data in a Network of Moving Things," filed on Sep. 22, 2015, which is hereby incorporated herein by reference in its entirety.

Further, in accordance with various aspects of this disclosure, the networks and/or components thereof presented herein are provided with systems and methods for interfacing with such networks and/or components, non-limiting examples of which are provided in U.S. Provisional Application Ser. No. 62/222,145, titled "Systems and Methods for Interfacing with a Network of Moving Things," filed on Sep. 22, 2015, which is hereby incorporated herein by reference in its entirety.

Still further, in accordance with various aspects of this disclosure, the networks and/or components thereof presented herein are provided with systems and methods for interfacing with a user of such networks and/or components, non-limiting examples of which are provided in U.S. Provisional Application Ser. No. 62/222,150, titled "Systems and Methods for Interfacing with a User of a Network of Moving Things," filed on Sep. 22, 2015, which is hereby incorporated herein by reference in its entirety.

Yet further, in accordance with various aspects of this disclosure, the networks and/or components thereof presented herein are provided with systems and methods for data storage and processing in such networks and/or components, non-limiting examples of which are provided in U.S. Provisional Application Ser. No. 62/222,168, titled "Systems and Methods for Data Storage and Processing for a Network of Moving Things," filed on Sep. 22, 2015, which is hereby incorporated herein by reference in its entirety.

Also, in accordance with various aspects of this disclosure, the networks and/or components thereof presented herein are provided with systems and methods for vehicle traffic management in such networks and/or components, non-limiting examples of which are provided in U.S. Provisional Application Ser. No. 62/222,183, titled "Systems and Methods for Vehicle Traffic Management in a Network of Moving Things," filed on Sep. 22, 2015, which is hereby incorporated herein by reference in its entirety.

Additionally, in accordance with various aspects of this disclosure, the networks and/or components thereof presented herein are provided with systems and methods for environmental management in such networks and/or components, non-limiting examples of which are provided in U.S. Provisional Application Ser. No. 62/222,186, titled "Systems and Methods for Environmental Management in a Network of Moving Things," filed on Sep. 22, 2015, which is hereby incorporated herein by reference in its entirety.

Further, in accordance with various aspects of this disclosure, the networks and/or components thereof presented herein are provided with systems and methods for managing port or shipping operation in such networks and/or components, non-limiting examples of which are provided in U.S. Provisional Application Ser. No. 62/222,190, titled "Systems and Methods for Port Management in a Network of Moving Things," filed on Sep. 22, 2015, which is hereby incorporated herein by reference in its entirety.

Also, in accordance with various aspects of this disclosure, the networks and/or components thereof presented herein are provided with systems and methods for enhancing the accuracy of positioning or location information based at least in part on historical data, non-limiting examples of which are provided in U.S. Provisional Application Ser. No. 62/244,828, titled "Utilizing Historical Data to Correct GPS Data in a Network of Moving Things," filed on Oct. 22, 2015, which is hereby incorporated herein by reference in its entirety.

Additionally, in accordance with various aspects of this disclosure, the networks and/or components thereof presented herein are provided with systems and methods for enhancing the accuracy of position or location of positioning or location information based at least in part on the utilization of anchors, non-limiting examples of which are provided in U.S. Provisional Application Ser. No. 62/244,930, titled "Using Anchors to Correct GPS Data in a Network of Moving Things," filed on Oct. 22, 2015, which is hereby incorporated herein by reference in its entirety.

Further, in accordance with various aspects of this disclosure, the networks and/or components thereof presented herein are provided with systems and methods for providing communication between applications, non-limiting examples of which are provided in U.S. Provisional Application Ser. No. 62/246,368, titled "Systems and Methods for Inter-Application Communication in a Network of Moving Things," filed on Oct. 26, 2015, which is hereby incorporated herein by reference in its entirety.

Still further, in accordance with various aspects of this disclosure, the networks and/or components thereof presented herein are provided with systems and methods for probing, analyzing and/or validating communication, non-limiting examples of which are provided in U.S. Provisional Application Ser. No. 62/246,372, titled "Systems and Methods for Probing and Validating Communication in a Network of Moving Things," filed on Oct. 26, 2015, which is hereby incorporated herein by reference in its entirety.

Yet further, in accordance with various aspects of this disclosure, the networks and/or components thereof presented herein are provided with systems and methods for adapting communication rate, non-limiting examples of which are provided in U.S. Provisional Application Ser. No. 62/250,544, titled "Adaptive Rate Control for Vehicular Networks," filed on Nov. 4, 2015, which is hereby incorporated herein by reference in its entirety.

Also, in accordance with various aspects of this disclosure, the networks and/or components thereof presented herein are provided with systems and methods for reconfiguring and adapting hardware, non-limiting examples of which are provided in U.S. Provisional Application Ser. No. 62/273,878, titled "Systems and Methods for Reconfiguring and Adapting Hardware in a Network of Moving Things," filed on Dec. 31, 2015, which is hereby incorporated herein by reference in its entirety.

Additionally, in accordance with various aspects of this disclosure, the networks and/or components thereof presented herein are provided with systems and methods for optimizing the gathering of data, non-limiting examples of which are provided in U.S. Provisional Application Ser. No. 62/253,249, titled "Systems and Methods for Optimizing Data Gathering in a Network of Moving Things," filed on Nov. 10, 2015, which is hereby incorporated herein by reference in its entirety.

Further, in accordance with various aspects of this disclosure, the networks and/or components thereof presented herein are provided with systems and methods for performing delay tolerant networking, non-limiting examples of which are provided in U.S. Provisional Application Ser. No. 62/257,421, titled "Systems and Methods for Delay Tolerant Networking in a Network of Moving Things," filed on Nov. 19, 2015, which is hereby incorporated herein by reference in its entirety.

Still further, in accordance with various aspects of this disclosure, the networks and/or components thereof presented herein are provided with systems and methods for improving the coverage and throughput of mobile access points, non-limiting examples of which are provided in U.S. Provisional Application Ser. No. 62/265,267, titled "Systems and Methods for Improving Coverage and Throughput of Mobile Access Points in a Network of Moving Things," filed on Dec. 9, 2015, which is hereby incorporated herein by reference in its entirety.

Yet further, in accordance with various aspects of this disclosure, the networks and/or components thereof presented herein are provided with systems and methods for coordinating channel utilization, non-limiting examples of which are provided in U.S. Provisional Application Ser. No. 62/270,858, titled "Channel Coordination in a Network of Moving Things," filed on Dec. 22, 2015, which is hereby incorporated herein by reference in its entirety.

Also, in accordance with various aspects of this disclosure, the networks and/or components thereof presented herein are provided with systems and methods for implementing a network coded mesh network in the network of moving things, non-limiting examples of which are provided in U.S. Provisional Application Ser. No. 62/257,854, titled "Systems and Methods for Network Coded Mesh Networking in a Network of Moving Things," filed on Nov. 20, 2015, which is hereby incorporated herein by reference in its entirety.

Additionally, in accordance with various aspects of this disclosure, the networks and/or components thereof presented herein are provided with systems and methods for improving the coverage of fixed access points, non-limiting examples of which are provided in U.S. Provisional Application Ser. No. 62/260,749, titled "Systems and Methods for Improving Fixed Access Point Coverage in a Network of Moving Things," filed on Nov. 30, 2015, which is hereby incorporated herein by reference in its entirety.

Further, in accordance with various aspects of this disclosure, the networks and/or components thereof presented herein are provided with systems and methods for managing mobility controllers and their network interactions, non-limiting examples of which are provided in U.S. Provisional Application Ser. No. 62/273,715, titled "Systems and Methods for Managing Mobility Controllers and Their Network Interactions in a Network of Moving Things," filed on Dec. 31, 2015, which is hereby incorporated herein by reference in its entirety.

Still further, in accordance with various aspects of this disclosure, the networks and/or components thereof presented herein are provided with systems and methods for managing and/or triggering handovers of mobile access points, non-limiting examples of which are provided in U.S. Provisional Application Ser. No. 62/281,432, titled "Systems and Methods for Managing and Triggering Handovers of Mobile Access Points in a Network of Moving Things," filed on Jan. 21, 2016, which is hereby incorporated herein by reference in its entirety.

Yet further, in accordance with various aspects of this disclosure, the networks and/or components thereof presented herein are provided with systems and methods for performing captive portal-related control and management, non-limiting examples of which are provided in U.S. Provisional Application Ser. No. 62/268,188, titled "Captive Portal-related Control and Management in a Network of Moving Things," filed on Dec. 16, 2015, which is hereby incorporated herein by reference in its entirety.

Also, in accordance with various aspects of this disclosure, the networks and/or components thereof presented herein are provided with systems and methods for extrapolating high-value data, non-limiting examples of which are provided in U.S. Provisional Application Ser. No. 62/270,678, titled "Systems and Methods to Extrapolate High-Value Data from a Network of Moving Things," filed on Dec. 22, 2015, which is hereby incorporated herein by reference in its entirety.

Additionally, in accordance with various aspects of this disclosure, the networks and/or components thereof presented herein are provided with systems and methods for providing remote software updating and distribution, non-limiting examples of which are provided in U.S. Provisional Application Ser. No. 62/272,750, titled "Systems and Methods for Remote Software Update and Distribution in a Network of Moving Things," filed on Dec. 30, 2015, which is hereby incorporated herein by reference in its entirety.

Further, in accordance with various aspects of this disclosure, the networks and/or components thereof presented herein are provided with systems and methods for providing remote configuration updating and distribution, non-limiting examples of which are provided in U.S. Provisional Application Ser. No. 62/278,662, titled "Systems and Methods for Remote Configuration Update and Distribution in a Network of Moving Things," filed on Jan. 14, 2016, which is hereby incorporated herein by reference in its entirety.

Still further, in accordance with various aspects of this disclosure, the networks and/or components thereof presented herein are provided with systems and methods for adapting the network, for example automatically, based on user feedback, non-limiting examples of which are provided in U.S. Provisional Application Ser. No. 62/286,243, titled "Systems and Methods for Adapting a Network of Moving Things Based on User Feedback," filed on Jan. 22, 2016, which is hereby incorporated herein by reference in its entirety.

Yet further, in accordance with various aspects of this disclosure, the networks and/or components thereof presented herein are provided with systems and methods for enhancing and/or guaranteeing data integrity when building or performing data analytics, non-limiting examples of which are provided in U.S. Provisional Application Ser. No. 62/278,764, titled "Systems and Methods to Guarantee Data Integrity When Building Data Analytics in a Network of Moving Things," Jan. 14, 2016, which is hereby incorporated herein by reference in its entirety.

Also, in accordance with various aspects of this disclosure, the networks and/or components thereof presented herein are provided with systems and methods for performing self-initialization and/or automated bootstrapping of mobile access points, non-limiting examples of which are provided in U.S. Provisional Application Ser. No. 62/286,515, titled "Systems and Methods for Self-Initialization and Automated Bootstrapping of Mobile Access Points in a Network of Moving Things," filed on Jan. 25, 2016, which is hereby incorporated herein by reference in its entirety.

Additionally, in accordance with various aspects of this disclosure, the networks and/or components thereof presented herein are provided with systems and methods for managing power supply and/or utilization, non-limiting examples of which are provided in U.S. Provisional Application Ser. No. 62/295,602, titled "Systems and Methods for Power Management in a Network of Moving Things," filed on Feb. 16, 2016, which is hereby incorporated herein by reference in its entirety.

Further, in accordance with various aspects of this disclosure, the networks and/or components thereof presented herein are provided with systems and methods for automating and easing the installation and setup of the infrastructure, non-limiting examples of which are provided in U.S. Provisional Application Ser. No. 62/299,269, titled "Systems and Methods for Automating and Easing the Installation and Setup of the Infrastructure Supporting a Network of Moving Things," filed on Feb. 24, 2016, which is hereby incorporated herein by reference in its entirety.

In summary, various aspects of this disclosure provide communication network architectures, systems and methods for supporting a network of mobile nodes, for example comprising a combination of mobile and stationary nodes. As a non-limiting example, various aspects of this disclosure provide communication network architectures, systems, and methods for supporting a dynamically configurable communication network comprising a complex array of both static and moving communication nodes (e.g., the Internet of moving things). While the foregoing has been described with reference to certain aspects and examples, it will be understood by those skilled in the art that various changes may be made and equivalents may be substituted without departing from the scope of the disclosure. In addition, many modifications may be made to adapt a particular situation or material to the teachings of the disclosure without departing from its scope. Therefore, it is intended that the disclosure not be limited to the particular example(s) disclosed, but that the disclosure will include all examples falling within the scope of the appended claims.

The present method and/or system may be realized in hardware, software, or a combination of hardware and software. The present methods and/or systems may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may be a general-purpose computing system with a program or other code that, when being loaded and executed, controls the computing system such that it carries out the methods described herein. Another typical implementation may comprise an application specific integrated circuit or chip. Some implementations may comprise a non-transitory machine-readable (e.g., computer readable) medium (e.g., FLASH drive, optical disk, magnetic storage disk, or the like) having stored thereon one or more lines of code executable by a machine, thereby causing the machine to perform processes as described herein.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. Therefore, it is intended that the present method and/or system not be limited to the particular implementations disclosed, but that the present method and/or system will include all implementations falling within the scope of the appended claims.

What is claimed is:

1. A method for handling of data at a first node of a network comprising a plurality of nodes, the method comprising:
    obtaining node related information associated with one or both of the first node and at least one of one or more other nodes of the plurality of nodes, the node related information comprising for each corresponding node, information relating to the node, information relating to an environment of the node, and information relating to each neighboring node of the node;
    when a data bundle is available for processing by the first node:
        obtaining bundle related information applicable to the data bundle; and
        selecting based on the node related information, the bundle related information, and a set of rules for the first node for a direction of communication of the data bundle, one action from a plurality of actions supported by the first node; and
        when the selected one action is transmittal of the data bundle, transmitting the data bundle from the first node using one or more of a number of wireless communication links of the first node, wherein transmitting the data bundle from the first node comprises:
            replicating the data bundle in the first node, to generate a number of copies of the data bundle, and
            transmitting the copies of the data bundle via one or more respective wireless communication links, wherein the transmitting comprises scheduling transmittal of the copies of the data bundle based on one or more of context information available to the first node and a set of retention and dissemination rules in effect for the direction of communication of the data bundle.

2. The method according to claim 1, wherein the first node is located in a vehicle movable about a service area of the network.

3. The method according to claim 1, wherein the first node comprises a mobile access point configured to wirelessly communicate with end-user devices accessing the network.

4. The method according to claim 1, wherein the plurality of nodes comprises one or more fixed nodes that are located at respective fixed geographic locations, and one or more mobile nodes that are located within a service area of the network at respective current geographic locations.

5. The method according to claim 1, wherein determining whether a data bundle is available comprises:
   determining that a data bundle is available and assembling the data bundle using data originating at the first node, if data originating at the first node is available for transmission by the first node;
   determining that a data bundle is not available, otherwise.

6. The method according to claim 5, wherein assembling the data bundle using data originating at the first node comprises forming the data bundle using data representative of signals from one or more sensors operatively coupled to the first node.

7. The method according to claim 1, wherein determining whether a data bundle is available comprises:
   determining that a data bundle is available and providing the data bundle from storage of the first node, if one or more data bundles are available in storage at the first node for transmission by the first node; and
   determining that a data bundle is not available, otherwise.

8. The method according to claim 1, comprising generating based on obtained node related information associated with each of the one or more other nodes of the plurality of nodes, a collection of node related information at the first node.

9. The method according to claim 1, wherein transmitting the data bundle from the first node using each of the number of wireless communication links comprises determining that the number of wireless communication links is two or more, based on node related information indicative of quality of communication of the first node with neighbor nodes of the plurality of nodes.

10. A non-transitory computer-readable medium having a plurality of code sections, each code section storing a plurality of instructions executable by one or more processors to cause the one or more processors to perform a method for handling of data at a first node of a network comprising a plurality of nodes, the steps of the method comprising:
   obtaining node related information associated with one or both of the first node and at least one of one or more other nodes of the plurality of nodes, the node related information comprising for each corresponding node, information relating to the node, information relating to an environment of the node, and information relating to each neighboring node of the node;
   when a data bundle is available for processing by the first node:
      obtaining bundle related information applicable to the data bundle; and
      selecting based on the node related information, the bundle related information, and a set of rules for the first node for a direction of communication of the data bundle, one action from a plurality of actions supported by the first node; and
      when the selected one action is transmittal of the data bundle, transmitting the data bundle from the first node using one or more of a number of wireless communication links of the first node, wherein transmitting the data bundle from the first node comprises:
         replicating the data bundle in the first node, to generate a number of copies of the data bundle, and
         transmitting the copies of the data bundle via one or more respective wireless communication links,
         wherein the transmitting comprises scheduling transmittal of the copies of the data bundle based on one or more of context information available to the first node and a set of retention and dissemination rules in effect for the direction of communication of the data bundle.

11. The non-transitory computer-readable medium according to claim 10, wherein the first node is located in a vehicle movable about a service area of the network.

12. The non-transitory computer-readable medium according to claim 10, wherein the first node comprises a mobile access point configured to wirelessly communicate with end-user devices accessing the network.

13. The non-transitory computer-readable medium according to claim 10, wherein the plurality of nodes comprises one or more fixed nodes that are located at respective fixed geographic locations, and one or more mobile nodes that are located within a service area of the network at respective current geographic locations.

14. The non-transitory computer-readable medium according to claim 10, wherein determining whether a data bundle is available comprises:
   determining that a data bundle is available and assembling the data bundle using data originating at the first node, if data originating at the first node is available for transmission by the first node;
   determining that a data bundle is not available, otherwise.

15. The non-transitory computer-readable medium according to claim 14, wherein assembling the data bundle using data originating at the first node comprises forming the data bundle using data representative of signals from one or more sensors operatively coupled to the first node.

16. The non-transitory computer-readable medium according to claim 10, wherein determining whether a data bundle is available comprises:
   determining that a data bundle is available and providing the data bundle from storage of the first node, if one or more data bundles are available in storage at the first node for transmission by the first node; and
   determining that a data bundle is not available, otherwise.

17. The non-transitory computer-readable medium according to claim 10, wherein the steps of the method further comprise generating based on obtained node related information associated with each of the one or more other nodes of the plurality of nodes, a collection of node related information at the first node.

18. The non-transitory computer-readable medium according to claim 10, wherein transmitting the data bundle from the first node using each of the number of wireless communication links comprises determining that the number of wireless communication links is two or more, based on node related information indicative of quality of communication of the first node with neighbor nodes of the plurality of nodes.

19. A system for handling of data at a first node of a network comprising a plurality of nodes, the system comprising:
   one or more processors operatively coupled to at least one wireless interface for communicatively coupling the first node to other nodes of the network, the one or more processors being configured to:
      obtain node related information associated with one or both of the first node and at least one of one or more other nodes of the plurality of nodes, the node related information comprising for each corresponding node, information relating to the node, information relating to an environment of the node, and information relating to each neighboring node of the node;

when a data bundle is available for processing by the first node:
obtain bundle related information applicable to the data bundle; and
select based on the node related information, the bundle related information, and a set of rules for the first node for a direction of communication of the data bundle, one action from a plurality of actions supported by the first node; and
when the selected one action is transmittal of the data bundle, transmit the data bundle from the first node using one or more of a number of wireless communication links of the first node, wherein transmitting the data bundle from the first node comprises:
replicating the data bundle in the first node, to generate a number of copies of the data bundle, and
transmitting the copies of the data bundle via one or more respective wireless communication links, wherein the transmitting comprises scheduling transmittal of the copies of the data bundle based on one or more of context information available to the first node and a set of retention and dissemination rules in effect for the direction of communication of the data bundle.

20. The system according to claim 19, wherein the first node is located in a vehicle movable about a service area of the network.

21. The system according to claim 19, wherein the first node comprises a mobile access point configured to wirelessly communicate with end-user devices accessing the network.

22. The system according to claim 19, wherein the plurality of nodes comprises one or more fixed nodes that are located at respective fixed geographic locations, and one or more mobile nodes that are located within a service area of the network at respective current geographic locations.

23. The system according to claim 19, wherein the one or more processors are configured to, when determining whether a data bundle is available:
determine that a data bundle is available and assembling the data bundle using data originating at the first node, if data originating at the first node is available for transmission by the first node;
determine that a data bundle is not available, otherwise.

24. The system according to claim 23, wherein the one or more processors are configured to, when assembling the data bundle using data originating at the first node comprises, form the data bundle using data representative of signals from one or more sensors operatively coupled to the first node.

25. The system according to claim 19, wherein the one or more processors are configured to, when determining whether a data bundle is available:
determine that a data bundle is available and providing the data bundle from storage of the first node, if one or more data bundles are available in storage at the first node for transmission by the first node; and
determine that a data bundle is not available, otherwise.

26. The system according to claim 19, wherein the one or more processors are configured to generate based on obtained node related information associated with each of the one or more other nodes of the plurality of nodes, a collection of node related information at the first node.

27. The system according to claim 19, wherein the one or more processors are configured to, when transmitting the data bundle from the first node using each of the number of wireless communication links, determine that the number of wireless communication links is two or more, based on node related information indicative of quality of communication of the first node with neighbor nodes of the plurality of nodes.

* * * * *